(12) United States Patent
Futamura et al.

(10) Patent No.: US 8,666,626 B2
(45) Date of Patent: Mar. 4, 2014

(54) TURNING CONTROL DEVICE FOR VEHICLE

(75) Inventors: Tomoyuki Futamura, Utsunomiya (JP); Takeshi Kojima, Saitama (JP); Kazutaka Ohmura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/582,415

(22) PCT Filed: Mar. 4, 2011

(86) PCT No.: PCT/JP2011/055027
§ 371 (c)(1),
(2), (4) Date: Sep. 1, 2012

(87) PCT Pub. No.: WO2011/108688
PCT Pub. Date: Sep. 9, 2011

(65) Prior Publication Data
US 2012/0323458 A1 Dec. 20, 2012

(30) Foreign Application Priority Data

Mar. 4, 2010 (JP) ................................ 2010-047833
Dec. 9, 2010 (JP) ................................ 2010-274951
Dec. 9, 2010 (JP) ................................ 2010-274952

(51) Int. Cl.
*B60T 8/00* (2006.01)
*B60T 8/1755* (2006.01)
*B60W 40/114* (2012.01)
*G05D 1/08* (2006.01)

(52) U.S. Cl.
USPC ............... 701/72; 701/36; 701/41; 701/48; 701/70; 701/71; 701/78; 701/83; 701/84; 701/87; 701/90; 701/530

(58) Field of Classification Search
CPC ......... B60T 7/042; B60T 8/00; B60T 8/1766; B60T 8/36; B60T 8/442; B60T 8/52; B60T 2250/03; B60T 2250/062; B60T 2260/024; B60T 2201/16
USPC ........... 701/36, 41, 48, 70–72, 78, 83–84, 87, 701/90, 530; 180/6.24, 6.44, 6.6, 78
See application file for complete search history.

(56) References Cited

U.S. PATENT DOCUMENTS 5,228,757 A 7/1993 Ito et al.
6,415,215 B1 7/2002 Nishizaki et al.
(Continued)

FOREIGN PATENT DOCUMENTS

EP 1 627 764 A1 2/2006
GB 2 412 100 A 9/2005
(Continued)

OTHER PUBLICATIONS

U.S. Office Action, issued in U.S. Appl. No. 13/580,798, dated Apr. 12, 2013.
(Continued)

*Primary Examiner* — Mary Cheung
*Assistant Examiner* — Atul Trivedi
(74) *Attorney, Agent, or Firm* — Carrier Blackman & Associates, P.C.; William D. Blackman; Anne G. Sabourin

(57) ABSTRACT

A turning control device for a vehicle which generates a yaw moment in the body of a vehicle includes: a steering wheel turning amount detection device which detects a steering wheel turning amount of the vehicle; a vehicle speed detection device which detects a vehicle speed of the vehicle; a feedforward control amount calculation unit which calculates a feedforward control amount based on at least the steering wheel turning amount; a braking force control amount calculation unit which determines a braking force control amount based on the feedforward control amount; a braking control device which controls the braking force based on the braking force control amount; and a steering direction determination device which determines whether a steering direction is an incremental steering direction or a returning-steering direction. The feedforward control amount calculation unit includes a feedforward control amount correction unit which corrects the feedforward control amount.

9 Claims, 31 Drawing Sheets

(56) References Cited

U.S. PATENT DOCUMENTS

| | | |
|---|---|---|
| 6,453,226 B1 | 9/2002 | Hac et al. |
| 6,697,726 B2 * | 2/2004 | Takagi et al. ............. 701/70 |
| 6,708,098 B2 * | 3/2004 | Matsumoto et al. ......... 701/70 |
| 6,879,890 B2 | 4/2005 | Matsumoto et al. |
| 7,349,786 B2 * | 3/2008 | Takagi ................. 701/70 |
| 8,321,088 B2 * | 11/2012 | Brown et al. ............ 701/38 |
| 2001/0027893 A1 | 10/2001 | Nishizaki et al. |
| 2003/0074122 A1 | 4/2003 | Hac |
| 2004/0102887 A1 * | 5/2004 | Lin et al. .............. 701/70 |
| 2005/0080545 A1 * | 4/2005 | Takagi ................. 701/70 |
| 2005/0125131 A1 * | 6/2005 | Kato et al. ............. 701/70 |
| 2005/0209763 A1 | 9/2005 | Offerle et al. |
| 2005/0240332 A1 | 10/2005 | Mori et al. |
| 2006/0069489 A1 * | 3/2006 | Chen et al. ............. 701/70 |
| 2006/0116801 A1 | 6/2006 | Shirley et al. |
| 2006/0197377 A1 | 9/2006 | Takahashi et al. |
| 2008/0086248 A1 * | 4/2008 | Lu et al. ............... 701/41 |
| 2008/0255744 A1 * | 10/2008 | Yasui et al. ............. 701/70 |
| 2009/0171526 A1 * | 7/2009 | Takenaka et al. .......... 701/29 |

FOREIGN PATENT DOCUMENTS

| | | |
|---|---|---|
| JP | 5-024422 A | 2/1993 |
| JP | 08-048226 A | 2/1996 |
| JP | 2572860 B2 | 1/1997 |
| JP | 2000-071961 A | 3/2000 |
| JP | 2005-153716 A | 6/2005 |

OTHER PUBLICATIONS

U.S. Office Action, issued in U.S. Appl. No. 13/580,798, dated May 14, 2012.

EP Search Report, mailed Nov. 7, 2013, issued in corresponding EP application 11750797.0.

* cited by examiner

INCREMENTAL STEERING CONTROL

RETURNING STEERING CONTROL

TURNING CONTROL DEVICE FOR VEHICLE

TECHNICAL FIELD

This invention relates to a turning control device for a vehicle that uses braking to control the turning of the vehicle.

Priority is claimed on Japanese Patent Application No. 2010-047833, filed Mar. 4, 2010, Japanese Patent Application No. 2010-274951, filed Dec. 9, 2010, and Japanese Patent Application No. 2010-274952, filed Dec. 9, 2010, the contents of which are incorporated herein by reference.

BACKGROUND ART

As an example of this type of turning control device, there is known one in which stability of vehicle behavior is achieved by controlling the braking of specific wheels so as to bring a deviation between; a transverse G standard yaw rate calculated based on the acceleration (referred to hereunder as transverse acceleration) in a left-right direction of the wheels and the vehicle speed, and the actual yaw rate of the vehicle, closer to zero.

Furthermore, as another example of a turning control device, there is known one in which an improvement in the turnability is achieved by controlling such that the braking forces of the left and right front wheels are made different, and also the braking forces of the left and right rear wheels are made different, according to the turning conditions of the vehicle (for example, steering wheel turning angle or rate of change of steering wheel turning angle) during braking so as to assist the yaw moment (for example, refer to Patent Document 1).

Moreover, there is known one in which an improvement in the turnability is achieved by adding a first yaw moment calculated based on the steering wheel turning angle speed or the steering wheel turning angle acceleration, and a second yaw moment calculated based on the steering wheel turning angle, the vehicle speed, and the yaw rate, to calculate a correction yaw moment, and controlling such that the braking forces of the left and right front wheels are made different and the braking forces of the left and right rear wheels are made different so as to generate this correction yaw moment (for example, refer to Patent Document 2).

PRIOR ART DOCUMENT

Patent Document

[Patent Document 1] Japanese Patent No. 2572860
[Patent Document 2] Japanese Unexamined Patent Application, First Publication No. 2005-153716

DISCLOSURE OF INVENTION

Problems to be Solved by the Invention

However, in the turning control device disclosed in Patent Document 1, the yaw moment is always assisted when braking is performed while the vehicle is turning, and as a result, in some cases, the yaw moment may become excessive, resulting in reduced stability. Therefore, it is not realistic.

Moreover, in the turning control device according to Patent Document 2, the arrangement is such that the first yaw moment has a great influence at the time of a sharp turn (when the steering wheel turning angle speed or steering wheel turning angle acceleration is great), and the turnability is improved at this time. However, it is not effective at the time of normal turning. Therefore, there is a strong demand for a turning control device capable of improving the level of the turnability at the time of normal turning.

Consequently, an object of the present invention is to provide a turning control device for a vehicle capable of improving the level of steering responsiveness at the time of normal turning.

Means for Solving the Problem

In a turning control device for a vehicle according to this invention, the following measures are used in order to solve the above-described problems.

(1) An aspect of the present invention is a turning control device for a vehicle capable of generating a yaw moment in a body of the vehicle by applying a braking force to left and right wheels of the vehicle based on running conditions of the vehicle, the turning control device comprising: a steering wheel turning amount detection device which detects a steering wheel turning amount of the vehicle; a vehicle speed detection device which detects or estimates a speed of the vehicle; a feedforward control amount calculation unit which calculates a feedforward control amount based on a detection signal from at least the steering wheel turning amount detection device; a braking force control amount calculation unit which determines a braking force control amount based on the feedforward control amount calculated by the feedforward control amount calculation unit; a braking control device which controls the braking force based on the braking force control amount determined by the braking force control amount calculation unit; and a steering direction determination device which determines whether a steering direction is an incremental steering direction or a returning-steering direction based on the detection signal from the steering wheel turning amount detection device, wherein the feedforward control amount calculation unit is provided with a feedforward control amount correction unit which corrects the feedforward control amount according to the determination result of the steering direction determination device.

(2) In the aspect described in (1) above, in a case where the steering direction determination device determines a steering direction as being an incremental steering direction when the vehicle speed is within a high speed range and is at least a predetermined vehicle speed, the feedforward control amount correction unit makes the forward control amount smaller than that in a case where the steering direction determination device determines the steering direction as being a returning-steering direction.

(3) In the aspect described in (1) above, there may be further provided: a transverse acceleration detection device which detects an acceleration of the vehicle in the left-right direction; a yaw rate detection device which detects an actual yaw rate of the vehicle; a first norm yaw rate calculation unit which calculates a first norm yaw rate based on a detection signal from the transverse acceleration detection device and a detection signal from the vehicle speed detection device; a norm yaw rate correction unit which corrects the first norm yaw rate in the incremental direction and calculates a second norm yaw rate based on a detection signal from the steering wheel turning amount detection device and a detection signal from the vehicle speed detection device; and a second braking force control amount calculation unit which determines a second braking force control amount in a direction that offsets a yaw rate deviation between the second norm yaw rate and the actual yaw rate detected by the yaw rate detection device, wherein the braking control device may control the braking force based on a total braking force control amount obtained by adding or multiplying the braking force control amount determined by the braking force control amount calculation unit to or by the second braking force control amount determined by the second braking force control amount calculation unit.

(4) In the aspect described in (1) above, the norm yaw rate correction unit may select either one of a steering angle yaw rate reference value estimated based on a detection signal from the steering wheel turning amount detection device and a detection signal from the vehicle speed detection device, and a delay steering angle yaw rate value which is determined so as to correspond to the steering angle yaw rate reference value and which has a temporal delay with respect to this steering angle yaw rate reference value, and it may correct the first norm yaw rate based on the selected steering angle yaw rate reference value or the delay steering angle yaw rate value to calculate the second norm yaw rate.

(5) In the aspect described in (1) above, there may be further provided a requested torque detection device which detects the magnitude of a requested torque based on an accelerator throttle opening or an accelerator pedal operating amount of the vehicle, wherein the norm yaw rate correction unit may determine a correction amount so that, when a detection signal from the requested torque detection device is smaller than a predetermined value, the second norm yaw rate becomes greater as the vehicle speed is lower.

(6) In the aspect described in (1) above, the norm yaw rate correction unit may determine a correction amount so that the second norm yaw rate becomes greater as a steering wheel rotation speed or a steering wheel rotation amount of the vehicle calculated based on a detection signal from the steering wheel turning amount detection device becomes greater.

(7) In the aspect described in (1) above, there may be further provided a nullification device which nullifies the braking force control amount determined by the braking force control amount calculation unit, when the vehicle is in a predetermined operating state.

Effects of the Invention

According to the aspect of (1) above, when a braking force control amount is determined based on a feedforward control amount and an incremental characteristic, the braking force control amount can be determined by changing the incremental characteristic depending on the case where the steering direction is in the incremental steering direction or it is in the returning-steering direction. Therefore, the level of steering responsiveness and turnability and the level of yaw moment convergence can both be improved.

In the case of (2) above, in the high speed range, an excessive steering intervention can be suppressed to ensure the stability, and the level of convergence can be improved, when the steering direction is in the incremental steering direction, while the level of responsiveness can be improved when the steering direction is in the returning-steering direction.

In the case of (3) above, since the braking force is controlled based on a total braking force control amount, which is obtained by combining a braking force control amount of a feedforward control system and a second braking force control amount of a feedback control system, the level of steering responsiveness is improved while the level of steering tracking is also improved. For example, in a process in which steering is maintained after the steering input, such as when turning in a continuous circle, fluctuation of the control amounts is suppressed, so that the level of steering tracking is improved.

In the case (4) above, it is possible to change the steering responsiveness in each case where the steering wheel is turned in the incremental steering direction and where it is turned in the returning-steering direction.

In the case of (5) above, the turnability at the time of tuck-in at low to medium speed, for example, is improved.

In the case of (6) above, the responsiveness of the steering when avoiding a front obstacle or changing lanes is improved.

In the case of (7) above, under specific conditions where the stability of vehicle behavior may be reduced when coupled with a braking force control amount of the feedforward system, for example, where the vehicle is traveling at a high speed, the steering wheel turning speed is high, or ABS is operating, it is possible to nullify the braking force control amount of the feedforward system, and maintain the stability of vehicle behavior.

BEST MODE FOR CARRYING OUT THE INVENTION

<First Embodiment>

Before describing a working example of a turning control device for a vehicle according to a first embodiment of the present invention, reference examples thereof are described with reference to the diagrams of FIG. 1 through FIG. 11.

REFERENCE EXAMPLE 1

First, a reference example 1 of the turning control device for a vehicle according to the first embodiment of the present invention is described, with reference to the diagrams of FIG. 1 through FIG. 9.

Figure 1:
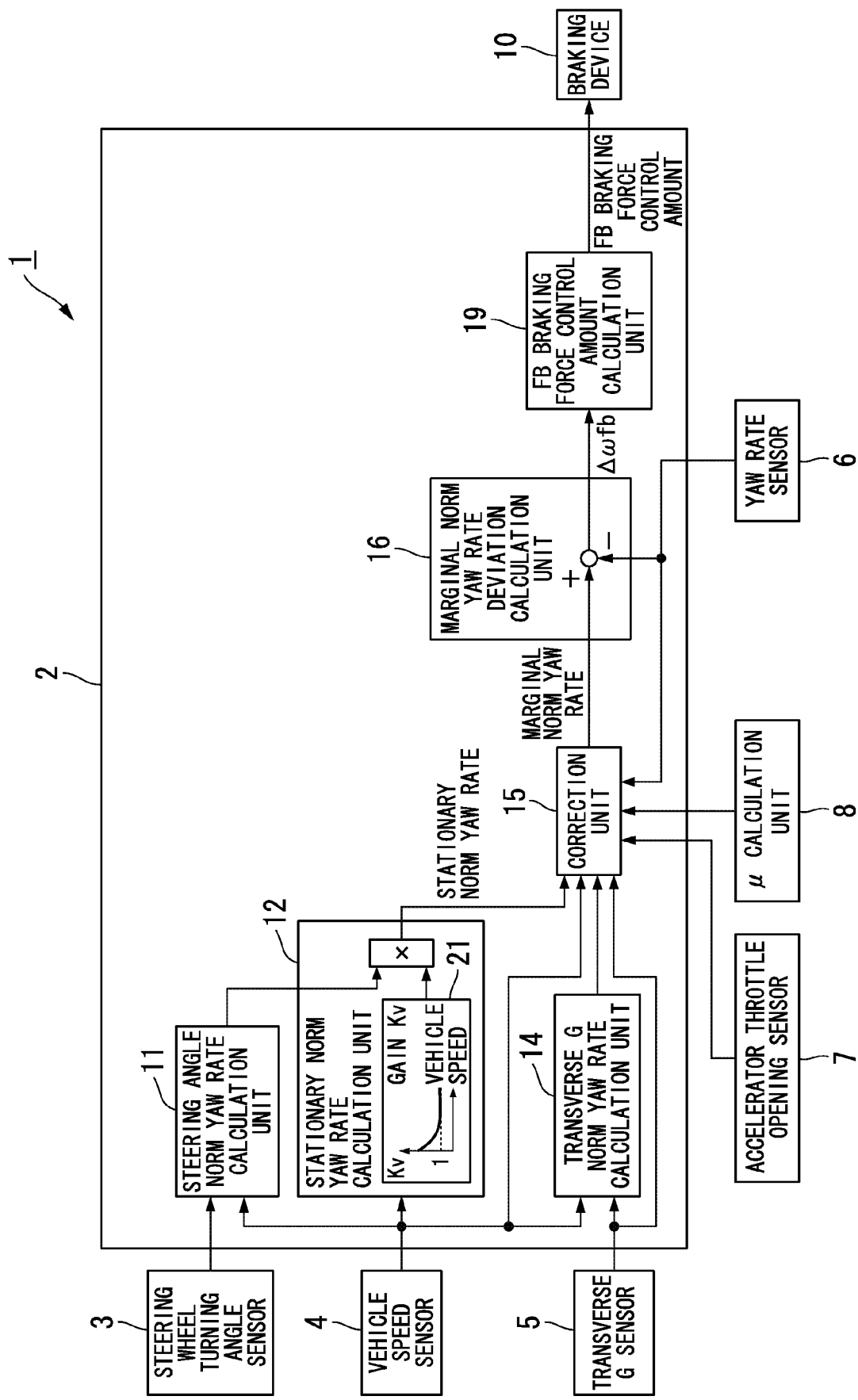
FIG. 1 is a block diagram showing a reference example 1 of a turning control device for a vehicle according to a first embodiment of the present invention.

FIG. 1 is a control block diagram of the turning control device for a vehicle of reference example 1.

The vehicle turning control device 1 is provided with a braking control unit 2 and a braking device 10.

The braking control unit 2 determines a braking force control amount of left and right wheels according to the traveling state of the vehicle, and the braking device 10 controls the braking force of each wheel based on the braking force control amount of each wheel determined by the braking control unit 2.

The braking control unit 2 receives detection signals from; a steering wheel turning angle sensor 3 which detects a steering wheel turning angle (steering wheel turning amount) of the steering wheel of the vehicle, a vehicle speed sensor 4 which detects a vehicle speed, a transverse acceleration sensor 5 (hereunder, referred to as transverse G sensor) which detects a left-right direction (vehicle lateral direction) acceleration of the vehicle (hereunder, referred to as transverse G), a yaw rate sensor 6 which detects a yaw rate of the vehicle, and an accelerator throttle opening sensor 7 which detects an accelerator throttle opening of the vehicle, according to respective detection values. Moreover it receives electric signals, according to a calculated friction coefficient, from a μ calculation unit 8 which calculates a coefficient of friction between the wheels of the vehicle and the road surface.

The braking control unit 2 is provided with; a steering angle norm yaw rate calculation unit 11, a stationary norm yaw rate calculation unit 12, a transverse G norm yaw rate calculation unit 14, a correction unit 15, a marginal yaw rate deviation calculation unit 16, and a feedback braking force control amount calculation unit 19 (hereunder, abbreviated as FB braking force control amount calculation unit).

Figure 2:
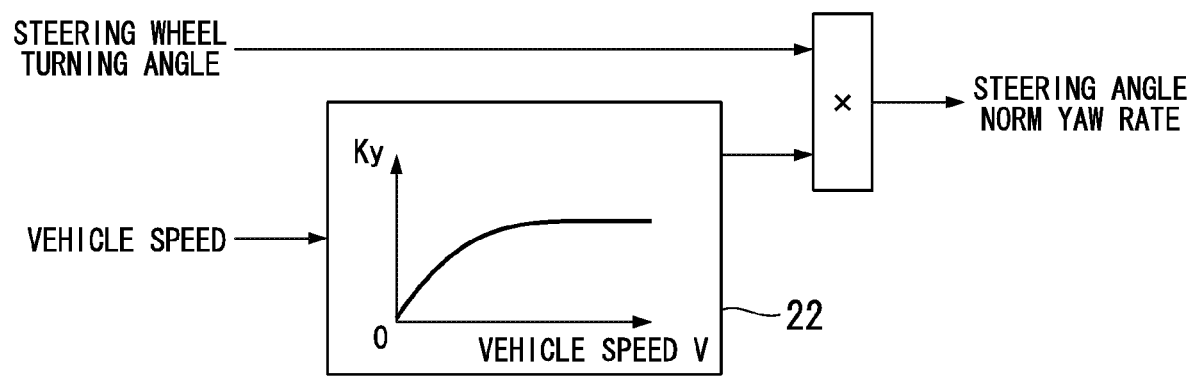
FIG. 2 is a block diagram of a steering angle norm yaw rate calculation.

The steering angle norm yaw rate calculation unit 11 estimates and calculates a steering angle norm yaw rate based on a steering wheel turning angle detected by the steering wheel turning angle sensor 3 and a vehicle speed detected by the vehicle speed sensor 4. Specifically, as shown in FIG. 2, a steering angle norm yaw rate gain Ky according to the vehicle speed is found with reference to a steering angle norm yaw rate gain table 22, and the steering wheel turning angle detected by the steering wheel turning angle sensor 3 is multiplied by the steering angle norm yaw rate gain Ky, to thereby perform this calculation. In the steering angle norm yaw rate gain table 22, the horizontal axis represents vehicle speed and the vertical axis represents steering angle norm yaw rate gain Ky, and it can be experimentally obtained coupled with a tire characteristic. The steering angle norm yaw rate gain table 22 in this reference example 1 is non-linear in that the steering angle norm yaw rate gain Ky increases as the vehicle speed increases, and it converges to a predetermined value. When the driver tries to actively turn the vehicle, the steering wheel turning angle is made greater, and therefore the steering angle norm yaw rate becomes greater. That is to say, when the steering angle norm yaw rate calculated based on the steering angle is great, the level of the steering intention of the driver to turn the vehicle can be estimated as being high.

The stationary norm yaw rate calculation unit 12 makes reference to a stationary norm yaw rate gain table 21 to calculate a stationary norm yaw rate gain Kv according to the vehicle speed, and it calculates a stationary norm yaw rate ω_high by multiplying the steering angle norm yaw rate by the stationary norm yaw rate gain Kv. In the stationary norm yaw rate gain table 21 in this reference example 1, the horizontal axis represents vehicle speed and the vertical axis represents stationary norm yaw rate gain Kv, and it is set so that the stationary norm yaw rate gain Kv converges to 1 as the vehicle speed becomes higher, and the stationary norm yaw rate gain Kv becomes greater as the vehicle speed becomes lower. In this reference example 1, the stationary norm yaw rate ω_high configures a correction reference value, and the stationary norm yaw rate ω_high becomes high gain as the vehicle speed is lower.

The transverse G norm yaw rate calculation unit 14 calculates a transverse G norm yaw rate ω_low based on a transverse G detected by the transverse G sensor 5 and a vehicle speed detected by the vehicle speed sensor 4. The transverse G norm yaw rate ω_low is a yaw rate which can occur at a current transverse G, and it can be expressed as ω_low=Gy/V for example. Here, Gy is a transverse acceleration detection value detected by the transverse G sensor 5, and V is a vehicle speed detected by the vehicle speed sensor 4.

The correction unit 15 calculates a marginal norm yaw rate ω_TAR based on the stationary norm yaw rate ω_high and the transverse G norm yaw rate ω_low. The method of calculating a marginal norm yaw rate ω_TAR in the correction unit 15 is described later.

The marginal yaw rate deviation calculation unit 16 subtracts a yaw rate detected by the yaw rate sensor 6 (actual yaw rate) from the marginal norm yaw rate ω_TAR, to calculate a marginal yaw rate deviation Δωfb.

The FB braking force control amount calculation unit 19 calculates a feedback braking force control amount (abbreviated as FB braking force control amount) based on the marginal yaw rate deviation Δωfb, and outputs it as a command value to the braking device 10.

Next, the method of calculating a marginal norm yaw rate ω_TAR in the correction unit 15 is described, with reference to the diagrams of FIG. 3 through FIG. 8.

Figure 3:
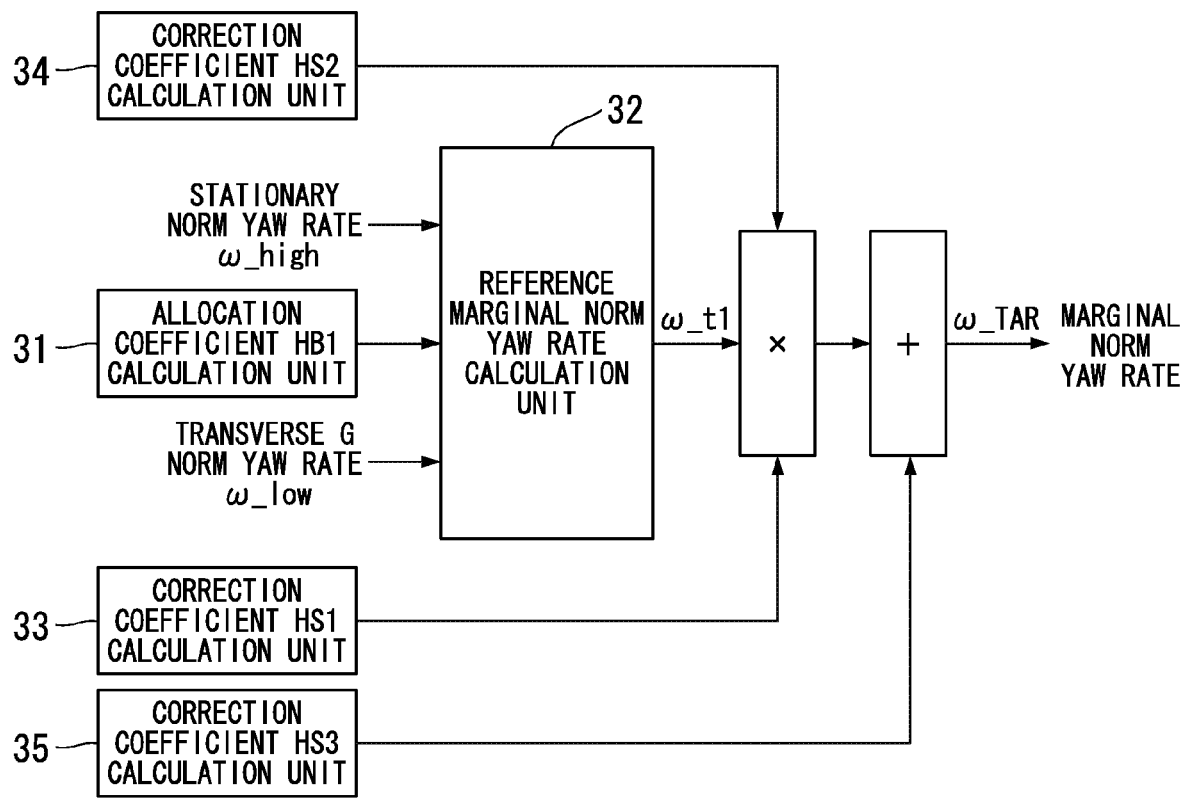
FIG. 3 is a block diagram of a correction unit in reference example 1.

As shown in FIG. 3, the correction unit 15 is provided with; an allocation coefficient HB1 calculation unit 31, a reference marginal norm yaw rate calculation unit 32, a correction coefficient calculation unit 33, a correction coefficient HS2 calculation unit 34, and a correction coefficient HS3 calculation unit 35.

In the correction unit 15, in the reference marginal norm yaw rate calculation unit 32, a reference marginal norm yaw rate ω_t1 is calculated based on an allocation coefficient HB1 calculated by the allocation coefficient HB1 calculation unit 31, the stationary norm yaw rate ω_high, and the transverse G norm yaw rate ω_low. Furthermore, this reference marginal norm yaw rate ω_t1 is multiplied by the correction coefficients HS1 and HS2 calculated respectively by the correction coefficient HS1 calculation unit 33 and the correction coefficient HS2 calculation unit 34, and the correction coefficient HS3 calculated by the correction coefficient HS3 calculation unit 35 is further added thereto, to thereby calculate a marginal norm yaw rate ω_TAR (refer to the following equation (1)).

$$\omega\_TAR = t1 \times HS1 \times HS2 + HS3 \qquad \text{equation (1)}$$

This marginal norm yaw rate ω_TAR serves as a yaw rate target value in feedback control.

To describe in detail, the reference marginal norm yaw rate calculation unit 32 associates the transverse G norm yaw rate ω_low, which served as a target value in feedback control of conventional steering assist braking control, with the stationary norm yaw rate ω_high calculated based on the steering wheel turning angle, and corrects it in the incremental direction, to thereby calculate a reference marginal norm yaw rate ω_t1. Thereby, control of stabilizing the yaw moment occurring in the vehicle body and control of improving steering responsiveness are both achieved.

Figure 4:
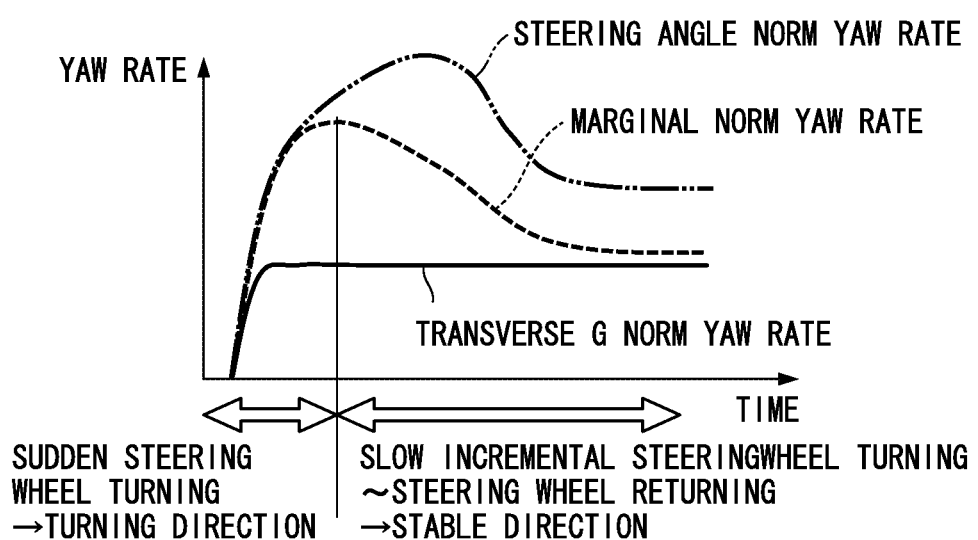
FIG. 4 is a diagram for explaining the relationship between transverse G norm yaw rate, steering angle norm yaw rate, and marginal norm yaw rate.

Here, transverse G norm yaw rate incremental correction is described with reference to FIG. 4. FIG. 4 shows temporal changes in steering angle norm yaw rate and transverse G norm yaw rate from the moment the steering wheel starts to rotate from the state of traveling straight to the moment it is maintained at a predetermined steering wheel turning angle. As shown in the diagram, normally, the steering angle norm yaw rate is greater than the transverse G norm yaw rate. Consequently, as a method of incrementally correcting transverse G norm yaw rate, it is corrected so as to be brought to the vicinity of the steering angle norm yaw rate while adjusting how much it is brought to the vicinity of the steering angle norm yaw rate according to the traveling conditions, and the adjustment device therefor employs a concept of an allocation coefficient of transverse G norm yaw rate and steering angle norm yaw rate.

In this reference example 1, this is further developed, and as a method of incrementally correcting transverse G norm yaw rate, it is corrected so as to be brought to the vicinity of the stationary norm yaw rate ω_high calculated based on the steering angle norm yaw rate.

To describe in detail, in this reference example 1, a reference marginal norm yaw rate ω_t1 is calculated from equation (2) based on the allocation coefficient HB1 calculated by the allocation coefficient HB1 calculation unit 31, the transverse G norm yaw rate ω_low, and the stationary norm yaw rate ω_high (refer to the following equation (2)).

$$\omega\_t1 = HB1 \times \omega\_high + (1-HB1) \times \omega\_low \qquad \text{equation (2)}$$

Here, the allocation coefficient HB1 is a numerical value in a range of 0 to 1, the reference marginal norm yaw rate ω_t1 takes the transverse G norm yaw rate ω_low where HB1=0, and the reference marginal norm yaw rate ω_t1 takes the stationary norm yaw rate ω_high where HB1=1.

Next, the allocation coefficient HB1 calculated by the allocation coefficient HB1 calculation unit 31 is described with reference to FIG. 5.

The allocation coefficient HB1 is calculated by performing a multiplication of an allocation coefficient HB1a calculated according to a vehicle speed, an allocation coefficient HB1b calculated according to a yaw rate change rate, an allocation coefficient HB1c calculated according to a yaw rate deviation integral, and an allocation coefficient HB1d calculated according to a steering wheel rotation speed (refer to the following equation (3)).

$$HB1 = HB1a \times HB1b \times HB1c \times HB1d \qquad \text{equation (3)}$$

Figure 5:
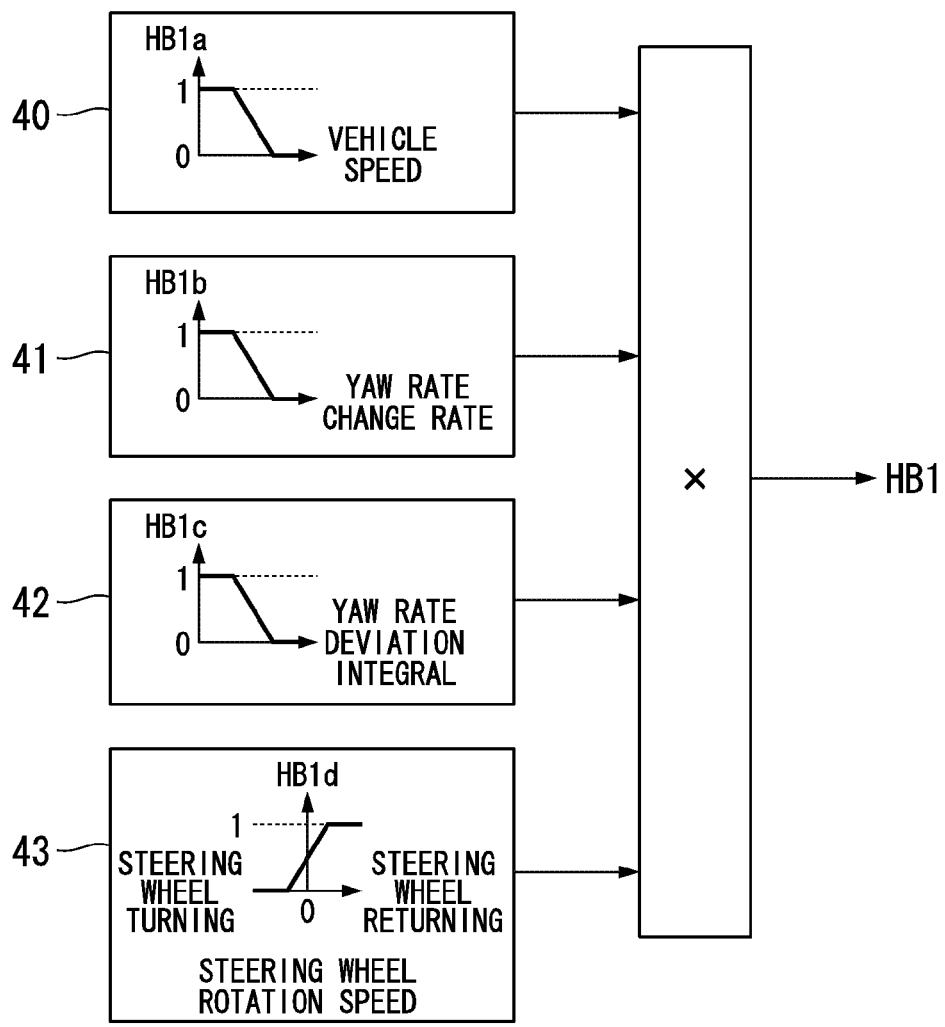
FIG. 5 is a diagram for explaining a method of calculating a distribution factor HB1 in reference example 1.

The respective allocation coefficients HB1a, HB1b, HB1c, and HB1d are each calculated with reference to allocation coefficient tables 40, 41, 42, and 43 shown in FIG. 5. Each of the allocation coefficient tables 40, 41, 42, and 43 in this reference example 1 is described.

In the allocation coefficient table 40 for calculating an allocation coefficient HB1a, the horizontal axis represents vehicle speed, and the vertical axis represents allocation coefficient HB1a. This allocation coefficient table 40 is such that HB1a is constant at HB1a=1 in a low speed range, the allocation coefficient HB1a gradually becomes lower as the vehicle speed increases when the vehicle speed is greater than or equal to a predetermined value, and it becomes constant at HB1a=0 in a high speed range. As a result, by increasing the marginal norm yaw rate ω_TAR serving as a target value in the FB braking force control amount calculation unit 19 when the vehicle speed is low, and by keeping the marginal norm yaw rate ω_TAR serving as a target value in the FB braking force control amount calculation unit 19 from increasing when the vehicle speed is high, it is possible to ensure the stability of vehicle behavior.

In the allocation coefficient table 41 for calculating an allocation coefficient HB1b, the horizontal axis represents yaw rate change rate, and the vertical axis represents allocation coefficient HB1b. This allocation coefficient table 41 is such that HB1b is constant at HB1b=1 in a range where the yaw rate change rate is low, the allocation coefficient HB1b gradually becomes smaller as the yaw rate change rate becomes higher when the yaw rate change rate is greater than or equal to a predetermined value, and HB1$b$ becomes constant at HB1$b$=0 in a range where the yaw rate change rate is high. Here, the yaw rate change rate is a temporal change in the actual yaw rate detected by the yaw rate sensor 6, and it can be calculated by time-differentiating the actual yaw rate. For example, when a vehicle is performing an intensive slalom driving or vehicle behavior is unstable, a high yaw rate change rate is observed.

Since the marginal norm yaw rate ω_TAR serving as the target value in the FB braking force control amount calculation unit 19 should not be made high in this type of case, when the yaw rate change rate is high, the allocation coefficient HB1$b$ is set to take a small value so that the marginal norm yaw rate ω_TAR will not become high.

In the allocation coefficient table 42 for calculating an allocation coefficient HB1$c$, the horizontal axis represents yaw rate deviation integral value, and the vertical axis represents allocation coefficient HB1$c$. This allocation coefficient table 42 is such that HB1$c$ is constant at HB1$c$=1 in a range where the yaw rate deviation integral value is small, the allocation coefficient HB1$c$ gradually becomes smaller as the yaw rate deviation integral value becomes higher when the yaw rate deviation integral value is greater than or equal to a predetermined value, and HB1$c$ becomes constant at HB1$c$=0 in a range where the yaw rate deviation integral value is large. Here, the yaw rate deviation integral value is a value obtained by integrating a deviation between the marginal norm yaw rate and the actual yaw rate detected by the yaw rate sensor 6, that is, the marginal yaw rate deviation Δωfb, since the steering operation started. For example, in a case where although the marginal yaw rate deviation Δωfb is small, this state is maintained for a long period of time, the yaw rate deviation integral value becomes large. In this type of case, there is a possibility that the vehicle may be slowly and gradually going into a spinning state, and therefore, the marginal norm yaw rate ω_TAR, which is the target value in the FB braking force control amount calculation unit 19, should not be made large. Consequently, the allocation coefficient HB1$c$ is set to take a small value when the yaw rate deviation integral value is large, so that the marginal norm yaw rate ω_TAR will not be made large.

In the allocation coefficient table 43 for calculating an allocation coefficient HB1$d$, the horizontal axis represents steering wheel rotation speed, and the vertical axis represents allocation coefficient HB1$d$.

This allocation coefficient table 43 is set such that the allocation coefficient HB1$d$ becomes greater as the steering wheel rotation speed becomes greater, and the allocation coefficient HB1$d$ becomes greater in the case where the steering wheel rotation speed is positive than in the case where the steering wheel rotation speed is negative. Here, the steering wheel rotation speed is a value determined based on the amount of temporal change in the steering wheel turning angle detected by the steering wheel turning angle sensor 3, and the steering angle, and it can be calculated by time-differentiating the steering wheel turning angle and comparing it with the steering angle. A case of positive steering wheel rotation speed refers to a moment at which in a state where the steering wheel is operated to rotate in the direction of moving away from the neutral position (straight-ahead direction position), a temporal change amount toward the same direction is occurring, and a moment at which in a state where the steering wheel is operated to rotate toward the neutral position (straight-ahead direction position), a temporal change amount toward the same direction is occurring. A case of negative steering wheel rotation speed refers to a moment at which in a state where the steering wheel is operated to rotate in the direction of moving away from the neutral position (straight-ahead direction position), a temporal change amount in the direction toward the neutral position is occurring, and a moment at which in a state where the steering wheel is operated to rotate in the direction of returning to the neutral position, a temporal change amount in the direction of moving away from the neutral position is occurring.

When the steering wheel rotation speed is positive, the level of the steering intention of the driver to significantly turn the vehicle can be estimated as being high, and therefore, the allocation coefficient HB1$d$ is set to take a greater value as the steering wheel rotation speed is higher (the maximum value is constant at HB1$d$=1), so that the marginal norm yaw rate ω_TAR becomes greater. Thereby, the level of steering responsiveness is improved. On the other hand, when the steering wheel rotation speed is negative, the state can be estimated that the driver intends to converge the operation, and therefore, the allocation coefficient HB1$d$ is set to take a smaller value as the absolute value of the steering wheel rotation speed becomes greater (the minimum value is constant at HB1$d$=1), so that the marginal norm yaw rate ω_TAR will not be large.

As a result, the responsiveness of the steering wheel when avoiding a front obstacle or changing lanes is improved.

The allocation coefficient HB1$d$ may be calculated based on a steering wheel rotation angle (steering wheel rotation amount) instead of a steering wheel rotation speed. This is because the level of the intention of the driver to actively turn the vehicle can be estimated as being high when the steering wheel rotation angle is great. In this case, a steering wheel rotation angle is synonymous with a steering wheel turning angle.

Next, the correction coefficient HS1 calculated by the correction coefficient HS1 calculation unit 33 is described with reference to FIG. 6.

This correction coefficient HS1 is a correction coefficient which assumes a situation where the driver rotates the steering wheel while a frontal load is being applied to the vehicle to thereby perform a vehicle turning operation.

Figure 6:
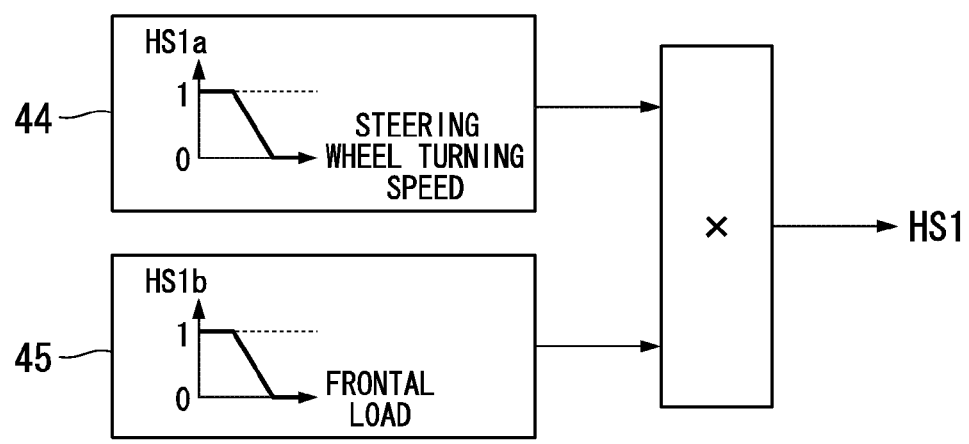
FIG. 6 is a diagram for explaining a method of calculating a correction factor HS1 in reference example 1.

As shown in FIG. 6, a correction coefficient HS1 is calculated by multiplying a correction coefficient HS1$a$ calculated according to a steering wheel turning speed by a correction coefficient HS1$b$ calculated according to the frontal load on the vehicle (refer to the following equation (4)).

$$HS1 = HS1a \times HS1b \qquad \text{equation (4)}$$

A vehicle frontal load refers to an amount of load shift toward the front of the vehicle, and, for example, it can be estimated based on a forward-backward acceleration sensor (not shown in the figure) for detecting acceleration in the front-rear direction of the vehicle. In this case, the forward-backward acceleration sensor may be referred to as a load shift amount estimation device which estimates the amount of load shift in the front-rear direction.

The respective correction coefficients HS1$a$ and HS1$b$ are calculated, with reference to correction coefficient tables 44 and 45 each shown in FIG. 6. The correction coefficient tables 44 and 45 in this reference example 1 are described.

In the correction coefficient table 44 for calculating a correction coefficient HS1$a$, the horizontal axis represents steering wheel turning speed, and the vertical axis represents correction coefficient HS1$a$. This correction coefficient HS1$a$ table 44 is such that HS1$a$ is constant at HS1$a$=1 in a range where the steering wheel turning speed is low, the correction coefficient HS1$a$ gradually becomes smaller as the steering wheel turning speed becomes higher when the steering wheel turning speed is greater than or equal to a predetermined value, and HS1*a* becomes constant at HS1*a*=0 in a range where the steering wheel turning speed is high.

In the correction coefficient table 45 for calculating a correction coefficient HS1*b*, the horizontal axis represents frontal load (load shift amount toward the front of the vehicle), and the vertical axis represents correction coefficient HS1*b*. This correction coefficient HS1*b* table 45 is such that HS1*b* is constant at HS1*b*=1 in a range where the frontal load is low, the correction coefficient HS1*b* gradually becomes smaller as the frontal load becomes higher when the frontal load is greater than or equal to a predetermined value, and HS1*b* becomes constant at HS1*b*=0 in a range where the frontal load is high.

As described above, the vehicle can be turned more easily if the steering wheel is rotated with a frontal load being applied to the vehicle. However, vehicle behavior is likely to become unstable as the level of the frontal load becomes greater, and vehicle behavior is likely to become unstable as the steering wheel turning speed becomes higher. The correction coefficient HS1 is a correction coefficient for adjusting the marginal norm yaw rate $\omega\_TAR$ at the time of performing this type of steering operation.

As a result of calculating the correction coefficient HS1 as described above, the correction coefficient HS1 takes 1 in a range where the steering wheel turning speed is low and the frontal load is low, and therefore, the marginal norm yaw rate $\omega\_TAR$ can be made high, and the level of turnability can be improved. In contrast, the correction coefficient HS1 becomes smaller than 1 as the steering wheel turning speed and the frontal load become greater, and therefore, the marginal norm yaw rate $\omega\_TAR$ can be made low, and the stability of vehicle behavior can be ensured.

Next, the correction coefficient HS2 calculated by the correction coefficient HS2 calculation unit 34 is described.

This correction coefficient HS2 is a correction coefficient which assumes a case where a lane-change (an operation of returning the steering wheel to the original traveling direction immediately after operating the steering wheel) is performed on the road surface when the friction coefficient between the wheels and the road surface (hereunder, abbreviated as μ) is high (hereunder, abbreviated as high μ road surface).

The correction coefficient HS2 is a type of gain constituted such that, with 1 being the maximum value, a predetermined decrement count value is subtracted from the initial value when conditions below are met, and a predetermined increment count value is added to 1 when none of the conditions below is met. The predetermined decrement count value is subtracted when the following conditions are met: (a) when the friction coefficient μ is determined as being high (or when front-rear direction or transverse direction acceleration corresponding to traveling on a road surface with a high friction coefficient is detected); (b) when the steering wheel turning angle is determined as being large; (c) when the transverse G decrement rate is determined as being high; and (d) when the yaw rate decrement rate is determined as being high. Among the above conditions, at least one or more of (a) through (d) may be arbitrarily combined. When taking into consideration the vehicle behavior convergence particularly when the friction coefficient is high, it is preferable that (a) and any one of (b) through (d) are combined to be used.

The friction coefficient μ is calculated by the μ calculation unit 8. Moreover, a transverse G decrement rate is a decremental speed of transverse G, and it can be calculated based on a transverse G detected by the transverse G sensor 5. A yaw rate decrement rate is a decrement speed of an actual yaw rate detected by the yaw rate sensor 6.

Figure 7:
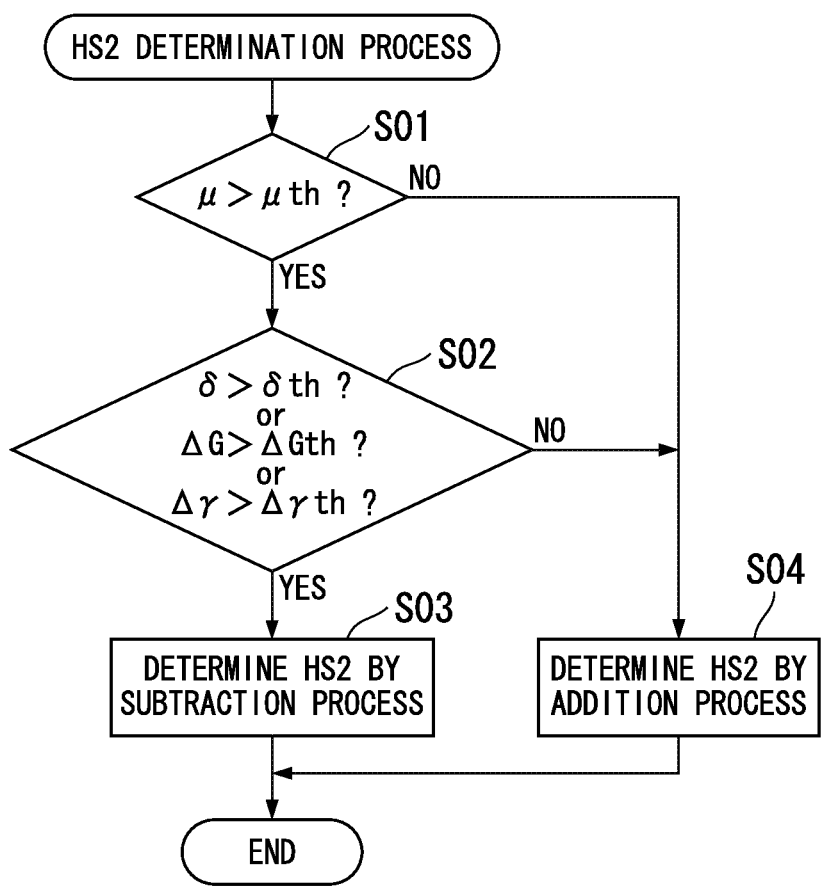
FIG. 7 is a flow chart showing a process for determining a correction factor HS2 in reference example 1.

An example of a process of determining a correction coefficient HS2 is described according to the flow chart of FIG. 7.

First, in step S01, it is determined whether or not the friction coefficient μ is greater than the threshold value μth.

If the result of the determination in step S01 is "YES" (μ>μth), the flow proceeds to step S02, where it is determined whether or not at least one of the following conditions is satisfied: whether the steering wheel turning angle δ is greater than the threshold value δth (δ>δth); whether the transverse G decrement rate ΔG is greater than the threshold value ΔGth (Δ>ΔGth); and whether the yaw rate decrement rate γ is greater than the threshold value γth (γ>γth).

If the result of the determination in step S02 is "YES", the flow proceeds to step S03 where a correction coefficient HS2 is determined by means of a subtraction process, and then the execution of this routine ends once. This subtraction process repeatedly subtracts a predetermined subtraction count value from the initial value of the correction coefficient HS2, so that the correction coefficient HS2 converges to 0.

On the other hand, in the case where the result of the determination in step S01 is "NO" (μ≤μth), and in the case where the result of the determination in step S02 is "NO", the flow proceeds to step S04 to determine a correction coefficient HS2 by means of an addition process, and the execution of this routine ends once. This addition process repeatedly adds a predetermined increment count value so that the correction coefficient HS2 converges to 1.

The initial value of the correction coefficient HS2 is a predetermined value between 0 and 1.

In the case where the yaw rate and the transverse G rapidly decrease when changing lanes on a high-μ road surface, a large yaw rate may occur in the direction opposite of the intended traveling direction as a result of steering. At this time, if the marginal norm yaw rate $\omega\_TAR$ is made greater, there is a possibility that the traceability of the vehicle with respect to steering may be deteriorated. The correction coefficient HS2 is to suppress this. That is to say, in the case where the friction coefficient μ, the steering wheel turning angle, the transverse G decrement rate, and the yaw rate decrement rate are large, by setting the correction coefficient HS2 to take a small value, the marginal norm yaw rate $\omega\_TAR$ is kept from becoming large, and thereby the level of yaw rate convergence after lane changing is improved.

Next, the correction coefficient HS3 calculated by the correction coefficient HS3 calculation unit 35 is described with reference to FIG. 8.

This correction coefficient HS3 is a correction coefficient which assumes a situation where the driver performs a tuck-in. The tuck-in refers to a phenomenon in which the vehicle moves onto the inner side of a turn with a frontal force being applied to the vehicle when the accelerator pedal is suddenly returned while the vehicle is turning. Some drivers may utilize this phenomenon to actively perform turning operations in some cases. However, this turning operation with use of the tuck-in is likely to result in instability of vehicle behavior when the accelerator throttle is opened from the moment where the amount of torque requested for the vehicle is large (in other words, where the accelerator throttle opening is large), or when the vehicle speed is high. The correction coefficient HS3 is a correction coefficient for adjusting the marginal norm yaw rate $\omega\_TAR$ at the time of performing the tuck-in.

Figure 8:
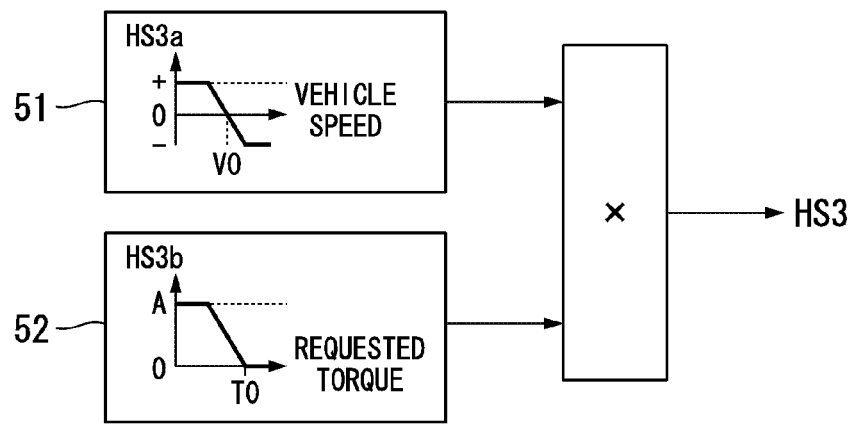
FIG. 8 is a diagram for explaining a method of calculating a correction factor HS3 in reference example 1.

As shown in FIG. 8, a correction coefficient HS3 is calculated by multiplying a correction coefficient HS3*a* calculated according to a vehicle speed by a correction coefficient HS3*b* calculated according to a requested torque of the vehicle (refer to the following equation (5)).

$$HS3 = HS3a \times HS3b \qquad \text{equation (5)}$$

The requested torque of the vehicle can be calculated from the accelerator throttle opening detected by the accelerator throttle opening sensor 7.

The respective correction coefficients HS3*a* and HS3*b* are calculated, with reference to correction coefficient tables 51 and 52 each shown in FIG. 8. The correction coefficient tables 51 and 52 in this reference example 1 are described.

In the correction coefficient table 51 for calculating a correction coefficient HS3*a*, the horizontal axis represents vehicle speed, and the vertical axis represents correction coefficient HS3*a*. This correction coefficient HS3*a* table 51 is such that HS3*a* takes a constant positive value in a range where the vehicle speed is lower than a predetermined value, the correction coefficient HS3*a* gradually becomes smaller as the vehicle speed becomes higher when the vehicle speed is greater than or equal to the predetermined value, it takes a negative value when the vehicle speed exceeds a predetermined speed V0, and it takes a constant negative value in a range where the vehicle speed is significantly high.

In the correction coefficient table 52 for calculating a correction coefficient HS3*b*, the horizontal axis represents requested torque of the vehicle, and the vertical axis represents correction coefficient HS3*b*. This correction coefficient HS3*b* table 52 is such that HS3*b* takes a positive value in a range where the requested torque is lower than a predetermined value T0, and the correction coefficient is HS3*b*=0 in a range where the requested torque is greater than or equal to the predetermined value T0. Here, the predetermined value T0 is an extremely small value, and it is set for a requested torque corresponding to the moment where the accelerator throttle opening is close to zero, for example.

By setting the correction coefficient tables 51 and 52 in this manner, in the case where the requested torque is greater than or equal to the predetermined value T0 (that is, where the state is determined as not being tuck-in), the correction coefficient HS3 takes 0 regardless of the vehicle speed, so that the marginal norm yaw rate $\omega\_TAR$ will not be corrected.

Moreover, in the case where the requested torque is less than or equal to the predetermined value T0 (that is, where the state is determined as being tuck-in), since the correction coefficient HS3 takes a positive value when the vehicle speed is lower than V0, the marginal norm yaw rate $\omega\_TAR$ can be made large, and since the correction coefficient HS3 takes a negative value when the vehicle speed is greater than or equal to V0, the marginal norm yaw rate $\omega\_TAR$ can be made small. Furthermore, in the case where the vehicle speed is lower than V0, when the requested torque is the same, the correction coefficient H3 is set to take a larger positive value as the vehicle speed becomes lower, and thereby the marginal norm yaw rate $\omega\_TAR$ can be made large. As a result, it is possible to improve the level of turnability at the time of tuck-in where the vehicle speed is in a range of low to medium speed. On the other hand, in the case where the vehicle speed is higher than or equal to V0, when the requested torque is the same, the correction coefficient H3 is set to take a larger positive value as the vehicle speed becomes higher, and thereby the marginal norm yaw rate $\omega\_TAR$ can be made small.

Figure 9:
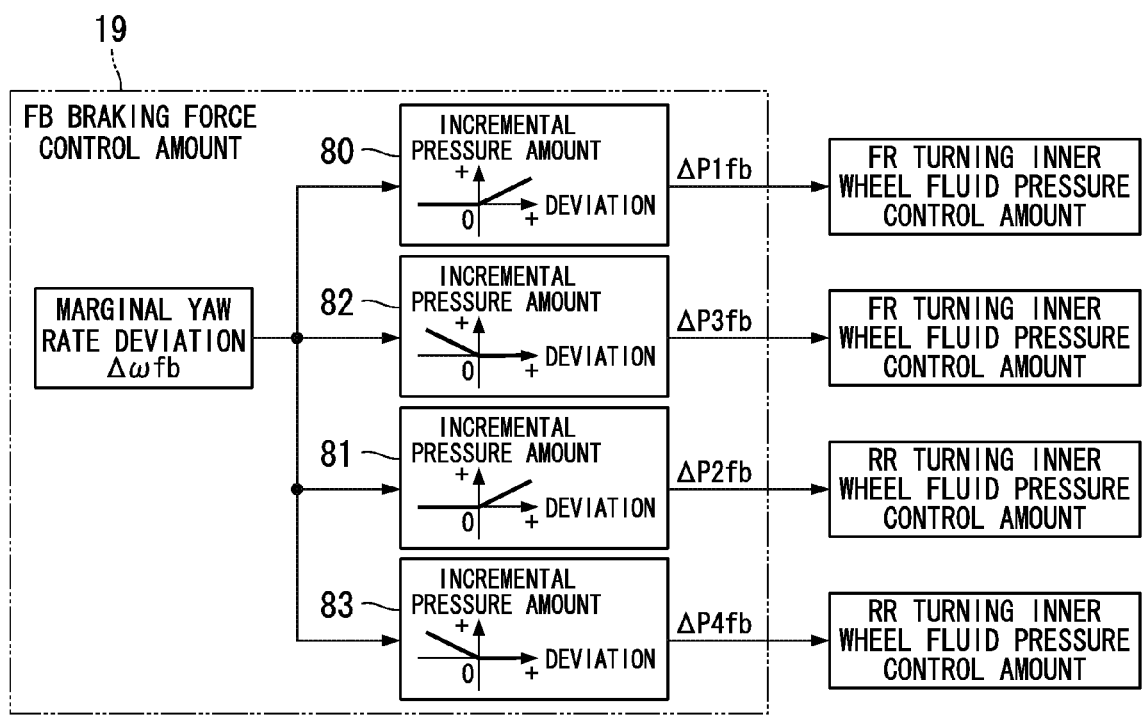
FIG. 9 is a block diagram of a braking force control amount calculation in reference example 1.

Next, with reference to FIG. 9, there is described calculation of a braking force control amount to be performed in the FB braking force control amount calculation unit 19 (that is, an FB braking force control amount).

In the FB braking force control amount calculation unit 19, based on the marginal yaw rate deviation $\Delta\omega fb$ calculated by the marginal yaw rate deviation calculation unit 16, there are calculated an FB incremental pressure amount $\Delta P1fb$ of the turning inner wheel on the front wheel side (hereunder, abbreviated as FR turning inner wheel), an FB incremental pressure amount $\Delta p3fb$ of the turning outer wheel on the front wheel side (hereunder, abbreviated as FR turning outer wheel), an FB incremental pressure amount $\Delta P2fb$ of the turning inner wheel on the rear wheel side (hereunder, abbreviated as RR turning inner wheel), and an FB incremental pressure amount $\Delta P4fb$ of the turning outer wheel on the rear wheel side (hereunder, abbreviated as RR turning outer wheel). The subsequent turning direction is described with an example of a case where the deviation $\Delta\omega fb$ is positive, and the norm yaw rate and the actual yaw rate are both positive.

The FB incremental pressure amount $\Delta P1fb$ of the FR turning inner wheel is calculated based on the marginal yaw rate deviation $\Delta\omega fb$, with reference to the incremental pressure amount table 80. In the incremental pressure amount table 80, the horizontal axis represents marginal yaw rate deviation $\Delta\omega fb$, and the vertical axis represents FB incremental pressure amount $\Delta P1fb$. In this reference example 1, in the case where the marginal yaw rate deviation $\Delta\omega fb$ is not more than 0, the FB incremental pressure amount $\Delta P1fb$ is 0, and when the marginal yaw rate deviation $\Delta\omega fb$ is not less than 0, the FB incremental pressure amount $\Delta P1fb$ increases as the marginal yaw rate deviation $\Delta\omega fb$ becomes greater.

The FB incremental pressure amount $\Delta P2fb$ of the RR turning inner wheel is calculated based on the marginal yaw rate deviation $\Delta\omega fb$, with reference to the incremental pressure amount table 81. In the incremental pressure amount table 81, the horizontal axis represents marginal yaw rate deviation $\Delta\omega fb$, and the vertical axis represents FB incremental pressure amount $\Delta P2fb$. In this reference example 1, in the case where the marginal yaw rate deviation $\Delta\omega fb$ is not more than 0, the FB incremental pressure amount $\Delta P2fb$ is 0, and when the marginal yaw rate deviation $\Delta\omega fb$ is not less than 0, the FB incremental pressure amount $\Delta P2fb$ increases as the marginal yaw rate deviation $\Delta\omega fb$ becomes greater.

The FB incremental pressure amount $\Delta P3fb$ of the FR turning outer wheel is calculated based on the marginal yaw rate deviation $\Delta\omega fb$, with reference to the incremental pressure amount table 82. In the incremental pressure amount table 82, the horizontal axis represents marginal yaw rate deviation $\Delta\omega fb$, and the vertical axis represents FB incremental pressure amount $\Delta P3fb$. In this reference example 1, in the case where the marginal yaw rate deviation $\Delta\omega fb$ is not less than 0, the FB incremental pressure amount $\Delta P3fb$ is 0, and when the marginal yaw rate deviation $\Delta\omega fb$ is not more than 0, the FB incremental pressure amount $\Delta P3fb$ increases as the absolute value of the marginal yaw rate deviation $\Delta\omega fb$ becomes greater.

The FB incremental pressure amount $\Delta P4fb$ of the RR turning outer wheel is calculated based on the marginal yaw rate deviation $\Delta\omega fb$, with reference to the incremental pressure amount table 83. In the incremental pressure amount table 83, the horizontal axis represents marginal yaw rate deviation $\Delta\omega fb$, and the vertical axis represents FB incremental pressure amount $\Delta P4fb$. In this reference example 1, in the case where the marginal yaw rate deviation $\Delta\omega fb$ is not less than 0, the FB incremental pressure amount $\Delta P4fb$ is 0, and when the marginal yaw rate deviation $\Delta\omega fb$ is not more than 0, the FB incremental pressure amount $\Delta P4fb$ increases as the absolute value of the marginal yaw rate deviation $\Delta\omega fb$ becomes greater.

That is to say, in the FB braking force control amount calculation unit 19, in the case where the marginal yaw rate deviation $\Delta\omega fb$ is not less than 0, since the actual yaw rate is smaller than the marginal norm yaw rate, the FB braking force control amount of each wheel is set in the direction of increasing the yaw rate (in other words, in the direction of nullifying the marginal yaw rate deviation Δωfb). Specifically, the FB incremental pressure amount is set in the direction of increasing the brake fluid pressure of the FR turning inner wheel and the RR turning inner wheel, and the FB incremental pressure amount is set so as not to increase the brake fluid pressure of the FR turning outer wheel and the RR turning outer wheel.

On the other hand, in the case where the marginal yaw rate deviation Δωfb is not more than 0, since the actual yaw rate is greater than the marginal norm yaw rate, the FB braking force control amount of each wheel is set in the direction of reducing the yaw rate (in other words, in the direction of nullifying the marginal yaw rate deviation Δωfb). Specifically, the FB incremental pressure amount is set in the direction of increasing the brake fluid pressure of the FR turning outer wheel and the RR turning outer wheel, and the FB incremental pressure amount is set so as not to increase the brake fluid pressure of the FR turning inner wheel and the RR turning inner wheel.

The FB braking force control amount calculation unit 19 outputs the FB incremental pressure amount ΔP1fb of the FR turning inner wheel, the FB incremental pressure amount ΔP2fb of the RR turning inner wheel, the FB incremental pressure amount ΔP3fb of the FR turning outer wheel, and the FB incremental pressure amount ΔP4fb of the RR turning outer wheel, to the braking device 10.

The braking device 10 controls the braking pressure of each wheel according to the input control amount of each wheel.

According to the turning control device for a vehicle of this reference example 1, the correction unit 15 corrects the transverse G norm yaw rate ω_low in the incremental direction while associating it with the stationary norm yaw rate ω_high calculated based on the steering wheel turning angle, and calculates the marginal norm yaw rate ω_TAR. Therefore, control of stabilizing the yaw moment occurring in the vehicle body, and control of improving steering responsiveness can both be realized. As a result, the turning intention of the driver is responsively reflected, and the feel of steering is improved.

Moreover, since the transverse G norm yaw rate ω_low is corrected in the incremental direction to set the marginal norm yaw rate ω_TAR, it is possible to increase the target value in the FB braking force control amount calculation unit 19, and the level of turnability is improved. As a result, it is possible to turn the vehicle along the traveling path, and the level of road surface tracking performance (traceability) is improved.

REFERENCE EXAMPLE 2

Figure 10:
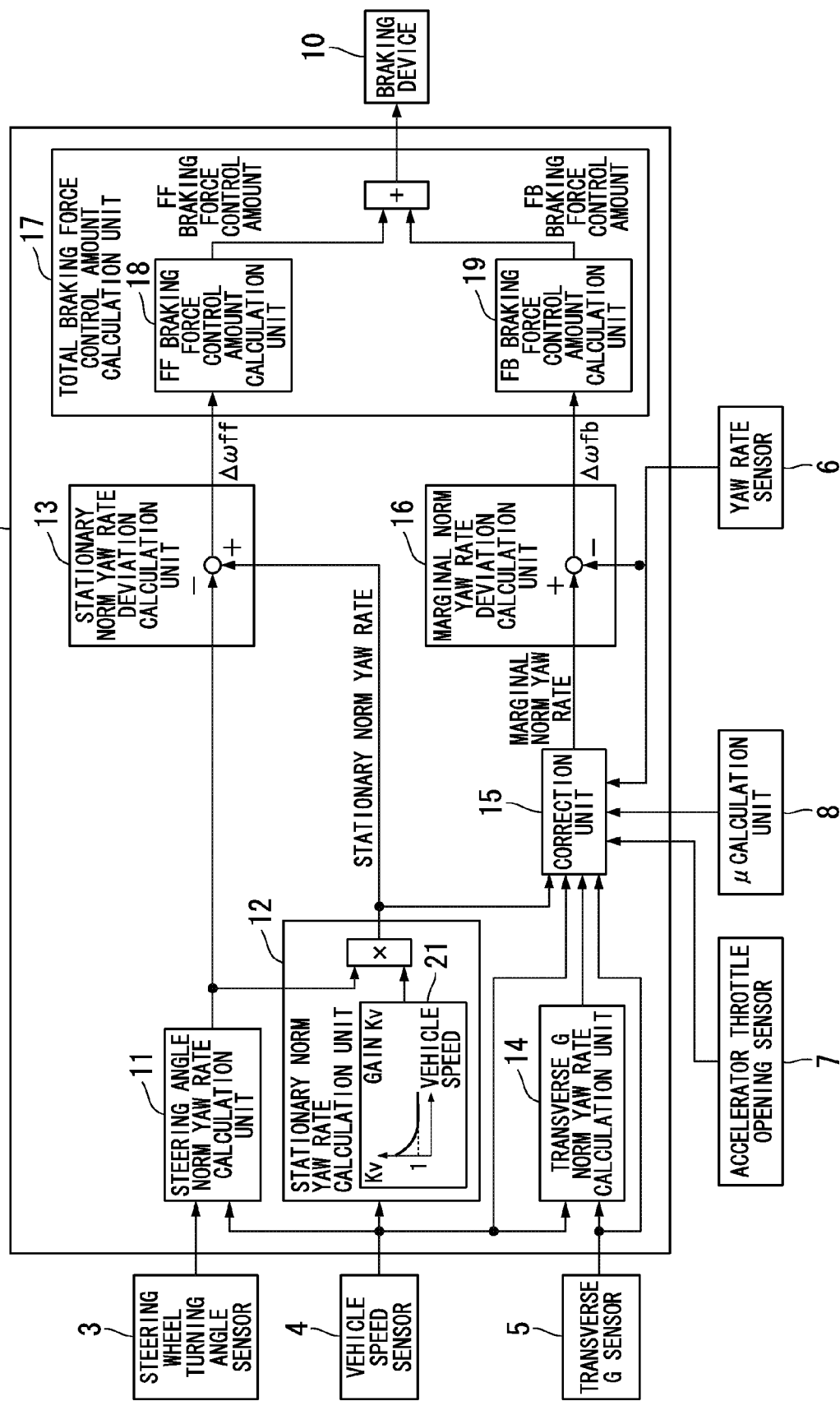
FIG. 10 is a block diagram showing a reference example 2 of the turning control device for a vehicle according to the first embodiment of the present invention.
Figure 11:
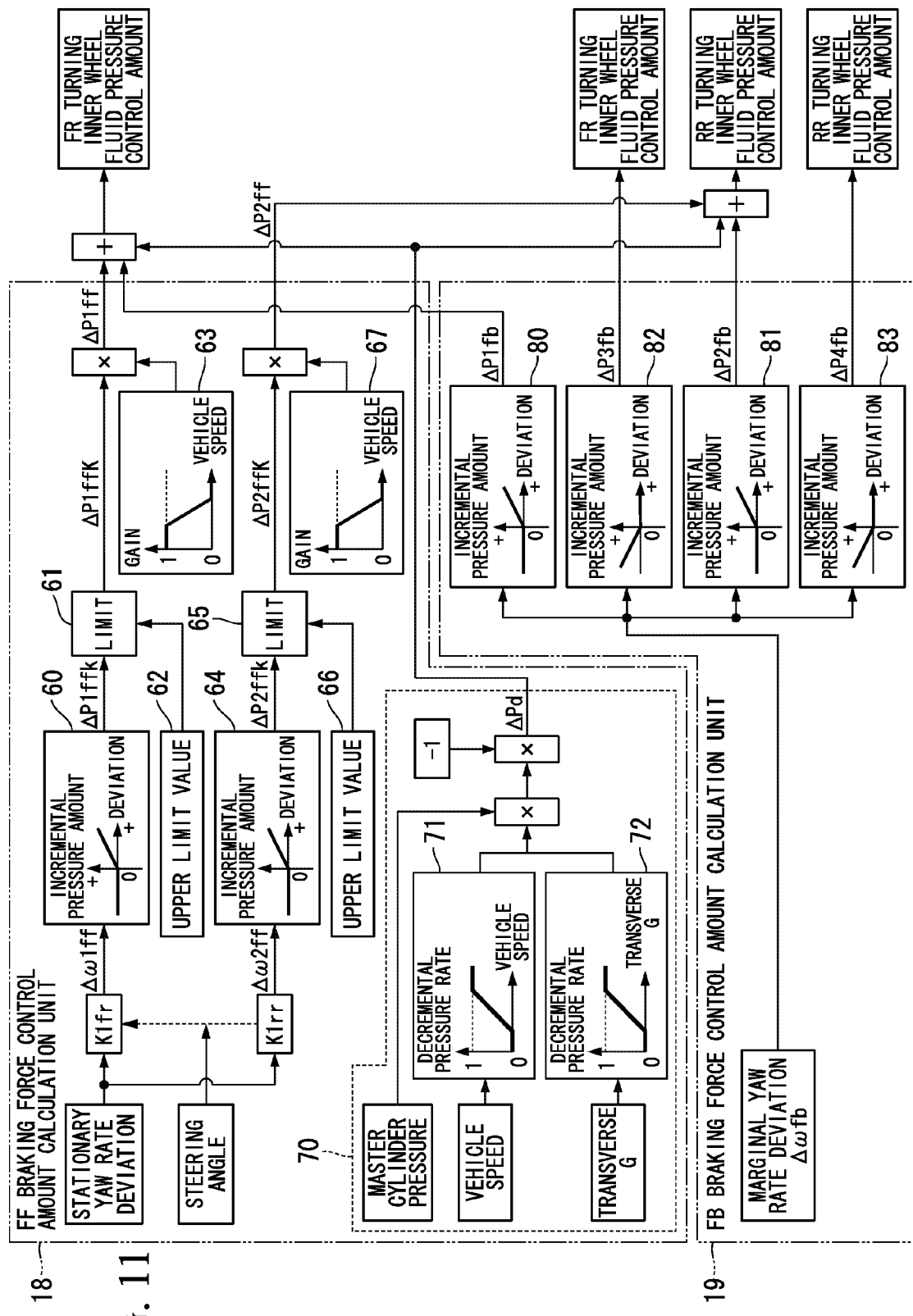
FIG. 11 is a block diagram of a braking force control amount calculation in reference example 2.

Next, a reference example 2 of the turning control device for a vehicle according to the first embodiment of the present invention is described, with reference to the diagrams of FIG. 10 and FIG. 11.

FIG. 10 is a control block diagram of the turning control device for a vehicle of reference example 2. In the turning control device for a vehicle of reference example 1 described above, a control amount (FB braking force control amount) is found in the direction of nullifying the deviation between the marginal norm yaw rate ω_TAR and the actual yaw rate (that is, the marginal yaw rate deviation Δωfb), and the braking pressure is controlled only with this FB braking force control amount. However, in the turning control device of reference example 2, a feedforward braking force control amount (hereunder, abbreviated as FF braking force control amount) is calculated based on a steering wheel turning angle and a vehicle speed, and a value obtained as a sum of the FB braking force control amount and the FF braking force control amount is taken as a total braking force control amount, and the braking pressure of each wheel is controlled based on this total braking force control amount.

Hereunder, the turning control device for a vehicle of reference example 2 is described. However, in the control block diagram of FIG. 10, the feedback control system, that is, the steering angle norm yaw rate calculation unit 11, the stationary norm yaw rate calculation unit 12, the transverse G norm yaw rate calculation unit 14, the correction unit 15, the marginal yaw rate deviation calculation unit 16, and the FB braking force control amount calculation unit 19 are the same as those of reference example 1. Therefore, the same aspect portions are given the same reference symbols and descriptions thereof are omitted, and a feedforward control system, which is different from reference example 1, is primarily described.

The turning control device 1 for a vehicle in reference example 2 is provided with, in addition to the configuration of the turning control device 1 for a vehicle of reference example 1, as a feedforward control system, a stationary yaw rate deviation calculation unit 13 and a feedforward braking force control amount calculation unit 18 (hereunder, abbreviated as FF braking force control amount calculation unit). The FF braking force control amount calculation unit 18, and the FB braking force control amount calculation unit 19 in reference example 1 configure a total braking force control amount calculation unit 17.

The stationary yaw rate deviation calculation unit 13 receives an input of a steering angle norm yaw rate in which a temporal change amount leveling process or a peak hold process or the like has been performed on the steering angle norm yaw rate calculated by the steering angle norm yaw rate calculation unit 11 to remove noise therefrom. The stationary yaw rate deviation calculation unit 13 subtracts the steering angle norm yaw rate after the noise removal from the stationary norm yaw rate ω_high, to calculate a stationary yaw rate deviation Δωff.

The total braking force control amount calculation unit 17 is such that: in the FF braking force control amount calculation unit 18, an FF braking force control amount is calculated based on the stationary yaw rate deviation Δωff; in the FB braking force control amount calculation unit 19, an FB braking force control amount is calculated based on the marginal yaw rate deviation Δωfb; further, the FF braking force control amount and the FB braking force control amount are added to calculate a total braking force control amount; and it is output as a command value to the braking device 10.

Next, a braking control amount calculation to be performed in the total braking force control amount calculation unit 17 is described, with reference to FIG. 11.

An FF braking force control amount calculation in the FF braking force control amount calculation unit 18 is described.

First, incremental pressure allocations for the FR turning inner wheel and the RR turning inner wheel are determined based on a steering wheel turning angle detected by the steering wheel turning angle sensor 3, and an incremental pressure coefficient K1*fr* for the FR turning inner wheel and an incremental pressure coefficient K1*rr* for the RR turning inner wheel are calculated based on these incremental pressure allocations. Here, in the case where the load shift due to the steering operation is large, the incremental pressure coefficient K1*fr* for the FR turning inner wheel may be set to become greater according to the steering wheel turning angle.

Based on the incremental pressure coefficient K1$fr$ for the FR turning inner wheel and the incremental pressure coefficient K1$rr$ for the RR turning inner wheel, a calculation of the FF incremental pressure amount ΔP1ff for the FR turning inner wheel, and a calculation of the FF incremental pressure amount ΔP2ff for the RR turning inner wheel are performed in parallel.

First, the calculation of the FF incremental pressure amount ΔP1ff for the FR turning inner wheel is described. The stationary yaw rate deviation Δωff calculated by the stationary yaw rate deviation calculation unit 13 is multiplied by the incremental coefficient K1$fr$, to calculate the stationary yaw rate deviation Δω1ff for the FR turning inner wheel.

Next, with reference to the incremental pressure amount table 60, a brake fluid incremental pressure amount ΔP1ffk for the FR turning inner wheel is calculated, according to the stationary yaw rate deviation Δω1ff for the FR turning inner wheel. In the incremental pressure amount table 60, the horizontal axis represents stationary yaw rate deviation Δω1ff, and the vertical axis represents brake fluid incremental pressure amount Δω1ffk. In this reference example 2, in the case where the stationary yaw rate deviation Δω1ff for the FR turning inner wheel is not more than 0, the brake fluid incremental pressure amount ΔP1ffk is 0, and when the stationary yaw rate deviation Δω1ff for the FR turning inner wheel is not less than 0, the brake fluid incremental pressure amount ΔP1ffk increases as the stationary yaw rate deviation Δω1ff becomes greater.

Next, a limiting process unit 61 performs a limiting process so that the brake fluid incremental pressure amount ΔP1ffk for the FR turning inner wheel will not exceed an upper limit value. The upper limit value is an arbitrary value calculated by an upper limit value calculation unit 62, and by setting this value not to be exceeded, a sudden change in the fluid incremental pressure amount ΔP1ffk is suppressed.

Next, the brake fluid incremental pressure amount ΔP1ffk for the FR turning inner wheel which has undergone the limiting process is multiplied by a gain according to a vehicle speed, to calculate an FF incremental pressure amount ΔP1ff for the FR turning inner wheel. The gain according to the vehicle speed is calculated based on a gain table 63. In this gain table 63, the horizontal axis represents vehicle speed, and the vertical axis represents gain, where: the gain is constant at gain=1 in a low vehicle speed range; the gain gradually becomes smaller as the vehicle speed increases where the vehicle speed is greater than or equal to a predetermined value; and the gain becomes constant at gain=0 in a high vehicle speed range.

As a result of multiplying it by a gain according to the vehicle speed in this manner, when the vehicle speed is high, the FF incremental pressure amount ΔP1ff for the FR turning inner wheel becomes 0. In other words, when the vehicle speed is high, the FF incremental pressure amount ΔP1ff for the FR turning inner wheel is nullified. Thereby, it is possible to prevent instability of vehicle behavior caused by steering assist braking performed when the vehicle speed is high. In this reference example 2, the gain table 63 configures a nullification device. Instead of multiplying it by a gain according to the vehicle speed, there may be given a limitation value which becomes lower as the vehicle speed becomes higher, and the ΔP1ff may be set so as not to exceed this limitation value.

A calculation of the FF incremental pressure amount ΔP2ff for the RR turning inner wheel is the same as the calculation of the FF incremental pressure amount ΔP1ff for the FR turning inner wheel, and therefore, a simplified description thereof is made.

The stationary yaw rate deviation Δωff calculated by the stationary yaw rate deviation calculation unit 13 is multiplied by the incremental coefficient K1$rr$ for the RR turning inner wheel, to calculate a stationary yaw rate deviation Δω2ff for the RR turning inner wheel.

Next, with reference to the incremental pressure amount table 64, a brake fluid incremental pressure amount ΔP2ffk for the RR turning inner wheel is calculated, according to the stationary yaw rate deviation Δω2ff for the RR turning inner wheel. Since the incremental pressure amount table 64 is the same as the incremental pressure amount table 60, the description thereof is omitted.

Next, a limiting process unit 65 performs a limiting process so that the brake fluid incremental pressure amount ΔP2ffk for the RR turning inner wheel will not exceed an upper limit value. The upper limit value is calculated by an upper limit value calculation unit 66. The upper limit value calculation unit 66 is the same as the upper limit value calculation unit 62.

Next, the brake fluid incremental pressure amount ΔP2ffk for the RR turning inner wheel which has undergone the limiting process is multiplied by a gain calculated based on the gain table 67, to calculate an FF incremental pressure amount ΔP2ff for the RR turning inner wheel. The gain table 67 is the same as the gain table 63, and therefore, the description thereof is omitted. In this reference example 2, the gain table 67 configures a nullification device.

Moreover, the FF braking force control amount calculation unit 18 is provided with an inner wheel decremental pressure amount calculation unit 70. The inner wheel decremental pressure amount calculation unit 70 is to preliminarily limit the brake fluid pressure on the assumption that the vehicle behavior becomes unstable due to braking when the vehicle speed is high or the level of transverse G is high.

In the inner wheel decremental pressure amount calculation unit 70: a decremental pressure amount according to the vehicle speed is calculated with reference to a first decremental pressure rate table 71; a decremental pressure rate according to the transverse G is calculated with reference to a second decremental pressure rate table 72; and a total decremental pressure rate is calculated by multiplying these decremental pressure rates.

In the first decremental pressure rate table 71, the horizontal axis represents vehicle speed, and the vertical axis represents decremental pressure rate, where: the decremental pressure rate is constant at decremental pressure rate=1 in a low vehicle speed range; the decremental pressure rate gradually becomes greater as the vehicle speed increases where the vehicle speed is greater than or equal to a predetermined value; and the decremental pressure rate becomes constant at decremental pressure rate=0 in a high vehicle speed range.

In the second decremental pressure rate table 72, the horizontal axis represents transverse G, and the vertical axis represents decremental pressure rate, where: the decremental pressure rate is constant at decremental pressure rate=0 in a range where the transverse G is small; the decremental pressure rate gradually becomes greater as the transverse G increases where the transverse G is greater than or equal to a predetermined value; and the decremental pressure rate becomes constant at decremental pressure rate=1 in a range where the transverse G is large.

As a result, the total decremental pressure rate is set to a value between 0 and 1 according to the vehicle speed and the transverse G at the time of traveling.

Then, the total decremental pressure rate found in this way is multiplied by a master cylinder pressure of the braking device 10, and it is further multiplied by minus 1, to find an inner wheel decremental pressure amount ΔPd.

The calculation of the FB braking force control amount in the FB braking force control amount calculation unit 19 is the same as that of reference example 1, and therefore, the description thereof is omitted.

The total braking force control amount calculation unit 17 outputs to the braking device 10: a value obtained as a sum of the FF incremental pressure amount ΔP1ff for the FR turning inner wheel, the FB incremental pressure amount ΔP1fb for the FR turning inner wheel, and the inner wheel decremental pressure amount ΔPd, as a total braking force control amount for the FR turning inner wheel; a value obtained as a sum of the FF incremental pressure amount ΔP2ff for the RR turning inner wheel, the FB incremental pressure amount ΔPfb for the RR turning inner wheel, and the inner wheel decremental pressure amount ΔPd, as a total braking force control amount for the RR turning inner wheel; the FB incremental pressure amount ΔP3fb for the FR turning outer wheel as a total braking force control amount for the FR turning outer wheel; and the FB incremental pressure amount ΔP4fb for the RR turning outer wheel as a total braking force control amount for the RR turning outer wheel.

The braking device 10 controls the braking pressure of each wheel according to the input control amount of each wheel.

According to the turning control device for a vehicle of this reference example 2, as with the case of reference example 1, the correction unit 15 corrects the transverse G norm yaw rate ω_low in the incremental direction while associating it with the stationary norm yaw rate ω_high calculated based on the steering wheel turning angle, and calculates the marginal norm yaw rate ω_TAR. Therefore, control of stabilizing the yaw moment occurring in the vehicle body, and control of improving steering responsiveness can both be realized. As a result, the turning intention of the driver is responsively reflected, and the feel of steering can be improved.

Moreover, since the transverse G norm yaw rate ω_low is corrected in the incremental direction to set the marginal norm yaw rate ω_TAR, it is possible to increase the target value in the FB braking force control amount calculation unit 19, and the level of turnability is improved. As a result, it is possible to turn the vehicle along the traveling path, and the level of road surface tracking performance (traceability) is improved.

Furthermore, according to the turning control device for a vehicle of this reference example 2, since the braking pressure is controlled based on the total braking force control amount obtained by adding the FB braking force control amount calculated based on the vehicle behavior, to the FF braking force control amount calculated based on the steering input, it is possible to ensure the stability of vehicle behavior while improving the level of steering responsiveness. Moreover, the level of steering tracking is also improved. For example, in a process in which steering is maintained after the steering input, such as when turning in a continuous circle, fluctuation of the control amounts is suppressed, so that the level of steering tracking is improved.

Next, a working example of the turning control device for a vehicle according to the first embodiment of the present invention is described, with reference to the diagrams of FIG. 12 through FIG. 18.

In the reference examples 1 and 2 described above: a stationary norm yaw rate ω_high is calculated by multiplying a steering angle norm yaw rate by a gain set according to a vehicle speed (stationary norm yaw rate gain Kv); this stationary norm yaw rate ω_high is input to the correction unit 15; and the transverse G norm yaw rate ω_low is associated with the stationary norm yaw rate ω_high according to the steering state or the motion state of the vehicle to perform a correction.

Incidentally, it is commonly know that in a vehicle, a yaw response to a steering input has a temporal delay. However, the steering angle norm yaw rate does not take temporal delay into consideration. Consequently, in this working example: the steering angle norm yaw rate is taken as a reference value, and a steering angle norm yaw rate, in which this takes a temporal delay into consideration, is calculated; either one of the steering angle norm yaw rate which does not take the temporal delay into consideration and the steering angle norm yaw rate which takes the temporal delay into consideration is selected according to the steering state of the vehicle; this selection result is input to the correction unit 15 as a stationary norm yaw rate ω_high; and thereby the transverse G norm yaw rate ω_low is corrected.

Moreover, in reference example 2 described above, a stationary yaw rate deviation Δωff, which is a deviation between the stationary norm yaw rate and the steering angle norm yaw rate, is calculated in the stationary yaw rate deviation calculation unit 13, and the FF braking force control amount calculation unit 18 calculates the FF braking force control amount based on this stationary yaw rate deviation Δωff. However, in this working example, there is calculated a deviation between a steering angle norm yaw rate which does not take the temporal delay into consideration and a steering angle norm yaw rate which takes the temporal delay into consideration; this deviation is corrected to calculate a stationary yaw rate deviation Δωff; and the FF braking force control amount calculation unit 18 calculates an FF braking force control amount based on this stationary yaw rate deviation Δωff.

Figure 12:
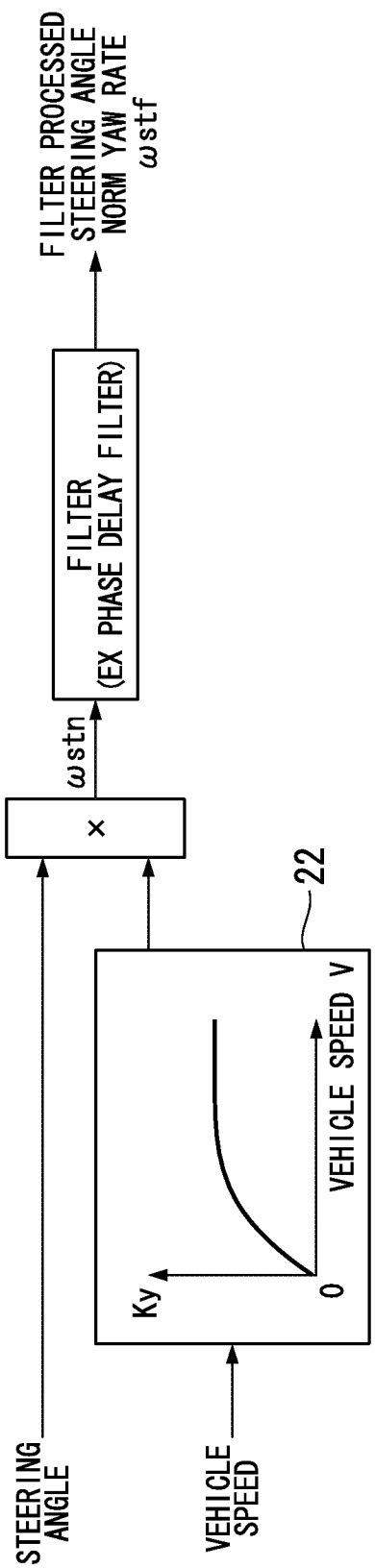
FIG. 12 is a block diagram of a filter-processing steering angle norm yaw rate calculation.

First, a method of calculating a steering angle norm yaw rate which takes the temporal delay into consideration is described, with reference to FIG. 12.

As described in reference example 1, a steering angle norm yaw rate which does not take the temporal delay into consideration can be found by multiplying the steering angle detected by the steering wheel turning angle sensor 3 by the steering angle norm yaw rate gain Ky determined according to the vehicle speed. The steering angle norm yaw rate which takes the temporal delay into consideration is calculated by performing a temporal delay process on the steering angle norm yaw rate found in this manner only for a preliminarily set time constant, using a phase delay filter 23. Where the steering angle norm yaw rate value which does not take the temporal delay into consideration is γstr (t), and the time constant is T, the steering angle norm yaw rate value which takes the temporal delay into consideration γstr_flt is expressed by the following equation (7).

$$\gamma str\_flt = \gamma str(t-T) \qquad \text{equation (7)}$$

In the following description, the steering angle norm yaw rate which does not take the temporal delay into consideration is referred to simply as "steering angle norm yaw rate ωstn", and the steering angle norm yaw rate which takes the temporal delay into consideration is referred to as "filter processed steering angle norm yaw rate". In this working example 1, the steering angle norm yaw rate ωtn forms a steering angle yaw rate reference value, and the filter processed steering angle norm yaw rate ωstf forms a delay steering angle yaw rate value.

Figure 13:
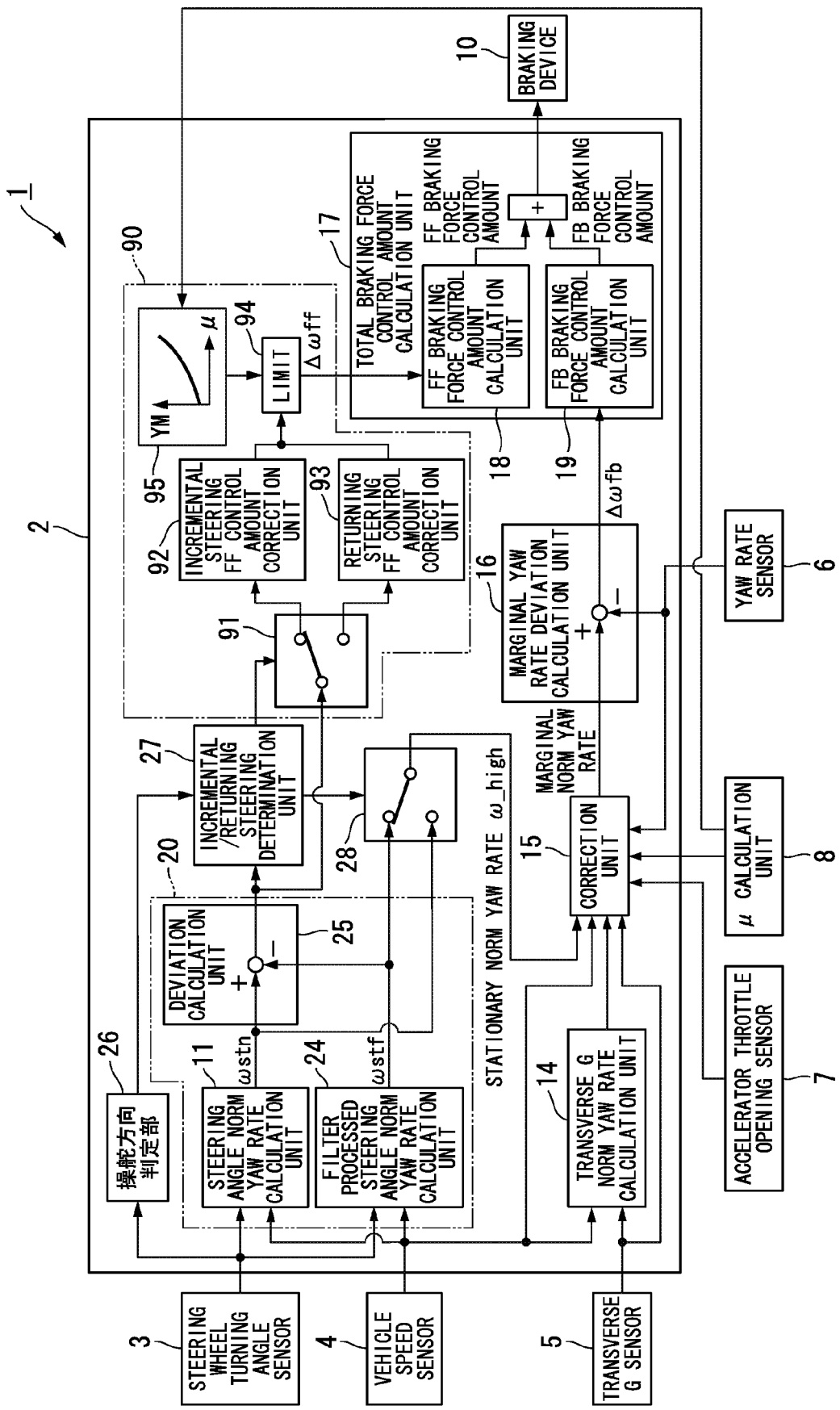
FIG. 13 is a block diagram showing a working example of the turning control device for a vehicle according to the first embodiment of the present invention.

FIG. 13 is a control block diagram of the turning control device for a vehicle of the working example.

A braking control unit 2 in this working example includes a feedforward control system (hereunder, abbreviated as FF control system) and a feedback control system (hereunder, abbreviated as FB control system), in which the FF control system is provided with a feedforward control amount calculation unit 20 (hereunder, abbreviated as FF control amount calculation unit), a steering direction determination unit 26, an incremental/returning steering determination unit 27 (steering direction determination device), an FF control amount correction unit 90, and an FF braking force control amount calculation unit (braking force control amount calculation unit) 18, and the FB control system is provided with a selector 28, a transverse G norm yaw rate calculation unit (first norm yaw rate calculation unit) 14, a correction unit 15, a marginal yaw rate deviation calculation unit 16, and an FB braking force control amount calculation unit (second braking force control amount calculation unit) 19. Moreover, the FF braking force control amount calculation unit 18 and the FB braking force control amount calculation unit 19 configure a total braking force control amount calculation unit 17. The total braking force control amount calculation unit 17 adds an FF braking force control amount calculated by the FF braking force control amount calculation unit 18 (braking force control amount) to an FB braking force control amount calculated by the FB braking force control amount calculation unit 19 (second braking force control amount), to calculate a total braking force control amount.

The braking control unit 2 receives inputs of detection signals from a steering wheel turning angle sensor 3, a vehicle speed sensor 4, a transverse G sensor 5, a yaw rate sensor 6, and an accelerator throttle opening sensor 7 according to the respective detection values thereof, and it receives an input of an electric signal from a μ calculation unit 8 according to a calculated friction coefficient.

First, the FF control system in the braking control unit 2 is described.

The FF control amount calculation unit 20 comprises a steering angle norm yaw rate calculation unit 11, a filter process steering angle norm yaw rate calculation unit 24, and a steering angle norm yaw rate deviation calculation unit 25.

The steering angle norm yaw rate calculation unit 11, as with the case of reference example 1, estimates and calculates a steering angle norm yaw rate ω based on a steering angle detected by the steering wheel turning angle sensor 3 and a vehicle speed detected by the vehicle speed sensor 4.

The filter process steering angle norm yaw rate calculation unit 24, as described above, performs a temporal delay process on a steering norm yaw rate using the phase delay filter 23 to thereby calculate a filter process steering angle norm yaw rate ωstf.

The steering angle norm yaw rate deviation calculation unit 25 subtracts the filter processed steering angle norm yaw rate ωstf calculated by the filter processed steering angle norm yaw rate calculation unit 24 from the steering angle norm yaw rate ωstn calculated by the steering angle norm yaw rate calculation unit 11, to thereby calculate a steering angle norm yaw rate deviation. This steering angle norm yaw rate deviation is a feedback control amount (hereunder, abbreviated as FF control amount) before performing a correction with use of an incremental characteristic described later, and therefore, in the following description, the steering angle norm yaw rate deviation is referred to as FF control amount. In this working example, the FF control amount calculation unit 20 calculates an FF control amount on the basis at least of detection signals of the steering wheel turning angle sensor 3 (steering wheel turning amount detection device).

The steering direction determination unit 26 determines, based on the detection value of the steering wheel turning angle sensor 3, whether the steering wheel is in a state of being rotated to the right turning side from the neutral position (straight-ahead direction position) (for example, this state is determined as being "+"), or the steering wheel is in a state of being rotated to the left turning side from the neutral position (for example, this state is determined as being "−").

The incremental/returning steering determination unit 27 determines whether the steering wheel is rotated in the incremental steering direction or is rotated in the returning-steering direction based on the positivity or negativity of the FF control amount calculated by the steering angle norm yaw rate deviation calculation unit 25 and the determination result of the steering direction determination unit 26.

Figure 14:
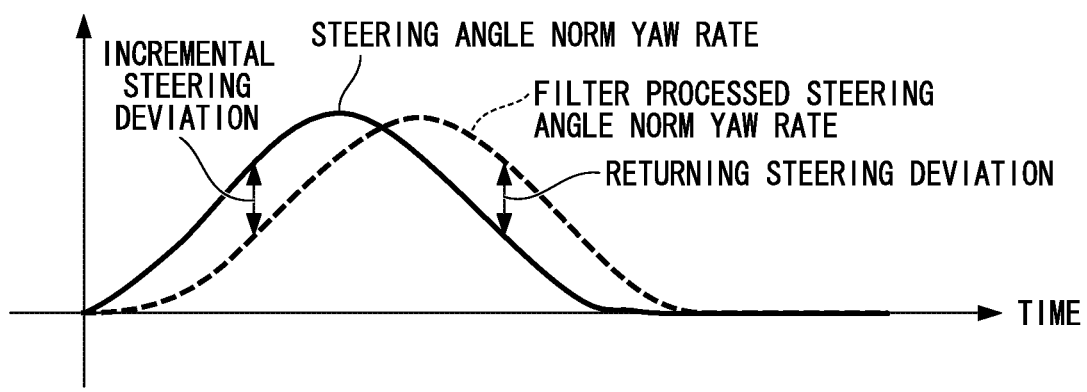
FIG. 14 is a diagram showing the correlation between steering angle norm yaw rate and filter-processing steering angle norm yaw rate.

The principle of this determination is described with reference to the diagram of FIG. 14. FIG. 14 shows temporal changes in the steering angle norm yaw rate ωstn and the filter processed steering angle norm yaw rate ωstf at the time when the steering wheel is returned to the neutral position after having been operated to perform a right turning. The filter processed steering angle norm yaw rate ωstf takes the temporal delay into consideration with the steering angle norm yaw rate ωstn. Therefore, the steering angle norm yaw rate ωtn is greater than the filter processed steering angle norm yaw rate ωstf until a predetermined amount of time has elapsed. However, when the predetermined amount of time has elapsed, this is reversed and the filter processed steering angle norm yaw rate ωstf becomes greater than the steering angle norm yaw rate ωstn.

Here, when the steering angle norm yaw rate ωstn is greater than the filter processed steering angle norm yaw rate ωstf, the steering wheel can be estimated as being rotated in the incremental steering direction, and when the filter processed steering angle norm yaw rate ωstf is greater than the steering angle norm yaw rate ωstn, the steering wheel can be estimated as being rotated in the returning-steering direction. Therefore, the steering wheel can be estimated as being rotated to the right turning side from the neutral position (the result of determination of the steering direction determination unit 26 is "+"), where if the FF control amount calculated by the steering angle norm yaw rate deviation calculation unit 25 is a positive value, it can be estimated as being rotated in the incremental steering direction, and if the FF control amount is a negative value, it can be estimated as being rotated in the returning-steering direction. In the state where the steering wheel is rotated to the left turning side, simply the positivity/negativity are reversed, and an estimation can be made on a similar principle. That is to say, if the positivity/negativity of the determination result of the steering direction determination unit 26 is the same as the positivity/negativity of the FF control amount calculated by the steering angle norm yaw rate deviation calculation unit 25, the steering rotation can be determined as an incremental steering rotation, and if they are not the same, it can be determined as a returning-steering rotation.

The FF control amount correction unit 90 is provided with a selector 91, an incremental steering FF control amount correction unit 92, a returning-steering FF control amount correction unit 93, a limiting process unit 94, and a limit value table 95.

The selector 91 selects whether to output the FF control amount calculated by the steering angle norm yaw rate deviation calculation unit 25 to the incremental steering FF control amount correction unit 92 or to the returning-steering FF control amount correction unit 93, according to the determination result of the incremental/returning steering determination unit 27. To describe in detail, in the case where it is determined as an incremental steering by the incremental/returning steering determination unit 27, the FF control amount calculated by the steering angle norm yaw rate deviation calculation unit 25 is output to the incremental steering FF control amount correction unit 92, and if it is determined as a returning-steering by the incremental/returning steering determination unit 27, the FF control amount calculated by the steering angle norm yaw rate deviation calculation unit 25 is output to the returning-steering FF control amount correction unit 93.

The incremental steering FF control amount correction unit 92 and the returning-steering FF control amount correction unit 93 multiply the FF control amount input from the steering angle norm yaw rate deviation calculation unit 25 via the selector 91 (ωstn−ωstf) by a gain Kg according to the transverse G and a gain Kv according to the vehicle speed, to calculate an FF control amount correction value. Here, the gains Kg and Kv are respectively calculated with reference to a transverse G gain table and a vehicle speed gain table. However, the incremental steering FF control amount correction unit 92 and the returning-steering FF control amount correction unit 93 use different transverse G gain tables and vehicle speed gain tables.

Figure 15:
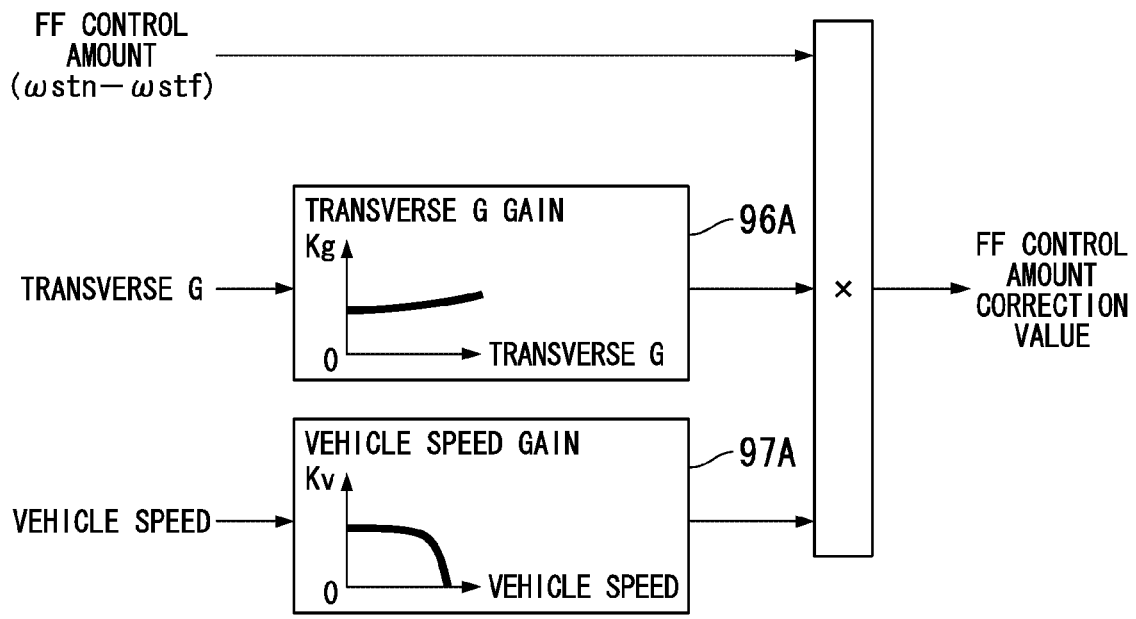
FIG. 15 is a block diagram of an incremental steering FF control amount correction calculation in the working example.
Figure 16:
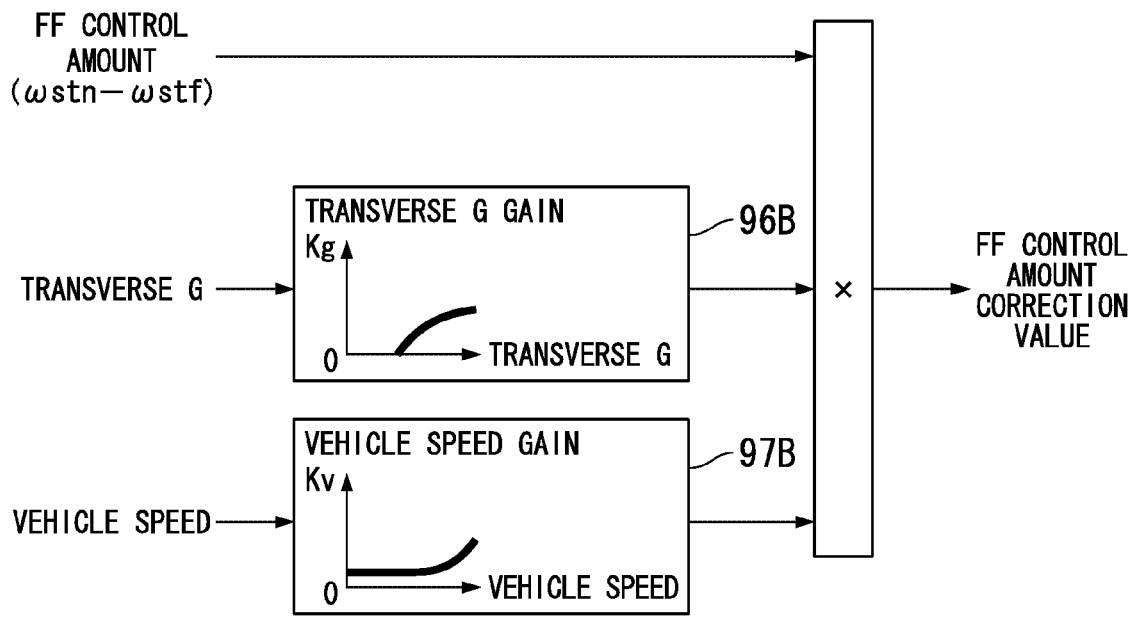
FIG. 16 is a block diagram of a returning-steering FF control amount correction calculation in the working example.

FIG. 15 is a control block diagram of the incremental steering FF control amount correction unit 92, and FIG. 16 is a control block diagram of the returning-steering FF control amount correction unit 93. In the transverse G gain tables 96A and 96B, the horizontal axis represents transverse G and the vertical axis represents gain Kg. In the vehicle speed gain tables 97A and 9713, the horizontal axis represents vehicle speed, and the vertical axis represents gain Kv.

First, calculation of an FF control amount correction value in the incremental steering FF control amount correction unit 92 is described, with reference to FIG. 15.

The transverse G gain table 96A in the incremental steering FF control amount correction unit 92 is such that the gain Kg takes a predetermined positive value when the transverse G is 0, and the gain Kg gradually and slightly becomes greater as the transverse G increases. The incremental steering FF control amount correction unit 92 makes reference to this transverse G gain table 96A, and calculates a gain Kg according to the transverse G detected by the transverse G sensor 5.

The vehicle speed gain table 97A in the incremental steering FF control amount correction unit 92 is such that the gain Kv is a substantially constant positive value until the vehicle speed has reached a predetermined vehicle speed, and it rapidly decreases to 0 once the predetermined vehicle speed is exceeded. The incremental steering FF control amount correction unit 92 makes reference to this vehicle speed gain table 97A, and calculates a gain Kv according to the vehicle speed detected by the vehicle speed sensor 4.

The incremental steering FF control amount correction unit 92 multiplies the FF control amount (ωstn−ωstf) by the gain Kg and the gain Kv to calculate an FF control amount correction value.

That is to say, in this working example, the FF control amount correction value in the case where an incremental steering is determined is largely dependent on the vehicle speed, and in the stationary speed range until the vehicle speed exceeds the predetermined vehicle speed, the FF control amount correction value is set to an appropriate value. However, in the high speed range where the vehicle speed exceeds the predetermined vehicle speed, the FF control amount correction value is set to substantially 0.

In this working example, the transverse G gain table 96A and the vehicle speed gain table 97A configure the incremental characteristic at the time of determining incremental steering.

Next, calculation of an FF control amount correction value in the returning-steering FF control amount correction unit 93 is described, with reference to FIG. 16.

The transverse G gain table 9613 in the returning-steering FF control amount correction unit 93 is such that the gain Kg is 0 until the transverse G has reached a predetermined value, and the gain Kg gradually increases as the transverse G increases once the transverse G has exceeded the predetermined value. The returning-steering FF control amount correction unit 93 makes reference to this transverse G gain table 96B, and calculates a gain Kg according to the transverse G detected by the transverse G sensor 5.

The vehicle speed gain table 97B in the returning-steering FF control amount correction unit 93 is such that the gain Kv is a substantially constant positive value until the vehicle speed has reached a predetermined vehicle speed, and it gradually decreases once the predetermined vehicle speed is exceeded. The returning-steering FF control amount correction unit 93 makes reference to this vehicle speed gain table 97B, and calculates a gain Kv according to the vehicle speed detected by the vehicle speed sensor 4.

The returning-steering FF control amount correction unit 93 multiplies the FF control amount (ωstn−ωstf) by the gain Kg and the gain Kv to calculate an FF control amount correction value.

That is to say, in this working example, the FF control amount correction value in the case where a returning-steering is determined is largely dependent on the transverse G. When the transverse G is not more than the predetermined value, the FF control amount correction value is 0 regardless of the vehicle speed, and once the transverse G has exceeded the predetermined value, an FF control amount correction value is set to be generated.

In this working example, the transverse G gain table 96B and the vehicle speed gain table 97B configure the incremental characteristic at the time of determining returning-steering.

As described above, the FF control amount correction unit 90 changes the incremental characteristic according to the determination result of the incremental/returning steering determination unit 27 (in other words, switches the incremental characteristic), to calculate an FF control amount correction value.

Since the incremental characteristics in the respective cases of incremental steering and returning steering are set as described above, the FF control amount correction value at the time of incremental steering in a high speed range is 0, and is smaller than the FF control amount correction value at the time of returning-steering. As a result, in the high speed range, an excessive steering intervention can be suppressed to ensure the stability, and the level of convergence can be improved, when an incremental steering is performed, while the level of responsiveness can be improved when a returning-steering is performed in a high speed range.

The incremental steering FF control amount correction unit 92 and the returning-steering FF control amount correction unit 93 output the calculated FF control amount correction value to the limiting process unit 94.

The limiting process unit 94 receives, in addition to the FF control amount correction value, an input of a limit value YM determined with reference to the limit value table 95. The limit value table 95 is such that the horizontal axis represents road surface friction coefficient μ, and the vertical axis represents limit value YM, and a limit value YM is determined according to the road surface friction coefficient μ calculated by the μ calculation unit 8.

The limiting process unit 94 performs a limiting process so that the FF control amount correction value input from the incremental steering FF control amount correction unit 92 or the returning-steering FF control amount correction unit 93 will not exceed the limit value (upper limit value) determined by the limit value table 95. That is to say, the limiting process unit 94 directly outputs the calculated FF control amount correction value in the case where the FF control amount correction value calculated by the incremental steering FF control amount correction unit 92 or the returning-steering FF control amount correction unit 93 does not exceed the limit value YM, and it outputs the limit value YM as an FF control amount correction value in the case where the FF control amount correction value calculated by the incremental steering FF control amount correction unit 92 or the returning-steering FF control amount correction unit 93 exceeds the limit value YM.

The FF control amount correction value output from the limiting process unit 94 is input as a stationary yaw rate deviation $\Delta\omega$ff to the FF braking force control amount calculation unit 18.

The FF braking force control amount calculation unit 18 calculates an FF braking force control amount based on the stationary yaw rate deviation $\Delta\omega$ff input from the FF control amount correction unit 90 (that is, the FF control amount correction value output from the limiting process unit 94).

The FF braking force control amount calculation process of the FF braking force control amount calculation unit 18 in this working example is exactly the same as the FF braking force control amount calculation process of the FF braking force control amount calculation unit 18 in reference example 2, except an FF control amount correction value is used as a stationary yaw rate deviation $\Delta\omega$ff, and therefore, FIG. 11 is used and the description thereof is omitted.

Also in this working example, the FF incremental pressure amount $\Delta$P1ff is nullified (0) with respect to the FR turning inner wheel according to the gain table 63 in FIG. 11 when the vehicle speed is high, and the FF incremental pressure amount $\Delta$P2ff is nullified (0) with respect to the RR turning inner wheel according to the gain table 67 in FIG. 11 when the vehicle speed is high. Accordingly, the gain tables 63 and 67 configure a nullification device.

Next, the FB control system in the braking control unit 2 is described. The selector 28 selects, according to the determination result of the incremental steering/returning steering determination unit 27, one of the steering angle norm yaw rate $\omega$stn calculated by the steering angle norm yaw rate calculation unit 11 and the filter processed steering angle norm yaw rate $\omega$stf calculated by the filter processed steering angle norm yaw rate calculation unit 24, and outputs it as a stationary norm yaw rate $\omega$_high to the correction unit 15. To describe in detail, in the case where the incremental steering/returning steering determination unit 27 determines it as an incremental steering, the filter processed steering angle norm yaw rate $\omega$stf is selected, and the filter processed steering angle norm yaw rate $\omega$stf is output as a stationary norm yaw rate $\omega$_high to the correction unit 15. If the incremental steering/returning steering determination unit 27 determines it as a returning-steering, the steering angle norm yaw rate $\omega$stn is selected, and the steering angle norm yaw rate $\omega$stn is output as a stationary norm yaw rate $\omega$_high to the correction unit 15.

The transverse G norm yaw rate calculation unit 14 is the same as that of reference example 1, and therefore the description thereof is omitted.

The correction unit 15 calculates a marginal norm yaw rate $\omega$_TAR based on the stationary norm yaw rate $\omega$_high input via the selector 28 and the transverse G norm yaw rate $\omega$_low input from the transverse G norm yaw rate calculation unit 14. When calculating the marginal norm yaw rate $\omega$_TAR in the correction unit 15, this working example differs from reference example 1 in that if an incremental steering is determined, a filter processed steering angle norm yaw rate $\omega$ is used as the stationary norm yaw rate $\omega$_high, and if a returning-steering is determined, a steering angle norm yaw rate $\omega$stn is used as the stationary norm yaw rate $\omega$_high. Other than this point, the method of calculating a marginal norm yaw rate $\omega$_TAR is the same as that in the case of reference example 1, and therefore, the detailed description thereof is omitted.

The marginal yaw rate deviation calculation unit 16 and the FB braking force control amount calculation unit 19 are the same as those in reference example 1, and therefore, the descriptions thereof are omitted.

The braking control unit 2 of this working example is such that in the total braking force control amount calculation unit 17, the FF braking force control amount calculated by the FF braking force control amount calculation unit 18 and the FB braking force control amount calculated by the FB braking force control amount calculation unit 19 are added, and it is output as a command value to the braking device (braking control device) 10. This total braking force control amount calculation process is the same as that of reference example 2, and therefore, FIG. 11 is used and the description thereof is omitted.

The braking device 10 controls the braking pressure of each wheel based on the total braking force control amount.

Figure 17:
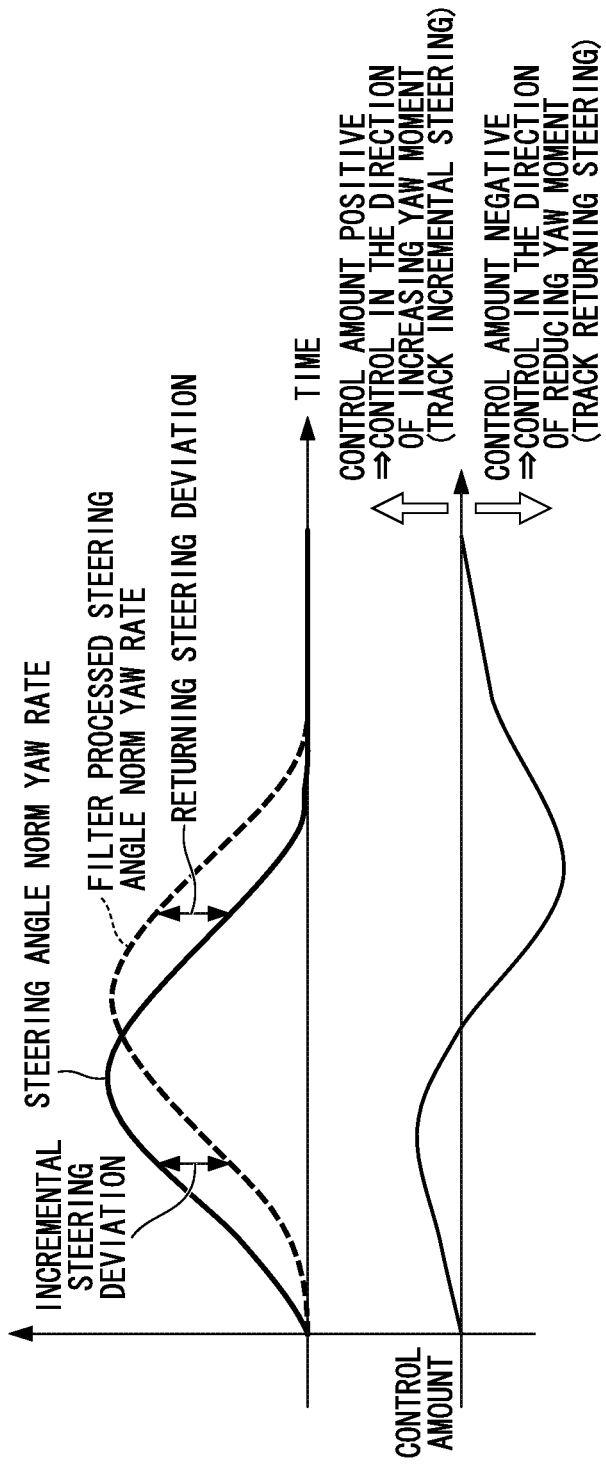
FIG. 17 is a diagram for explaining feedforward control in the working example.

FIG. 17 is a conceptual diagram of FF control in the working example.

In the FF control of the working example, the total braking force control amount can be controlled in the incremental direction (in other words, in the direction of increasing the yaw moment) when an incremental steering is performed, and the total braking force control amount can be controlled in the decremental direction (in other words, in the direction of reducing the yaw moment) when a returning-steering is performed.

In addition, as described above, even at the time of incremental steering, the FF control amount correction value is set to an appropriate value in the stationary speed range until the vehicle speed exceeds a predetermined vehicle speed. However, since the FF control amount correction value is set to 0 in the high speed range where the vehicle speed exceeds the predetermined vehicle speed, it is possible to reduce temporal delay and improve the level of steering responsiveness and turnability by performing the FF control in the direction of increasing the yaw moment only in the stationary speed range, and it is possible to ensure the stability of steering by not performing the FF control in the direction of increasing the yaw moment in the high speed range.

Moreover, when performing a returning-steering, control can be performed in the direction of reducing the total braking force control amount (in other words, in the direction of reducing the yaw moment), and therefore, the convergence of the yaw moment is improved. As described above, in the case where the transverse G is small at the time of performing a returning-steering, the FF control amount correction value is set to take 0, and therefore, the FF control in the direction of reducing the yaw moment is not performed at this time. This is because, the control intervention prevents the vehicle behavior from becoming unnatural, and the steering wheel is smoothly returned to the neutral position without any sense of discomfort, using the self-convergence characteristic of the vehicle.

Figure 18:
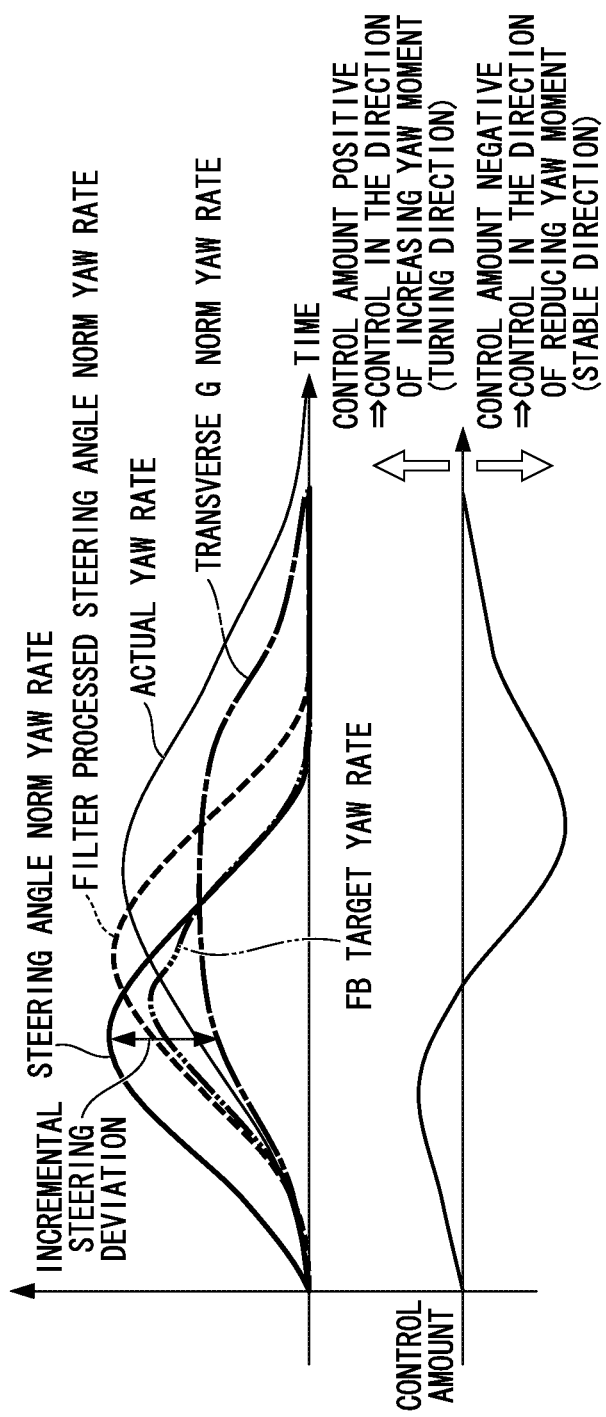
FIG. 18 is a diagram for explaining the relationship between transverse g-force norm yaw rate, steering angle norm yaw rate, filter-processing steering norm yaw rate, and feedback target yaw rate.

FIG. 18 shows an example of the control result in the turning control device 1 for a vehicle of the working example, showing temporal transitions of each yaw rate value.

According to the turning control device for a vehicle of this working example 1, when the steering wheel is rotated in the incremental steering direction, the feedback target yaw rate (hereunder, abbreviated as FB target yaw rate) can be set to a value close to the filter processed steering angle norm yaw rate $\omega$stf, and when the steering wheel is rotated in the returning-steering direction, the FB target yaw rate can be set to a value close to the steering angle norm yaw rate $\omega$stn. Here, when an incremental steering is determined, the filter processed steering angle norm yaw rate $\omega$stf is smaller than the steering angle norm yaw rate $\omega$stn. Therefore, in this working example, in the case where the steering direction is determined as being the incremental steering direction, the correction amount at the time of incrementally correcting the transverse G norm yaw rate to calculate the reference marginal norm yaw rate $\omega$_t1 can be made smaller than that in the case where the steering direction is determined as being the returning-steering direction.

In general, a driver tends to excessively operate the steering wheel when operating incremental steering, and therefore, in this type of situation, excessive control intervention can be suppressed and steering response can be made more natural if the FB target yaw rate is set to a value close to the filter processed steering angle norm yaw rate $\omega$stf, the value of which is smaller than that of the steering angle norm yaw rate $\omega$stn. On the other hand, when performing a returning-steering, the level of responsiveness can be improved by setting the FB target yaw rate to a value close to the steering angle norm yaw rate $\omega$stn with no temporal delay.

Moreover, according to the turning control device for a vehicle of the working example, as with the turning control device for a vehicle of reference example 1, the correction unit 15 corrects the transverse G norm yaw rate $\omega$_low in the incremental direction while associating it with the stationary norm yaw rate $\omega$_high calculated based on the steering wheel turning angle (that is, the steering angle norm yaw rate $\omega$stn or the filter processed steering angle norm yaw rate $\omega$stf), and calculates the marginal norm yaw rate $\omega$_TAR. Therefore, control of stabilizing the yaw moment occurring in the vehicle body, and control of improving steering responsiveness can both be realized. As a result, the turning intention of the driver is responsively reflected, and the feel of steering can be improved.

Moreover, as with the turning control device for a vehicle of reference example 1, since the transverse G norm yaw rate $\omega$_low is corrected in the incremental direction to set the marginal norm yaw rate $\omega$_TAR, it is possible to increase the target value in the FB braking force control amount calculation unit 19, and the level of turnability is improved. As a result, it is possible to turn the vehicle along the traveling path, and the level of road surface tracking performance (traceability) is improved.

Furthermore, according to the turning control device for a vehicle of this working example, since the braking pressure is controlled based on the total braking force control amount obtained by adding the FB braking force control amount calculated based on the vehicle behavior, to the FF braking force control amount calculated based on the steering input, it is possible to ensure the stability of vehicle behavior while improving the level of steering responsiveness. Moreover, the level of steering tracking is also improved. For example, in a process in which steering is maintained after the steering input, such as when turning in a continuous circle, fluctuation of the control amounts is suppressed, so that the level of steering tracking is improved.

The present invention is not limited to the working example described above.

For example, in the working example described above, the FF braking force control amount and the FB braking force control amount are added to calculate the total braking force control amount. However, the FF braking force control amount and the FB braking force control amount may be multiplied by each other to calculate the total braking force control amount.

Moreover, there may be used an estimated vehicle speed estimated based on detection values of a wheel speed sensor instead of detection values of the vehicle speed sensor.

Furthermore, in the working example described above, in the FF braking force control amount calculation unit 18, by nullifying the FF incremental pressure amount $\Delta$P1ff of the FR turning inner wheel and the FF incremental pressure amount $\Delta$P2ff of the RR turning inner wheel when the vehicle speed is high, vehicle behavior instability caused by steering assist braking is prevented when the vehicle speed is high. However, even when the steering wheel turning speed is extremely high or when an ABS is operating, the FF incremental pressure amount of the turning inner wheel may be nullified.

<Second Embodiment>

Before describing a working example of a turning control device for a vehicle according to a second embodiment of the present invention, reference examples thereof are described with reference to the diagrams of FIG. 19 through FIG. 29. The same aspect portions are given the same reference symbols and descriptions thereof are appropriately omitted.

REFERENCE EXAMPLE 1

First, reference example 1 of a turning control device for a vehicle according to the second embodiment of the present invention is described, with reference to the diagrams of FIG. 19 through FIG. 27.

Figure 19:
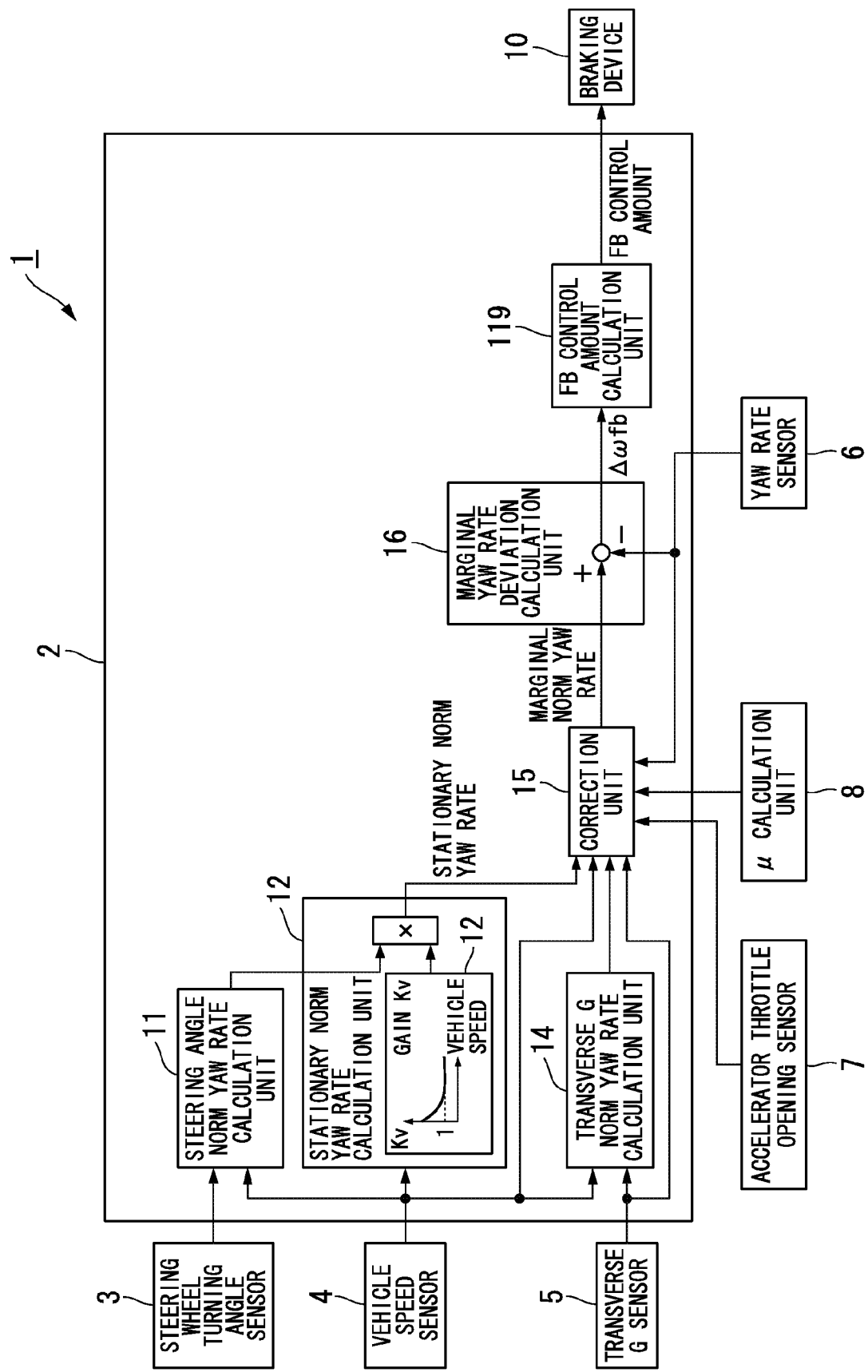
FIG. 19 is a block diagram showing a reference example 1 of a turning control device for a vehicle according to a second embodiment of the present invention.

FIG. 19 is a control block diagram of the turning control device for a vehicle of reference example 1.

The vehicle turning control device 1 is provided with a braking control unit 2 and a braking device 10.

The braking control unit 2 determines a braking force control amount of left and right wheels according to the traveling state of the vehicle, and the braking device 10 controls the braking force of each wheel based on the braking force control amount of each wheel determined by the braking control unit 2.

The braking control unit 2 receives detection signals from; a steering wheel turning angle sensor 3 which detects a steering wheel turning angle (steering wheel turning amount) of the steering wheel of the vehicle, a vehicle speed sensor 4 which detects a vehicle speed, a transverse acceleration sensor 5 (hereunder, referred to as transverse G sensor) which detects a left-right direction (vehicle lateral direction) acceleration of the vehicle (hereunder, referred to as transverse G), a yaw rate sensor 6 which detects a yaw rate of the vehicle, and an accelerator throttle opening sensor 7 which detects an accelerator throttle opening of the vehicle, according to respective detection values. Moreover it receives electric signals, according to a calculated friction coefficient, from a $\mu$ calculation unit 8 which calculates a coefficient of friction between the wheels of the vehicle and the road surface.

The braking control unit 2 is provided with; a steering angle norm yaw rate calculation unit 11, a stationary norm yaw rate calculation unit 12, a transverse G norm yaw rate calculation unit 14, a correction unit 15, a marginal yaw rate deviation calculation unit 16, and a feedback control amount calculation unit 119 (hereunder, abbreviated as FB control amount calculation unit).

Figure 20:
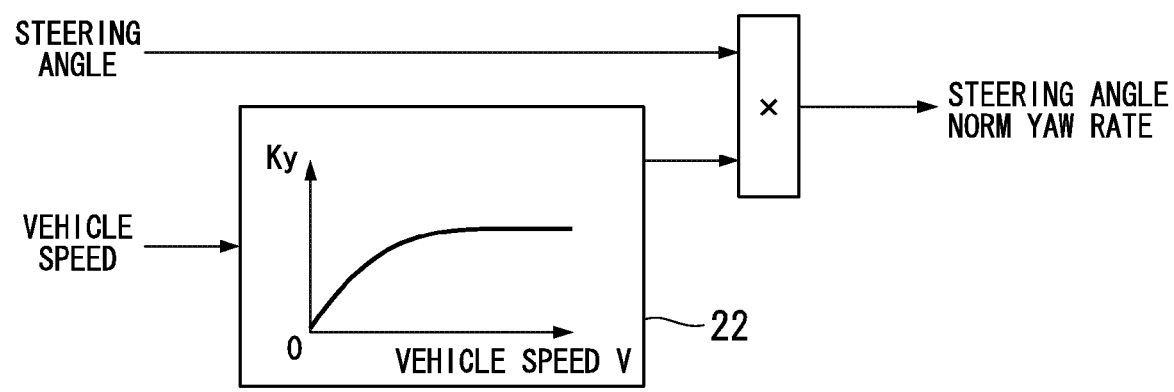
FIG. 20 is a block diagram of a steering angle norm yaw rate calculation.

The steering angle norm yaw rate calculation unit 11 estimates and calculates a steering angle norm yaw rate based on a steering wheel turning angle detected by the steering wheel turning angle sensor 3 and a vehicle speed detected by the vehicle speed sensor 4. Specifically, as shown in FIG. 20, a steering angle norm yaw rate gain Ky according to the vehicle speed is found with reference to a steering angle norm yaw rate gain table 22, and the steering wheel turning angle detected by the steering wheel turning angle sensor 3 is multiplied by the steering angle norm yaw rate gain Ky, to thereby perform this calculation. In the steering angle norm yaw rate gain table 22, the horizontal axis represents vehicle speed and the vertical axis represents steering angle norm yaw rate gain Ky, and it can be experimentally obtained coupled with a tire characteristic. The steering angle norm yaw rate gain table 22 in this reference example 1 is non-linear in that the steering angle norm yaw rate gain Ky increases as the vehicle speed increases, and it converges to a predetermined value. When the driver tries to actively turn the vehicle, the steering wheel turning angle is made greater, and therefore the steering angle norm yaw rate becomes greater. That is to say, when the steering angle norm yaw rate calculated based on the steering angle is great, the level of the steering intention of the driver to turn the vehicle can be estimated as being high.

The stationary norm yaw rate calculation unit 12 makes reference to a stationary norm yaw rate gain table 21 to calculate a stationary norm yaw rate gain Kv according to the vehicle speed, and it calculates a stationary norm yaw rate $\omega\_high$ by multiplying the steering angle norm yaw rate by the stationary norm yaw rate gain Kv. In the stationary norm yaw rate gain table 21 in this reference example 1, the horizontal axis represents vehicle speed and the vertical axis represents stationary norm yaw rate gain Kv, and it is set so that the stationary norm yaw rate gain Kv converges to 1 as the vehicle speed becomes higher, and the stationary norm yaw rate gain Kv becomes greater as the vehicle speed becomes lower. In this reference example 1, the stationary norm yaw rate $\omega\_high$ configures a correction reference value, and the stationary norm yaw rate $\omega\_high$ becomes high gain as the vehicle speed is lower.

The transverse G norm yaw rate calculation unit 14 calculates a transverse G norm yaw rate $\omega\_low$ based on a transverse G detected by the transverse G sensor 5 and a vehicle speed detected by the vehicle speed sensor 4. The transverse G norm yaw rate $\omega\_low$ is a yaw rate which can occur at a current transverse U, and it can be expressed as $\omega\_low = Gy/V$ for example. Here, Gy is a transverse acceleration detection value detected by the transverse G sensor 5, and V is a vehicle speed detected by the vehicle speed sensor 4.

The correction unit 15 calculates a marginal norm yaw rate $\omega\_TAR$ based on the stationary norm yaw rate $\omega\_high$ and the transverse G norm yaw rate $\omega\_low$. The method of calculating a marginal norm yaw rate $\omega\_TAR$ in the correction unit 15 is described later.

The marginal yaw rate deviation calculation unit 16 subtracts a yaw rate detected by the yaw rate sensor 6 (actual yaw rate) from the marginal norm yaw rate $\omega\_TAR$, to calculate a marginal yaw rate deviation $\Delta\omega fb$.

The FB control amount calculation unit 119 calculates a feedback amount (hereunder, abbreviated as FB control amount) based on the marginal yaw rate deviation $\Delta\omega fb$, and outputs it as a command value to the braking device 10.

Next, the method of calculating a marginal norm yaw rate $\omega\_TAR$ in the correction unit 15 is described, with reference to the diagrams of FIG. 21 through FIG. 26.

Figure 21:
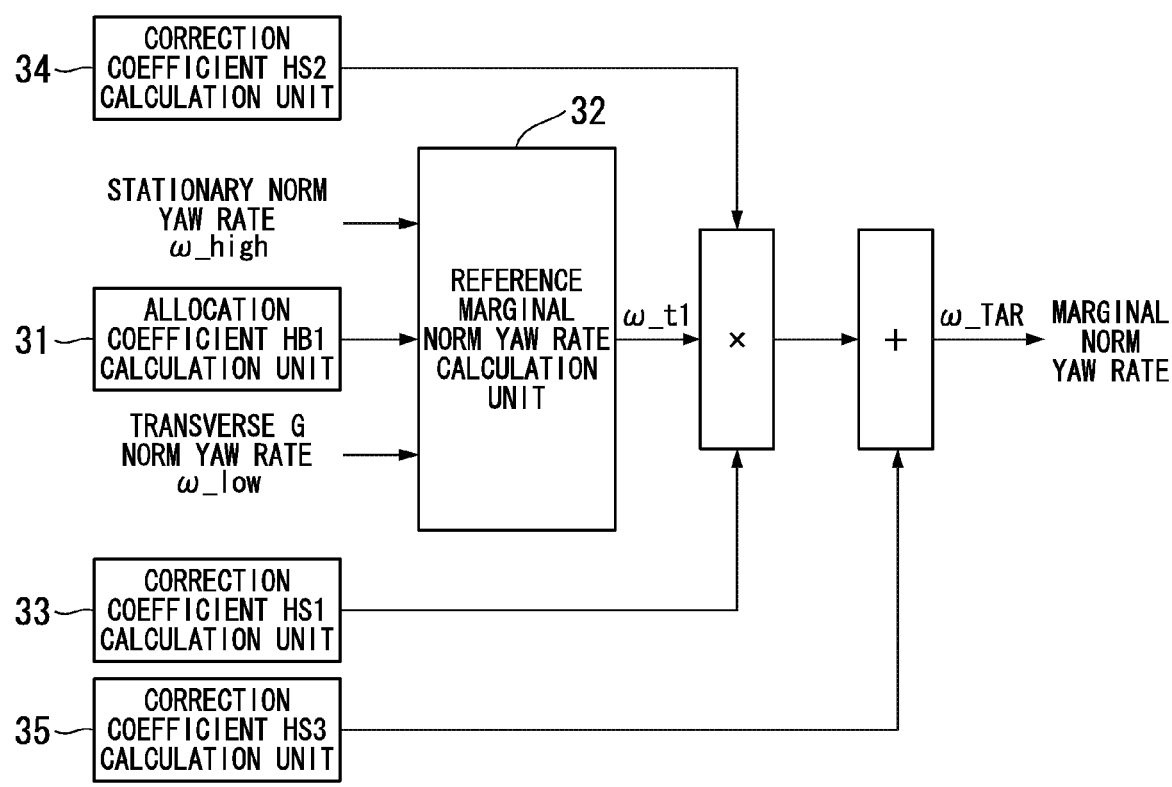
FIG. 21 is a block diagram of a correction unit in reference example 1.

As shown in FIG. 21, the correction unit 15 is provided with; an allocation coefficient HB1 calculation unit 31, a reference marginal norm yaw rate calculation unit 32, a correction coefficient calculation unit 33, a correction coefficient HS2 calculation unit 34, and a correction coefficient HS3 calculation unit 35.

In the correction unit 15, in the reference marginal norm yaw rate calculation unit 32, a reference marginal norm yaw rate $\omega\_t1$ is calculated based on an allocation coefficient HB1 calculated by the allocation coefficient HB1 calculation unit 31, the stationary norm yaw rate $\omega\_high$, and the transverse G norm yaw rate $\omega\_low$. Furthermore, this reference marginal norm yaw rate $\omega\_t1$ is multiplied by the correction coefficients HS1 and HS2 calculated respectively by the correction coefficient HS1 calculation unit 33 and the correction coefficient HS2 calculation unit 34, and the correction coefficient HS3 calculated by the correction coefficient HS3 calculation unit 35 is further added thereto, to thereby calculate a marginal norm yaw rate $\omega\_TAR$ (refer to the following equation (8)).

$$\omega\_TAR = \omega\_t1 \times HS1 \times HS2 + HS3 \qquad \text{equation (8)}$$

This marginal norm yaw rate $\omega\_TAR$ serves as a yaw rate target value in feedback control.

To describe in detail, the reference marginal norm yaw rate calculation unit 32 associates the transverse G norm yaw rate $\omega\_low$, which served as a target value in feedback control of conventional steering assist braking control, with the stationary norm yaw rate $\omega\_high$ calculated based on the steering wheel turning angle, and corrects it in the incremental direction, to thereby calculate a reference marginal norm yaw rate $\omega\_t1$. Thereby, control of stabilizing the yaw moment occurring in the vehicle body and control of improving steering responsiveness are both achieved.

Figure 22:
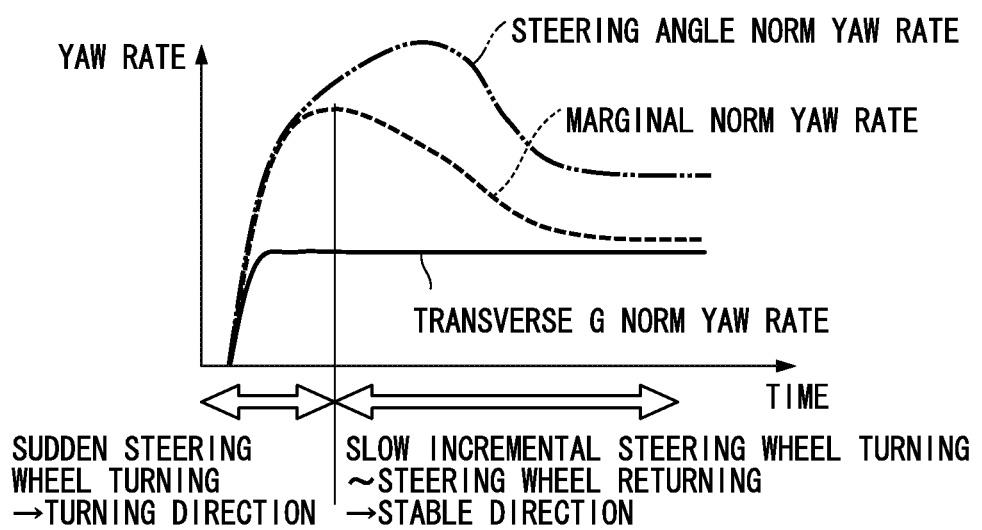
FIG. 22 is a diagram for explaining the relationship between transverse g-force norm yaw rate, steering angle norm yaw rate, and marginal norm yaw rate.

Here, transverse G norm yaw rate incremental correction is described with reference to FIG. 22. FIG. 22 shows temporal changes in steering angle norm yaw rate and transverse G norm yaw rate from the moment the steering wheel starts to rotate from the state of traveling straight to the moment it is maintained at a predetermined steering wheel turning angle. As shown in the diagram, normally, the steering angle norm yaw rate is greater than the transverse G norm yaw rate. Consequently, as a method of incrementally correcting transverse G norm yaw rate, it is corrected so as to be brought to the vicinity of the steering angle norm yaw rate while adjusting how much it is brought to the vicinity of the steering angle norm yaw rate according to the traveling conditions, and the adjustment device therefor employs a concept of an allocation coefficient of transverse G norm yaw rate and steering angle norm yaw rate.

In this reference example 1, this is further developed, and as a method of incrementally correcting transverse G norm yaw rate, it is corrected so as to be brought to the vicinity of the stationary norm yaw rate $\omega\_high$ calculated based on the steering angle norm yaw rate.

To describe in detail, in this reference example 1, a reference marginal norm yaw rate $\omega\_t1$ is calculated from equation (9) based on the allocation coefficient HB1 calculated by the allocation coefficient HB1 calculation unit 31, the transverse G norm yaw rate $\omega\_low$, and the stationary norm yaw rate $\omega\_high$ (refer to the following equation (9)).

$$\omega\_t1 = HB1 \times \omega\_high + (1-HB1) \times \omega\_low \qquad \text{equation (9)}$$

Here, the allocation coefficient HB1 is a numerical value in a range of 0 to 1, the reference marginal norm yaw rate ω_t1 takes the transverse G norm yaw rate ω_low where HB1=0, and the reference marginal norm yaw rate ω_μl takes the stationary norm yaw rate ω_high where HB1=1.

Next, the allocation coefficient HB1 calculated by the allocation coefficient HB1 calculation unit 31 is described with reference to FIG. 23.

The allocation coefficient HB1 is calculated by performing a multiplication of an allocation coefficient HB1$a$ calculated according to a vehicle speed, an allocation coefficient HB1$b$ calculated according to a yaw rate change rate, an allocation coefficient HB1$c$ calculated according to a yaw rate deviation integral, and an allocation coefficient HB1$d$ calculated according to a steering wheel rotation speed (refer to the following equation (10)).

$$HB1 = HB1a \times HB1b \times HB1c \times HB1d \qquad \text{equation (10)}$$

Figure 23:
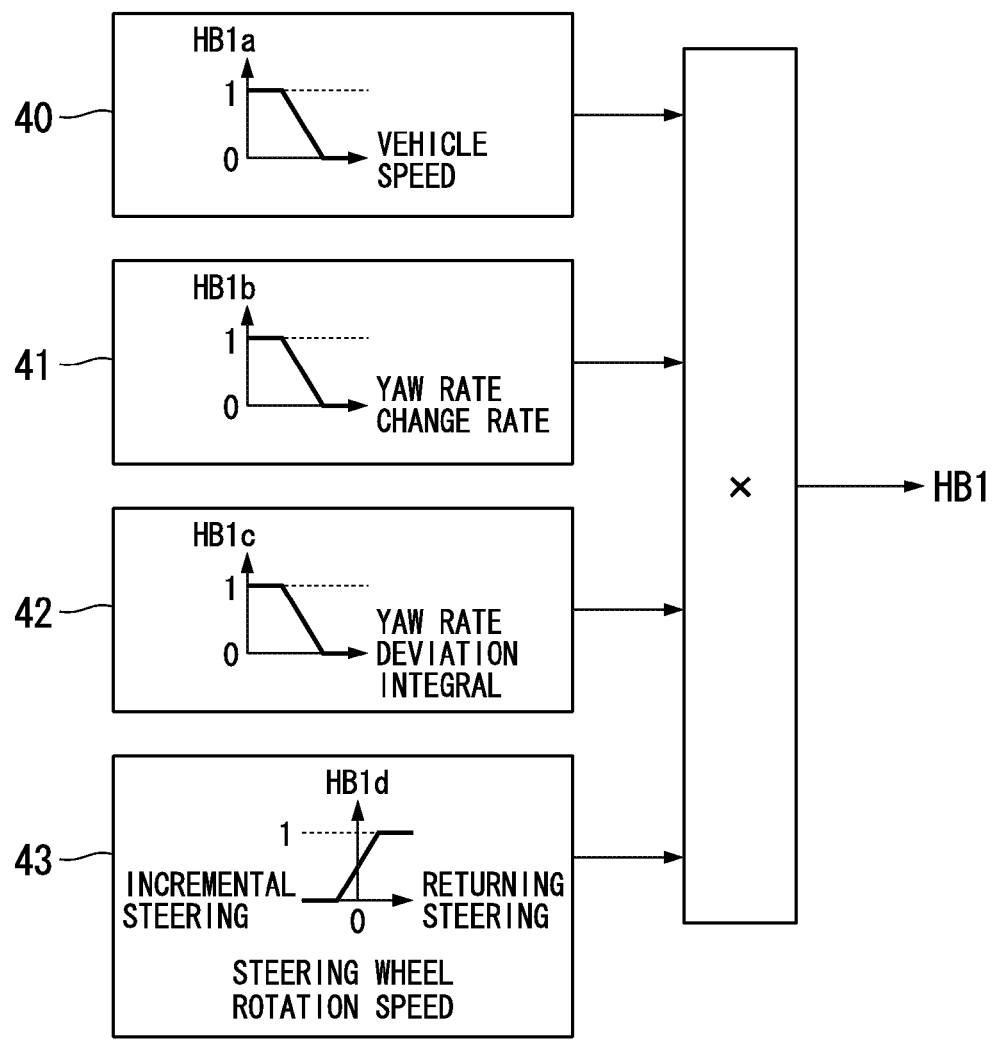
FIG. 23 is a diagram for explaining a method of calculating a distribution factor HB1 in reference example 1.

The respective allocation coefficients HB1$a$, HB1$b$, HB1$c$, and HB1$d$ are each calculated with reference to allocation coefficient tables 40, 41, 42, and 43 shown in FIG. 23. Each of the allocation coefficient tables 40, 41, 42, and 43 in this reference example 1 is described.

In the allocation coefficient table 40 for calculating an allocation coefficient HB1$a$, the horizontal axis represents vehicle speed, and the vertical axis represents allocation coefficient HB1$a$. This allocation coefficient table 40 is such that HB1$a$ is constant at HB1$a$=1 in a low speed range, the allocation coefficient HB1$a$ gradually becomes lower as the vehicle speed increases when the vehicle speed is greater than or equal to a predetermined value, and it becomes constant at HB1$a$=0 in a high speed range. As a result, by increasing the marginal norm yaw rate ω_TAR serving as a target value in the FB control amount calculation unit 119 when the vehicle speed is low, and by keeping the marginal norm yaw rate ω_TAR serving as a target value in the FB control amount calculation unit 119 from increasing when the vehicle speed is high, it is possible to ensure the stability of vehicle behavior.

In the allocation coefficient table 41 for calculating an allocation coefficient HB1$b$, the horizontal axis represents yaw rate change rate, and the vertical axis represents allocation coefficient HB1$b$. This allocation coefficient table 41 is such that HB1$b$ is constant at HB1$b$=1 in a range where the yaw rate change rate is low, the allocation coefficient HB1$b$ gradually becomes smaller as the yaw rate change rate becomes higher when the yaw rate change rate is greater than or equal to a predetermined value, and HB1$b$ becomes constant at HB1$b$=0 in a range where the yaw rate change rate is high. Here, the yaw rate change rate is a temporal change in the actual yaw rate detected by the yaw rate sensor 6, and it can be calculated by time-differentiating the actual yaw rate. For example, when a vehicle is performing an intensive slalom driving or vehicle behavior is unstable, a high yaw rate change rate is observed.

Since the marginal norm yaw rate ω_TAR serving as the target value in the FB control amount calculation unit 119 should not be made high in this type of case, when the yaw rate change rate is high, the allocation coefficient HB1$b$ is set to take a small value so that the marginal norm yaw rate ω_TAR will not become high.

In the allocation coefficient table 42 for calculating an allocation coefficient HB1$c$, the horizontal axis represents yaw rate deviation integral value, and the vertical axis represents allocation coefficient HB1$c$. This allocation coefficient table 42 is such that HB1$c$ is constant at HB1$c$=1 in a range where the yaw rate deviation integral value is small, the allocation coefficient HB1$c$ gradually becomes smaller as the yaw rate deviation integral value becomes higher when the yaw rate deviation integral value is greater than or equal to a predetermined value, and HB1$c$ becomes constant at HB1$c$=0 in a range where the yaw rate deviation integral value is large. Here, the yaw rate deviation integral value is a value obtained by integrating a deviation between the marginal norm yaw rate and the actual yaw rate detected by the yaw rate sensor 6, that is, the marginal yaw rate deviation Δωfb, since the steering operation started. For example, in a case where although the marginal yaw rate deviation Δωfb is small, this state is maintained for a long period of time, the yaw rate deviation integral value becomes large. In this type of case, there is a possibility that the vehicle may be slowly and gradually going into a spinning state, and therefore, the marginal norm yaw rate ω_TAR, which is the target value in the FB control amount calculation unit 119, should not be made large. Consequently, the allocation coefficient HB1$c$ is set to take a small value when the yaw rate deviation integral value is large, so that the marginal norm yaw rate ω_TAR will not be made large.

In the allocation coefficient table 43 for calculating an allocation coefficient HB1$d$, the horizontal axis represents steering wheel rotation speed, and the vertical axis represents allocation coefficient HB1$d$.

This allocation coefficient table 43 is set such that the allocation coefficient HB1$d$ becomes greater as the steering wheel rotation speed becomes greater, and the allocation coefficient HB1$d$ becomes greater in the case where the steering wheel rotation speed is positive than in the case where the steering wheel rotation speed is negative. Here, the steering wheel rotation speed is a value determined based on the amount of temporal change in the steering wheel turning angle detected by the steering wheel turning angle sensor 3, and the steering angle, and it can be calculated by time-differentiating the steering wheel turning angle and comparing it with the steering angle. A case of positive steering wheel rotation speed refers to a moment at which in a state where the steering wheel is operated to rotate in the direction of moving away from the neutral position (straight-ahead direction position), a temporal change amount toward the same direction is occurring, and a moment at which in a state where the steering wheel is operated to rotate toward the neutral position (straight-ahead direction position), a temporal change amount toward the same direction is occurring. A case of negative steering wheel rotation speed refers to a moment at which in a state where the steering wheel is operated to rotate in the direction of moving away from the neutral position (straight-ahead direction position), a temporal change amount in the direction toward the neutral position is occurring, and a moment at which in a state where the steering wheel is operated to rotate in the direction of returning to the neutral position, a temporal change amount in the direction of moving away from the neutral position is occurring.

When the steering wheel rotation speed is positive, the level of the steering intention of the driver to significantly turn the vehicle can be estimated as being high, and therefore, the allocation coefficient HB1$d$ is set to take a greater value as the steering wheel rotation speed is higher (the maximum value is constant at HB1$d$=1), so that the marginal norm yaw rate ω_TAR becomes greater. Thereby, the level of steering responsiveness is improved. On the other hand, when the steering wheel rotation speed is negative, the state can be estimated that the driver intends to converge the operation, and therefore, the allocation coefficient HB1$d$ is set to take a smaller value as the absolute value of the steering wheel rotation speed becomes greater (the minimum value is constant at HB1$d$=1), so that the marginal norm yaw rate ω_TAR will not be large.

As a result, the responsiveness of the steering wheel when avoiding a front obstacle or changing lanes is improved.

The allocation coefficient HB1$d$ may be calculated based on a steering wheel rotation angle (steering wheel rotation amount) instead of a steering wheel rotation speed. This is because the level of the intention of the driver to actively turn the vehicle can be estimated as being high when the steering wheel rotation angle is great. In this case, a steering wheel rotation angle is synonymous with a steering wheel turning angle.

Next, the correction coefficient HS1 calculated by the correction coefficient HS1 calculation unit 33 is described with reference to FIG. 24.

This correction coefficient HS1 is a correction coefficient which assumes a situation where the driver rotates the steering wheel while a frontal load is being applied to the vehicle to thereby perform a vehicle turning operation.

Figure 24:
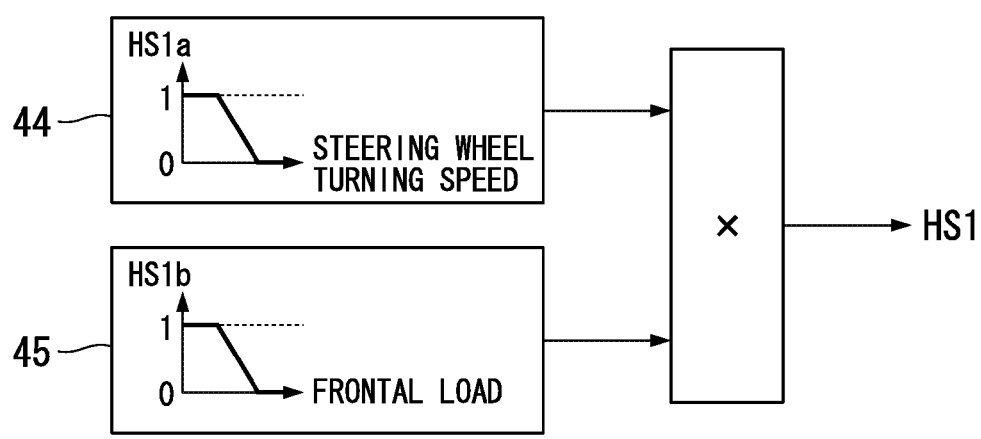
FIG. 24 is a diagram for explaining a method of calculating a correction factor HS1 in reference example 1.

As shown in FIG. 24, a correction coefficient HS1 is calculated by multiplying a correction coefficient HS1$a$ calculated according to a steering wheel turning speed by a correction coefficient HS1$b$ calculated according to the frontal load on the vehicle (refer to the following equation (11)).

$$HS1 = HS1a \times HS1b \qquad \text{equation (11)}$$

A vehicle frontal load refers to an amount of load shift toward the front of the vehicle, and, for example, it can be estimated based on a forward-backward acceleration sensor (not shown in the figure) for detecting acceleration in the front-rear direction of the vehicle. In this case, the forward-backward acceleration sensor may be referred to as a load shift amount estimation device which estimates the amount of load shift in the front-rear direction.

The respective correction coefficients HS1$a$ and HS1$b$ are calculated, with reference to correction coefficient tables 44 and 45 each shown in FIG. 24. The correction coefficient tables 44 and 45 in this reference example 1 are described.

In the correction coefficient table 44 for calculating a correction coefficient HS1$a$, the horizontal axis represents steering wheel turning speed, and the vertical axis represents correction coefficient HS1$a$. This correction coefficient HS1$a$ table 44 is such that HS1$a$ is constant at HS1$a$=1 in a range where the steering wheel turning speed is low, the correction coefficient HS1$a$ gradually becomes smaller as the steering wheel turning speed becomes higher when the steering wheel turning speed is greater than or equal to a predetermined value, and HS1$a$ becomes constant at HS1$a$=0 in a range where the steering wheel turning speed is high.

In the correction coefficient table 45 for calculating a correction coefficient HS1$b$, the horizontal axis represents frontal load (load shift amount toward the front of the vehicle), and the vertical axis represents correction coefficient HS1$b$. This correction coefficient HS1$b$ table 45 is such that HS1$b$ is constant at HS1$b$=1 in a range where the frontal load is low, the correction coefficient HS1$b$ gradually becomes smaller as the frontal load becomes higher when the frontal load is greater than or equal to a predetermined value, and HS1$b$ becomes constant at HS1$b$=0 in a range where the frontal load is high.

As described above, the vehicle can be turned more easily if the steering wheel is rotated with a frontal load being applied to the vehicle. However, vehicle behavior is likely to become unstable as the level of the frontal load becomes greater, and vehicle behavior is likely to become unstable as the steering wheel turning speed becomes higher. The correction coefficient HS1 is a correction coefficient for adjusting the marginal norm yaw rate ω_TAR at the time of performing this type of steering operation.

As a result of calculating the correction coefficient HS1 as described above, the correction coefficient HS1 takes 1 in a range where the steering wheel turning speed is low and the frontal load is low, and therefore, the marginal norm yaw rate ω_TAR can be made high, and the level of turnability can be improved. In contrast, the correction coefficient HS1 becomes smaller than 1 as the steering wheel turning speed and the frontal load become greater, and therefore, the marginal norm yaw rate ω_TAR can be made low, and the stability of vehicle behavior can be ensured.

Next, the correction coefficient HS2 calculated by the correction coefficient HS2 calculation unit 34 is described.

This correction coefficient HS2 is a correction coefficient which assumes a case where a lane-change (an operation of returning the steering wheel to the original traveling direction immediately after operating the steering wheel) is performed on the road surface when the friction coefficient between the wheels and the road surface (hereunder, abbreviated as μ) is high (hereunder, abbreviated as high μ road surface).

The correction coefficient HS2 is a type of gain constituted such that, with 1 being the maximum value, a predetermined decrement count value is subtracted from the initial value when conditions below are met, and a predetermined increment count value is added to 1 when none of the conditions below is met. The predetermined decrement count value is subtracted when the following conditions are met: (a) when the friction coefficient t is determined as being high (or when front-rear direction or transverse direction acceleration corresponding to traveling on a road surface with a high friction coefficient is detected); (b) when the steering wheel turning angle is determined as being large; (c) when the transverse G decrement rate is determined as being high; and (d) when the yaw rate decrement rate is determined as being high. Among the above conditions, at least one or more of (a) through (d) may be arbitrarily combined. When taking into consideration the vehicle behavior convergence particularly when the friction coefficient is high, it is preferable that (a) and any one of (b) through (d) are combined to be used.

The friction coefficient μ is calculated by the μ calculation unit 8. Moreover, a transverse G decrement rate is a decremental speed of transverse G, and it can be calculated based on a transverse G detected by the transverse G sensor 5. A yaw rate decrement rate is a decrement speed of an actual yaw rate detected by the yaw rate sensor 6.

Figure 25:
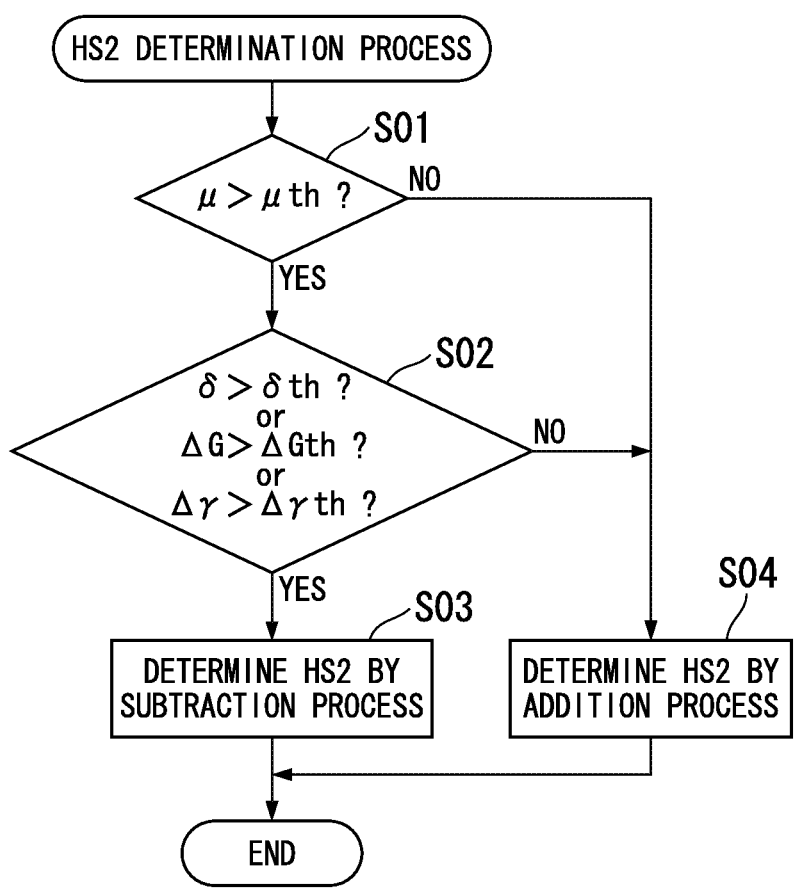
FIG. 25 is a flow chart showing a process for determining a correction factor HS2 in reference example 1.

An example of a process of determining a correction coefficient HS2 is described according to the flow chart of FIG. 25.

First, in step S01, it is determined whether or not the friction coefficient μ is greater than the threshold value μth.

If the result of the determination in step S01 is "YES" (μ>μth), the flow proceeds to step S02, where it is determined whether or not at least one of the following conditions is satisfied: whether the steering wheel turning angle δ is greater than the threshold value δth (δ>δth); whether the transverse G decrement rate ΔG is greater than the threshold value ΔGth (Δ>ΔGth); and whether the yaw rate decrement rate γ is greater than the threshold value γth (γ>γth).

If the result of the determination in step S02 is "YES", the flow proceeds to step S03 where a correction coefficient HS2 is determined by means of a subtraction process, and then the execution of this routine ends once. This subtraction process repeatedly subtracts a predetermined subtraction count value from the initial value of the correction coefficient HS2, so that the correction coefficient HS2 converges to 0.

On the other hand, in the case where the result of the determination in step S01 is "NO" (μ≤μth), and in the case where the result of the determination in step S02 is "NO", the flow proceeds to step S04 to determine a correction coefficient HS2 by means of an addition process, and the execution of this routine ends once. This addition process repeatedly adds a predetermined increment count value so that the correction coefficient HS2 converges to 1.

The initial value of the correction coefficient HS2 is a predetermined value between 0 and 1.

In the case where the yaw rate and the transverse G suddenly decrease when changing lanes on a high-μ road surface, a large yaw rate may occur in the direction opposite of the intended traveling direction as a result of steering. At this time, if the marginal norm yaw rate ω_TAR is made greater, there is a possibility that the traceability of the vehicle with respect to steering may be deteriorated. The correction coefficient HS2 is to suppress this. That is to say, in the case where the friction coefficient μ, the steering wheel turning angle, the transverse G decrement rate, and the yaw rate decrement rate are large, by setting the correction coefficient HS2 to take a small value, the marginal norm yaw rate ω_TAR is kept from becoming large, and thereby the level of yaw rate convergence after lane changing is improved.

Next, the correction coefficient HS3 calculated by the correction coefficient HS3 calculation unit 35 is described with reference to FIG. 26.

This correction coefficient HS3 is a correction coefficient which assumes a situation where the driver performs a tuck-in. The tuck-in refers to a phenomenon in which the vehicle moves onto the inner side of a turn with a frontal force being applied to the vehicle when the accelerator pedal is suddenly returned while the vehicle is turning. Some drivers may utilize this phenomenon to actively perform turning operations in some cases. However, this turning operation with use of the tuck-in is likely to result in instability of vehicle behavior when the accelerator throttle is opened from the moment where the amount of torque requested for the vehicle is large (in other words, where the accelerator throttle opening is large), or when the vehicle speed is high. The correction coefficient HS3 is a correction coefficient for adjusting the marginal norm yaw rate ω_TAR at the time of performing the tuck-in.

Figure 26:
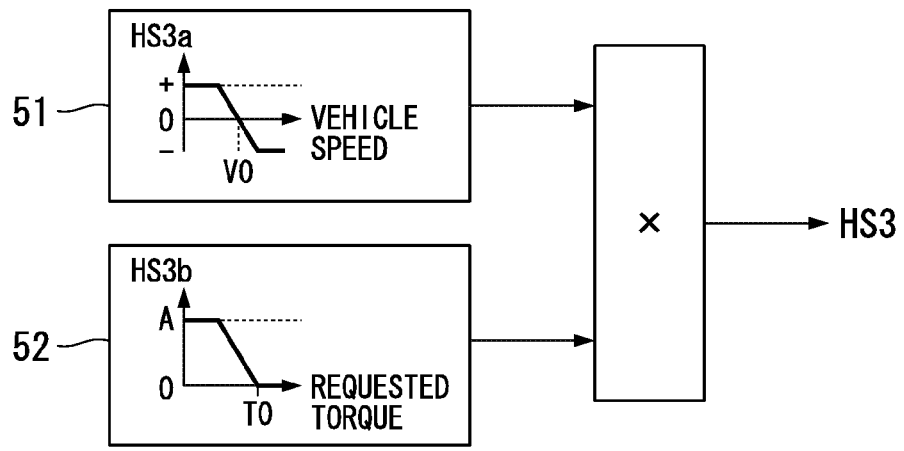
FIG. 26 is a diagram for explaining a method of calculating a correction factor HS3 in reference example 1.

As shown in FIG. 26, a correction coefficient HS3 is calculated by multiplying a correction coefficient HS3a calculated according to a vehicle speed by a correction coefficient HS3b calculated according to a requested torque of the vehicle (refer to the following equation (12)).

$$HS3 = HS3a \times HS3b \quad \text{equation (12)}$$

The requested torque of the vehicle can be calculated from the accelerator throttle opening detected by the accelerator throttle opening sensor 7.

The respective correction coefficients HS3a and HS3b are calculated, with reference to correction coefficient tables 51 and 52 each shown in FIG. 26. The correction coefficient tables 51 and 52 in this reference example 1 are described.

In the correction coefficient table 51 for calculating a correction coefficient HS3a, the horizontal axis represents vehicle speed, and the vertical axis represents correction coefficient HS3a. This correction coefficient HS3a table 51 is such that HS3a takes a constant positive value in a range where the vehicle speed is lower than a predetermined value, the correction coefficient HS3a gradually becomes smaller as the vehicle speed becomes higher when the vehicle speed is greater than or equal to the predetermined value, it takes a negative value when the vehicle speed exceeds a predetermined speed V0, and it takes a constant negative value in a range where the vehicle speed is significantly high.

In the correction coefficient table 52 for calculating a correction coefficient HS3b, the horizontal axis represents requested torque of the vehicle, and the vertical axis represents correction coefficient HS3b. This correction coefficient HS3b table 52 is such that HS3b takes a positive value in a range where the requested torque is lower than a predetermined value T0, and the correction coefficient is HS3b=0 in a range where the requested torque is greater than or equal to the predetermined value T0. Here, the predetermined value T0 is an extremely small value, and it is set for a requested torque corresponding to the moment where the accelerator throttle opening is close to zero, for example.

By setting the correction coefficient tables 51 and 52 in this manner, in the case where the requested torque is greater than or equal to the predetermined value T0 (that is, where the state is determined as not being tuck-in), the correction coefficient HS3 takes 0 regardless of the vehicle speed, so that the marginal norm yaw rate ω_TAR will not be corrected.

Moreover, in the case where the requested torque is less than or equal to the predetermined value T0 (that is, where the state is determined as being tuck-in), since the correction coefficient HS3 takes a positive value when the vehicle speed is lower than V0, the marginal norm yaw rate ω_TAR can be made large, and since the correction coefficient HS3 takes a negative value when the vehicle speed is greater than or equal to V0, the marginal norm yaw rate ω_TAR can be made small. Furthermore, in the case where the vehicle speed is lower than V0, when the requested torque is the same, the correction coefficient H3 is set to take a larger positive value as the vehicle speed becomes lower, and thereby the marginal norm yaw rate ω_TAR can be made large. As a result, it is possible to improve the level of turnability at the time of tuck-in where the vehicle speed is in a range of low to medium speed. On the other hand, in the case where the vehicle speed is higher than or equal to V0, when the requested torque is the same, the correction coefficient H3 is set to take a larger positive value as the vehicle speed becomes higher, and thereby the marginal norm yaw rate ω_TAR can be made small.

Figure 27:
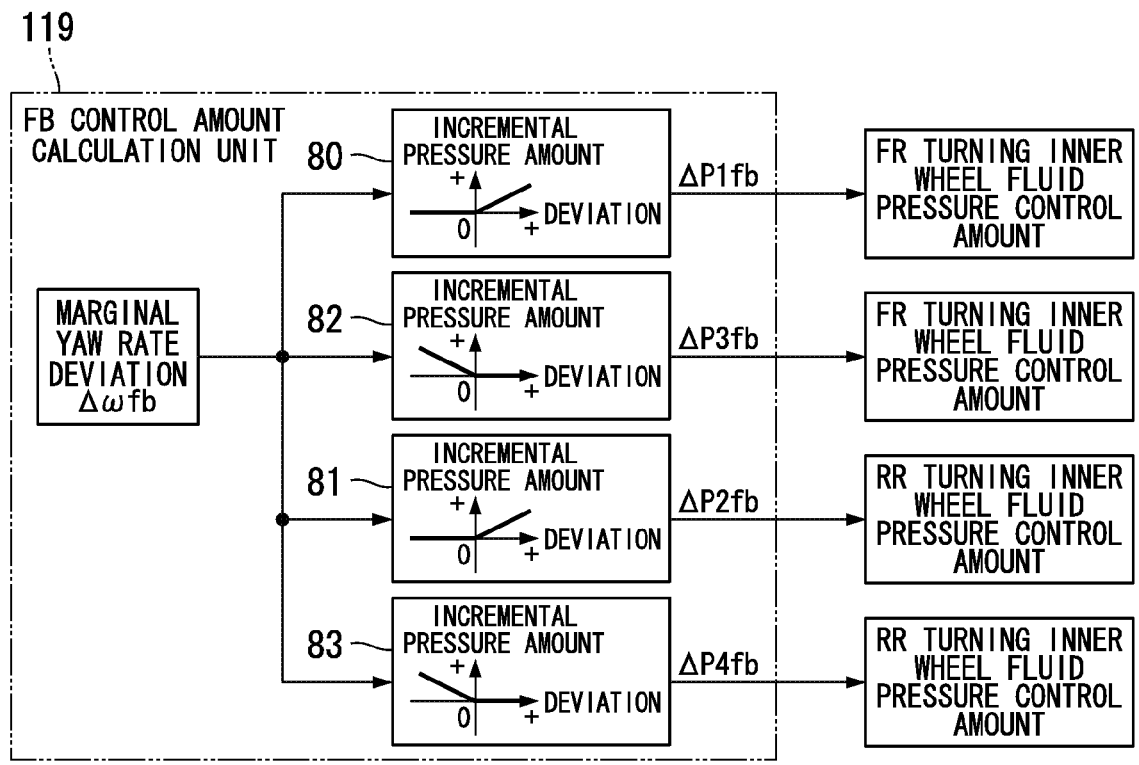
FIG. 27 is a block diagram of a braking force control amount calculation in reference example 1.

Next, with reference to FIG. 27, there is described calculation of a braking control amount to be performed in the FB control amount calculation unit 119 (hereunder, referred to as FB control amount).

In the FB control amount calculation unit 119, based on the marginal yaw rate deviation Δωfb calculated by the marginal yaw rate deviation calculation unit 16, there are calculated an FB incremental pressure amount ΔP1fb of the turning inner wheel on the front wheel side (hereunder, abbreviated as FR turning inner wheel), an FB incremental pressure amount Δp3fb of the turning outer wheel on the front wheel side (hereunder, abbreviated as FR turning outer wheel), an FB incremental pressure amount ΔP2fb of the turning inner wheel on the rear wheel side (hereunder, abbreviated as RR turning inner wheel), and an FB incremental pressure amount ΔP4fb of the turning outer wheel on the rear wheel side (hereunder, abbreviated as RR turning outer wheel). The subsequent turning direction is described with an example of a case where the deviation Δωfb is positive, and the norm yaw rate and the actual yaw rate are both positive.

The FB incremental pressure amount ΔP1fb of the FR turning inner wheel is calculated based on the marginal yaw rate deviation Δωfb, with reference to the incremental pressure amount table 80. In the incremental pressure amount table 80, the horizontal axis represents marginal yaw rate deviation Δωfb, and the vertical axis represents FB incremental pressure amount ΔP1 fb. In this reference example 1, in the case where the marginal yaw rate deviation $\Delta\omega fb$ is not more than 0, the FB incremental pressure amount $\Delta P1fb$ is 0, and when the marginal yaw rate deviation $\Delta\omega fb$ is not less than 0, the FB incremental pressure amount $\Delta P1fb$ increases as the marginal yaw rate deviation $\Delta\omega fb$ becomes greater.

The FB incremental pressure amount $\Delta P2fb$ of the RR turning inner wheel is calculated based on the marginal yaw rate deviation $\Delta\omega fb$, with reference to the incremental pressure amount table 81. In the incremental pressure amount table 81, the horizontal axis represents marginal yaw rate deviation $\Delta\omega fb$, and the vertical axis represents FB incremental pressure amount $\Delta P2fb$. In this reference example 1, in the case where the marginal yaw rate deviation $\Delta\omega fb$ is not more than 0, the FB incremental pressure amount $\Delta P2fb$ is 0, and when the marginal yaw rate deviation $\Delta\omega fb$ is not less than 0, the FB incremental pressure amount $\Delta P2fb$ increases as the marginal yaw rate deviation $\Delta\omega fb$ becomes greater.

The FB incremental pressure amount $\Delta P3fb$ of the FR turning outer wheel is calculated based on the marginal yaw rate deviation $\Delta\omega fb$, with reference to the incremental pressure amount table 82. In the incremental pressure amount table 82, the horizontal axis represents marginal yaw rate deviation $\Delta\omega fb$, and the vertical axis represents FB incremental pressure amount $\Delta P3fb$. In this reference example 1, in the case where the marginal yaw rate deviation $\Delta\omega fb$ is not less than 0, the FB incremental pressure amount $\Delta P3fb$ is 0, and when the marginal yaw rate deviation $\Delta\omega fb$ is not more than 0, the FB incremental pressure amount $\Delta P3fb$ increases as the absolute value of the marginal yaw rate deviation $\Delta\omega fb$ becomes greater.

The FB incremental pressure amount $\Delta P4fb$ of the RR turning outer wheel is calculated based on the marginal yaw rate deviation $\Delta\omega fb$, with reference to the incremental pressure amount table 83. In the incremental pressure amount table 83, the horizontal axis represents marginal yaw rate deviation $\Delta\omega fb$, and the vertical axis represents FB incremental pressure amount $\Delta P4fb$. In this reference example 1, in the case where the marginal yaw rate deviation $\Delta\omega fb$ is not less than 0, the FB incremental pressure amount $\Delta P4fb$ is 0, and when the marginal yaw rate deviation $\Delta\omega fb$ is not more than 0, the FB incremental pressure amount $\Delta P4fb$ increases as the absolute value of the marginal yaw rate deviation $\Delta\omega fb$ becomes greater.

That is to say, in the FB control amount calculation unit 119, in the case where the marginal yaw rate deviation $\Delta\omega fb$ is not less than 0, since the actual yaw rate is smaller than the marginal norm yaw rate, the FB control amount of each wheel is set in the direction of increasing the yaw rate (in other words, in the direction of nullifying the marginal yaw rate deviation $\Delta\omega fb$). Specifically, the FB incremental pressure amount is set in the direction of increasing the brake fluid pressure of the FR turning inner wheel and the RR turning inner wheel, and the FB incremental pressure amount is set so as not to increase the brake fluid pressure of the FR turning outer wheel and the RR turning outer wheel.

On the other hand, in the case where the marginal yaw rate deviation $\Delta\omega fb$ is not more than 0, since the actual yaw rate is greater than the marginal norm yaw rate, the FB control amount of each wheel is set in the direction of reducing the yaw rate (in other words, in the direction of nullifying the marginal yaw rate deviation $\Delta\omega fb$). Specifically, the FB incremental pressure amount is set in the direction of increasing the brake fluid pressure of the FR turning outer wheel and the RR turning outer wheel, and the FB incremental pressure amount is set so as not to increase the brake fluid pressure of the FR turning inner wheel and the RR turning inner wheel.

The FB control amount calculation unit 119 outputs the FB incremental pressure amount $\Delta P1fb$ of the FR turning inner wheel, the FB incremental pressure amount $\Delta P2fb$ of the RR turning inner wheel, the FB incremental pressure amount $\Delta P3fb$ of the FR turning outer wheel, and the FB incremental pressure amount $\Delta P4fb$ of the RR turning outer wheel, to the braking device 10.

The braking device 10 controls the braking pressure of each wheel according to the input control amount of each wheel.

According to the turning control device for a vehicle of this reference example 1, the correction unit 15 corrects the transverse G norm yaw rate $\omega\_low$ in the incremental direction while associating it with the stationary norm yaw rate $\omega\_high$ calculated based on the steering wheel turning angle, and calculates the marginal norm yaw rate $\omega\_TAR$. Therefore, control of stabilizing the yaw moment occurring in the vehicle body, and control of improving steering responsiveness can both be realized. As a result, the turning intention of the driver is responsively reflected, and the feel of steering is improved.

Moreover, since the transverse G norm yaw rate $\omega\_low$ is corrected in the incremental direction to set the marginal norm yaw rate $\omega\_TAR$, it is possible to increase the target value in the FB control amount calculation unit 119, and the level of turnability is improved. As a result, it is possible to turn the vehicle along the traveling path, and the level of road surface tracking performance (traceability) is improved.

REFERENCE EXAMPLE 2

Figure 28:
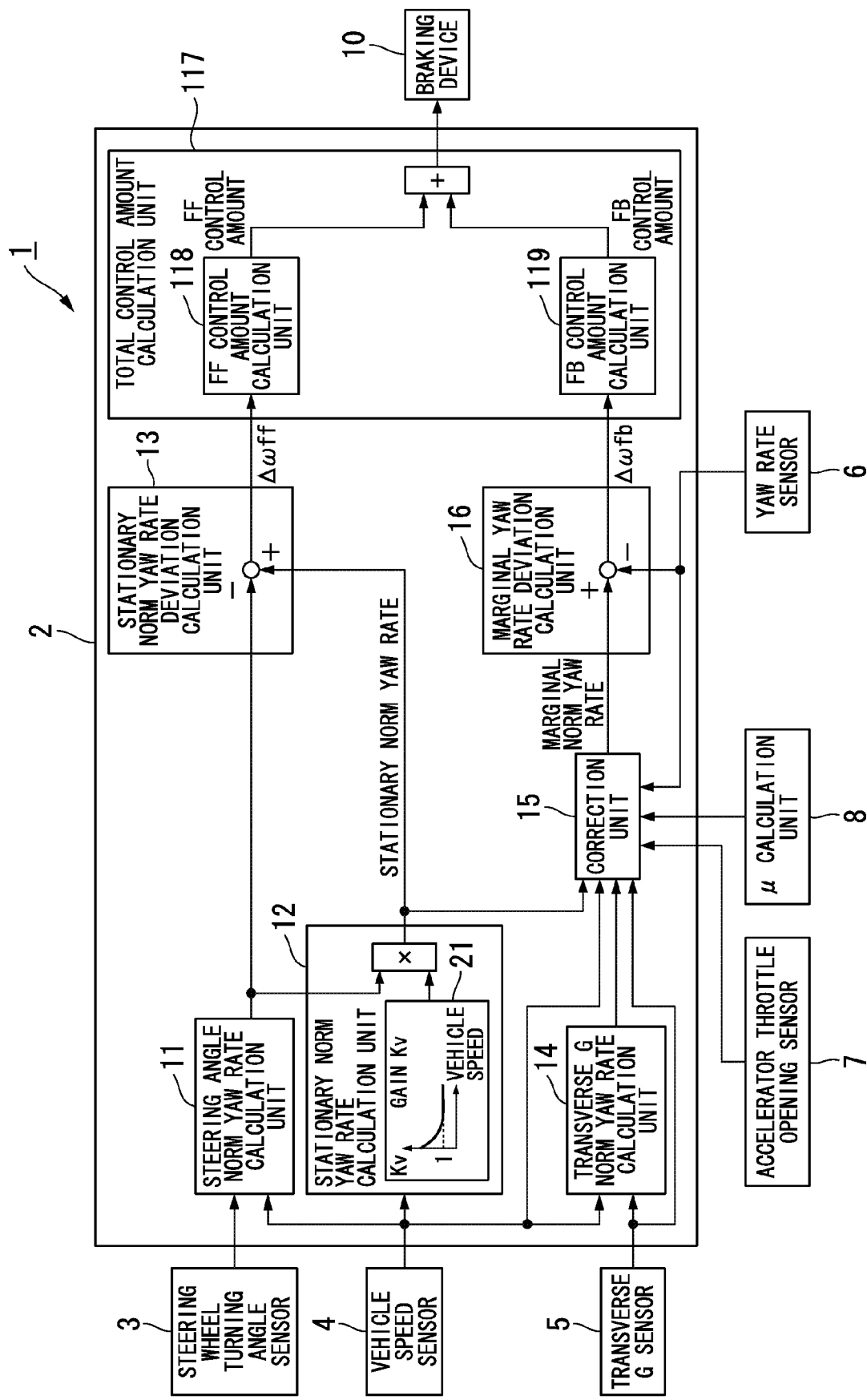
FIG. 28 is a block diagram showing a reference example 2 of the turning control device for a vehicle according to the second embodiment of the present invention.
Figure 29:
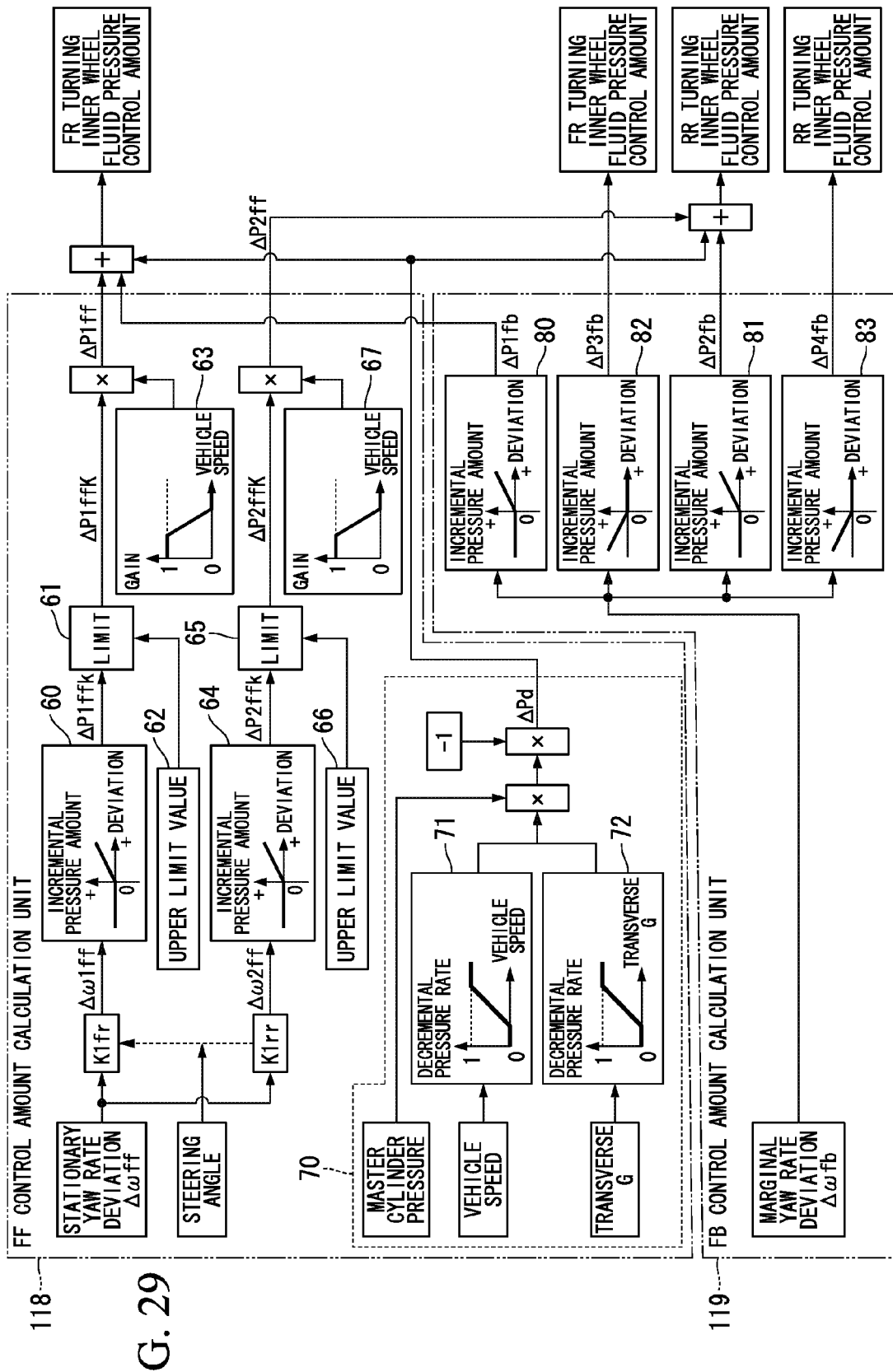
FIG. 29 is a block diagram of a braking force control amount calculation in reference example 2.

Next, a reference example 2 of the turning control device for a vehicle according to the second embodiment of the present invention is described, with reference to the diagrams of FIG. 28 and FIG. 29.

FIG. 28 is a control block diagram of the turning control device for a vehicle of reference example 2. In the turning control device for a vehicle of reference example 1 described above, a control amount (FB control amount) is found in the direction of nullifying the deviation between the marginal norm yaw rate $\omega\_TAR$ and the actual yaw rate (that is, the marginal yaw rate deviation $\Delta\omega fb$), and the braking pressure is controlled only with this FB control amount. However, in the turning control device of reference example 2, a feedforward control amount (hereunder, abbreviated as FF control amount) is calculated based on a steering wheel turning angle and a vehicle speed, and a value obtained as a sum of the FB control amount and the FF control amount is taken as a total control amount, and the braking pressure of each wheel is controlled based on this total control amount.

Hereunder, the turning control device for a vehicle of reference example 2 is described. However, in the control block diagram of FIG. 28, the feedback control system, that is, the steering angle norm yaw rate calculation unit 11, the stationary norm yaw rate calculation unit 12, the transverse G norm yaw rate calculation unit 14, the correction unit 15, the marginal yaw rate deviation calculation unit 16, and the FB control amount calculation unit 119 are the same as those of reference example 1. Therefore, the same aspect portions are given the same reference symbols and descriptions thereof are omitted, and a feedforward control system, which is different from reference example 1, is primarily described.

The turning control device 1 for a vehicle in reference example 2 is provided with, in addition to the configuration of the turning control device 1 for a vehicle of reference example 1, as a feedforward control system, a stationary yaw rate deviation calculation unit 13 and a feedforward control amount calculation unit 118 (fourth braking force control amount calculation unit) (hereunder, abbreviated as FF control amount calculation unit, however, it partly differs from the FF control amount calculation unit in the first embodiment). The FF control amount calculation unit 118 and the FB control amount calculation unit 119 in reference example 1 configure a control amount calculation unit 117.

The stationary yaw rate deviation calculation unit 13 receives an input of a steering angle norm yaw rate in which a temporal change amount leveling process or a peak hold process or the like has been performed on the steering angle norm yaw rate calculated by the steering angle norm yaw rate calculation unit 11 to remove noise therefrom. The stationary yaw rate deviation calculation unit 13 subtracts the steering angle norm yaw rate after the noise removal from the stationary norm yaw rate $\omega\_high$, to calculate a stationary yaw rate deviation $\Delta\omega ff$.

The control amount calculation unit 117 is such that: in the FF control amount calculation unit 118, an FF control amount is calculated based on the stationary yaw rate deviation $\Delta\omega ff$; in the FB control amount calculation unit 119, an FB control amount is calculated based on the marginal yaw rate deviation $\Delta\omega fb$; further, the FF control amount and the FB control amount are added to calculate a total control amount; and it is output as a command value to the braking device 10.

Next, a braking control amount calculation to be performed in the control amount calculation unit 117 is described, with reference to FIG. 29.

An FF control amount calculation in the FF control amount calculation unit 118 is described.

First, incremental pressure allocations for the FR turning inner wheel and the RR turning inner wheel are determined based on a steering wheel turning angle detected by the steering wheel turning angle sensor 3, and an incremental pressure coefficient K1$fr$ for the FR turning inner wheel and an incremental pressure coefficient Kin for the RR turning inner wheel are calculated based on these incremental pressure allocations. Here, in the case where the load shift due to the steering operation is large, the incremental pressure coefficient K1$fr$ for the FR turning inner wheel may be set to become greater according to the steering wheel turning angle.

Based on the incremental pressure coefficient K1$fr$ for the FR turning inner wheel and the incremental pressure coefficient K1$rr$ for the RR turning inner wheel, a calculation of the FF incremental pressure amount $\Delta P1ff$ for the FR turning inner wheel, and a calculation of the FF incremental pressure amount $\Delta P2ff$ for the RR turning inner wheel are performed in parallel.

First, the calculation of the FF incremental pressure amount $\Delta P1ff$ for the FR turning inner wheel is described. The stationary yaw rate deviation $\Delta\omega ff$ calculated by the stationary yaw rate deviation calculation unit 13 is multiplied by the incremental coefficient K1$fr$, to calculate the stationary yaw rate deviation $\Delta\omega 1ff$ for the FR turning inner wheel.

Next, with reference to the incremental pressure amount table 60, a brake fluid incremental pressure amount $\Delta P1ffk$ for the FR turning inner wheel is calculated, according to the stationary yaw rate deviation $\Delta\omega 1ff$ for the FR turning inner wheel. In the incremental pressure amount table 60, the horizontal axis represents stationary yaw rate deviation $\Delta\omega 1ff$, and the vertical axis represents brake fluid incremental pressure amount $\Delta\omega 1ffk$. In this reference example 2, in the case where the stationary yaw rate deviation $\Delta\omega 1ff$ for the FR turning inner wheel is not more than 0, the brake fluid incremental pressure amount $\Delta P1ffk$ is 0, and when the stationary yaw rate deviation $\Delta\omega 1ff$ for the FR turning inner wheel is not less than 0, the brake fluid incremental pressure amount $\Delta P1ffk$ increases as the stationary yaw rate deviation $\Delta\omega 1ff$ becomes greater.

Next, a limiting process unit 61 performs a limiting process so that the brake fluid incremental pressure amount $\Delta P1ffk$ for the FR turning inner wheel will not exceed an upper limit value. The upper limit value is an arbitrary value calculated by an upper limit value calculation unit 62, and by setting this value not to be exceeded, a sudden change in the fluid incremental pressure amount $\Delta P1ffk$ is suppressed.

Next, the brake fluid incremental pressure amount $\Delta P1ffk$ for the FR turning inner wheel which has undergone the limiting process is multiplied by a gain according to a vehicle speed, to calculate an FF incremental pressure amount $\Delta P1ff$ for the FR turning inner wheel. The gain according to the vehicle speed is calculated based on a gain table 63. In this gain table 63, the horizontal axis represents vehicle speed, and the vertical axis represents gain, where: the gain is constant at gain=1 in a low vehicle speed range; the gain gradually becomes smaller as the vehicle speed increases where the vehicle speed is greater than or equal to a predetermined value; and the gain becomes constant at gain=0 in a high vehicle speed range.

As a result of multiplying it by a gain according to the vehicle speed in this manner, when the vehicle speed is high, the FF incremental pressure amount $\Delta P1ff$ for the FR turning inner wheel becomes 0. In other words, when the vehicle speed is high, the FF incremental pressure amount $\Delta P1ff$ for the FR turning inner wheel is nullified. Thereby, it is possible to prevent instability of vehicle behavior caused by steering assist braking performed when the vehicle speed is high. In this reference example 2, the gain table 63 configures a nullification device. Instead of multiplying it by a gain according to the vehicle speed, there may be given a limitation value which becomes lower as the vehicle speed becomes higher, and the $\Delta P1ff$ may be set so as not to exceed this limitation value.

A calculation of the FF incremental pressure amount $\Delta P2ff$ for the RR turning inner wheel is the same as the calculation of the FF incremental pressure amount $\Delta P1ff$ for the FR turning inner wheel, and therefore, a simplified description thereof is made.

The stationary yaw rate deviation $\Delta\omega ff$ calculated by the stationary yaw rate deviation calculation unit 13 is multiplied by the incremental coefficient K1$rr$ for the RR turning inner wheel, to calculate a stationary yaw rate deviation $\Delta\omega 2ff$ for the RR turning inner wheel.

Next, with reference to the incremental pressure amount table 64, a brake fluid incremental pressure amount $\Delta P2ffk$ for the RR turning inner wheel is calculated, according to the stationary yaw rate deviation $\Delta\omega 2ff$ for the RR turning inner wheel. Since the incremental pressure amount table 64 is the same as the incremental pressure amount table 60, the description thereof is omitted.

Next, a limiting process unit 65 performs a limiting process so that the brake fluid incremental pressure amount $\Delta P2ffk$ for the RR turning inner wheel will not exceed an upper limit value. The upper limit value is calculated by an upper limit value calculation unit 66. The upper limit value calculation unit 66 is the same as the upper limit value calculation unit 62.

Next, the brake fluid incremental pressure amount $\Delta P2ffk$ for the RR turning inner wheel which has undergone the limiting process is multiplied by a gain calculated based on the gain table 67, to calculate an FF incremental pressure amount $\Delta P2ff$ for the RR turning inner wheel. The gain table 67 is the same as the gain table 63, and therefore, the description thereof is omitted. In this reference example 2, the gain table 67 configures a nullification device.

Moreover, the FF control amount calculation unit 118 is provided with an inner wheel decremental pressure amount calculation unit 70. The inner wheel decremental pressure amount calculation unit 70 is to preliminarily limit the brake fluid pressure on the assumption that the vehicle behavior becomes unstable due to braking when the vehicle speed is high or the level of transverse G is high.

In the inner wheel decremental pressure amount calculation unit 70: a decremental pressure amount according to the vehicle speed is calculated with reference to a first decremental pressure rate table 71; a decremental pressure rate according to the transverse G is calculated with reference to a second decremental pressure rate table 72; and a total decremental pressure rate is calculated by multiplying these decremental pressure rates.

In the first decremental pressure rate table 71, the horizontal axis represents vehicle speed, and the vertical axis represents decremental pressure rate, where: the decremental pressure rate is constant at decremental pressure rate=1 in a low vehicle speed range; the decremental pressure rate gradually becomes greater as the vehicle speed increases where the vehicle speed is greater than or equal to a predetermined value; and the decremental pressure rate becomes constant at decremental pressure rate=0 in a high vehicle speed range.

In the second decremental pressure rate table 72, the horizontal axis represents transverse G, and the vertical axis represents decremental pressure rate, where: the decremental pressure rate is constant at decremental pressure rate=0 in a range where the transverse G is small; the decremental pressure rate gradually becomes greater as the transverse G increases where the transverse G is greater than or equal to a predetermined value; and the decremental pressure rate becomes constant at decremental pressure rate=1 in a range where the transverse G is large.

As a result, the total decremental pressure rate is set to a value between 0 and 1 according to the vehicle speed and the transverse G at the time of traveling.

Then, the total decremental pressure rate found in this way is multiplied by a master cylinder pressure of the braking device 10, and it is further multiplied by minus 1, to find an inner wheel decremental pressure amount ΔPd.

The calculation of the FB control amount in the FB control amount calculation unit 119 is the same as that of reference example 1, and therefore, the description thereof is omitted.

The control amount calculation unit 117 outputs to the braking device 10: a value obtained as a sum of the FF incremental pressure amount ΔP1ff for the FR turning inner wheel, the FB incremental pressure amount ΔP1fb for the FR turning inner wheel, and the inner wheel decremental pressure amount ΔPd, as a total control amount for the FR turning inner wheel; a value obtained as a sum of the FF incremental pressure amount ΔP2ff for the RR turning inner wheel, the FB incremental pressure amount ΔPfb for the RR turning inner wheel, and the inner wheel decremental pressure amount ΔPd, as a total control amount for the RR turning inner wheel; the FB incremental pressure amount ΔP3fb for the FR turning outer wheel as a total control amount for the FR turning outer wheel; and the FB incremental pressure amount ΔP4fb for the RR turning outer wheel as a total control amount for the RR turning outer wheel.

The braking device 10 controls the braking pressure of each wheel according to the input control amount of each wheel.

According to the turning control device for a vehicle of this reference example 2, as with the case of reference example 1, the correction unit 15 corrects the transverse G norm yaw rate ω_low in the incremental direction while associating it with the stationary norm yaw rate ω_high calculated based on the steering wheel turning angle, and calculates the marginal norm yaw rate ω_TAR. Therefore, control of stabilizing the yaw moment occurring in the vehicle body, and control of improving steering responsiveness can both be realized. As a result, the turning intention of the driver is responsively reflected, and the feel of steering can be improved.

Moreover, since the transverse G norm yaw rate ω_low is corrected in the incremental direction to set the marginal norm yaw rate ω_TAR, it is possible to increase the target value in the FB control amount calculation unit 119, and the level of turnability is improved. As a result, it is possible to turn the vehicle along the traveling path, and the level of road surface tracking performance (traceability) is improved.

Furthermore, according to the turning control device for a vehicle of this reference example 2, since the braking pressure is controlled based on the total control amount obtained by adding the FB control amount calculated based on the vehicle behavior, to the FF control amount calculated based on the steering input, it is possible to ensure the stability of vehicle behavior while improving the level of steering responsiveness. Moreover, the level of steering tracking is also improved. For example, in a process in which steering is maintained after the steering input, such as when turning in a continuous circle, fluctuation of the control amounts is suppressed, so that the level of steering tracking is improved.

Next, a working example of the turning control device for a vehicle according to the second embodiment of the present invention is described, with reference to the diagrams of FIG. 30 through FIG. 37.

WORKING EXAMPLE 1

First, working example 1 of a turning control device for a vehicle according to the second embodiment of the present invention is described, with reference to the diagrams of FIG. 30 through FIG. 33.

In reference example 1 described above: a stationary norm yaw rate ω_high is calculated by multiplying a steering angle norm yaw rate by a gain set according to a vehicle speed (stationary norm yaw rate gain Kv); this stationary norm yaw rate ω_high is input to the correction unit 15; and the transverse G norm yaw rate ω_low is associated with the stationary norm yaw rate ω_high according to the steering state or the motion state of the vehicle to perform a correction.

Incidentally, it is commonly know that in a vehicle, a yaw response to a steering input has a temporal delay. However, the steering angle norm yaw rate does not take temporal delay into consideration. Consequently, in working example 1: the steering angle norm yaw rate is taken as a reference value, and a steering angle norm yaw rate, in which this takes a temporal delay into consideration, is calculated; either one of the steering angle norm yaw rate which does not take the temporal delay into consideration and the steering angle norm yaw rate which takes the temporal delay into consideration is selected according to the steering state of the vehicle; this selection result is input to the correction unit 15 as a stationary norm yaw rate ω_high; and thereby the transverse G norm yaw rate ω_low is corrected.

Figure 30:
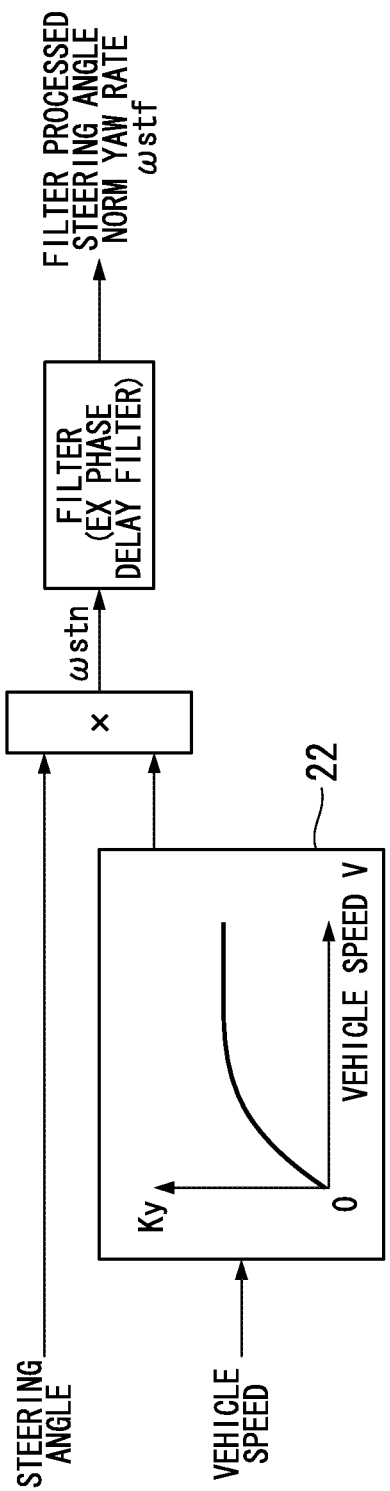
FIG. 30 is a block diagram of a filter-processing steering angle norm yaw rate calculation.

First, a method of calculating a steering angle norm yaw rate which takes the temporal delay into consideration is described, with reference to FIG. 30.

As described in reference example 1, a steering angle norm yaw rate which does not take the temporal delay into consideration can be found by multiplying the steering angle detected by the steering wheel turning angle sensor 3 by the steering angle norm yaw rate gain Ky determined according to the vehicle speed. The steering angle norm yaw rate which takes the temporal delay into consideration is calculated by performing a temporal delay process on the steering angle norm yaw rate found in this manner only for a preliminarily set time constant, using a phase delay filter 23. Where the steering angle norm yaw rate value which does not take the temporal delay into consideration is γstr (t), and the time constant is T, the steering angle norm yaw rate value which takes the temporal delay into consideration γstr_flt is expressed by the following equation (13).

$$\gamma str\_flt = \gamma str(t-T) \qquad \text{equation (13)}$$

In the following description, the steering angle norm yaw rate which does not take the temporal delay into consideration is referred to simply as "steering angle norm yaw rate ωstn", and the steering angle norm yaw rate which takes the temporal delay into consideration is referred to as "filter processed steering angle norm yaw rate". In this working example 1, the steering angle norm yaw rate ωstn configures a steering angle yaw rate reference value, and the filter processed steering angle norm yaw rate ωstf configures a delay steering angle yaw rate value.

Figure 31:
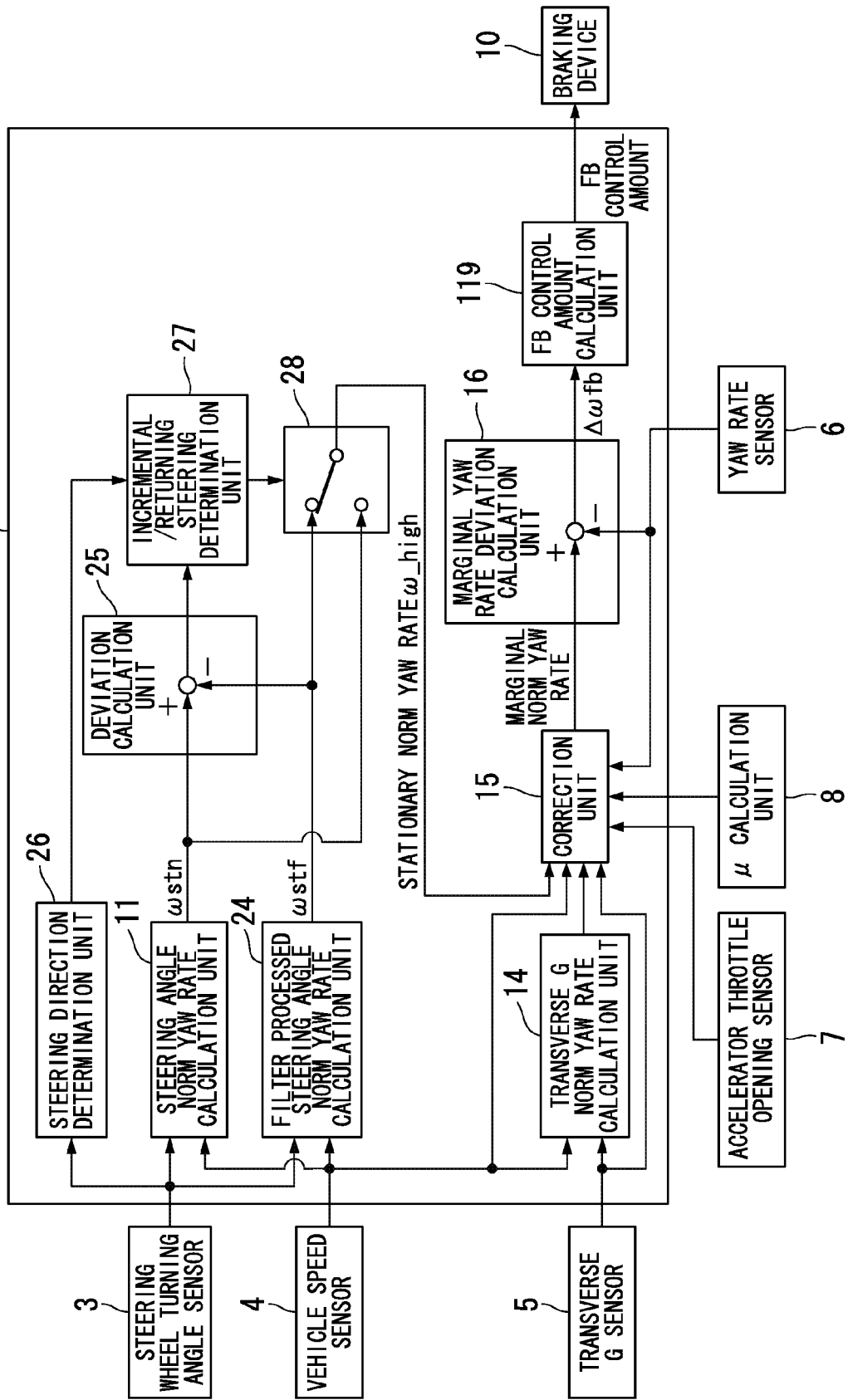
FIG. 31 is a block diagram showing a working example 1 of the turning control device for a vehicle according to the second embodiment of the present invention.

FIG. 31 is a control block diagram of the turning control device for a vehicle of working example 1.

The braking control unit 2 in working example 1 is provided with a steering angle norm yaw rate calculation unit 11, a filter processed steering angle norm yaw rate calculation unit 24, a steering angle norm yaw rate deviation calculation unit 25, a steering direction determination unit 26, an incremental steering/returning steering determination unit 27, a selector 28, a transverse G norm yaw rate calculation unit 14, a correction unit 15, a marginal yaw rate deviation calculation unit 16, and an FB control amount calculation unit 119.

The braking control unit 2 receives inputs of detection signals from a steering wheel turning angle sensor 3, a vehicle speed sensor 4, a transverse G sensor 5, a yaw rate sensor 6, and an accelerator throttle opening sensor 7 according to the respective detection values thereof, and it receives an input of an electric signal from μ calculation unit 8 according to a calculated friction coefficient.

The steering angle norm yaw rate calculation unit 11, as with the case of reference example 1, estimates and calculates a steering angle norm yaw rate ω based on a steering angle detected by the steering wheel turning angle sensor 3 and a vehicle speed detected by the vehicle speed sensor 4.

The filter process steering angle norm yaw rate calculation unit 24, as described above, performs a temporal delay process on a steering norm yaw rate using the phase delay filter 23 to thereby calculate a filter process steering angle norm yaw rate ωstf.

The steering angle norm yaw rate deviation calculation unit 25 subtracts the filter processed steering angle norm yaw rate ωstf calculated by the filter processed steering angle norm yaw rate calculation unit 24 from the steering angle norm yaw rate ωstn calculated by the steering angle norm yaw rate calculation unit 11, to thereby calculate a steering angle norm yaw rate deviation.

The steering direction determination unit 26 determines, based on the detection value of the steering wheel turning angle sensor 3, whether the steering wheel is in a state of being rotated to the right turning side from the neutral position (straight-ahead direction position) (for example, this state is determined as being "+"), or the steering wheel is in a state of being rotated to the left turning side from the neutral position (for example, this state is determined as being "−").

The incremental/returning steering determination unit 27 determines whether the steering wheel is rotated in the incremental steering direction or is rotated in the returning-steering direction based on the positivity or negativity of the steering angle norm yaw rate deviation calculated by the steering angle norm yaw rate deviation calculation unit 25 and the determination result of the steering direction determination unit 26.

Figure 32:
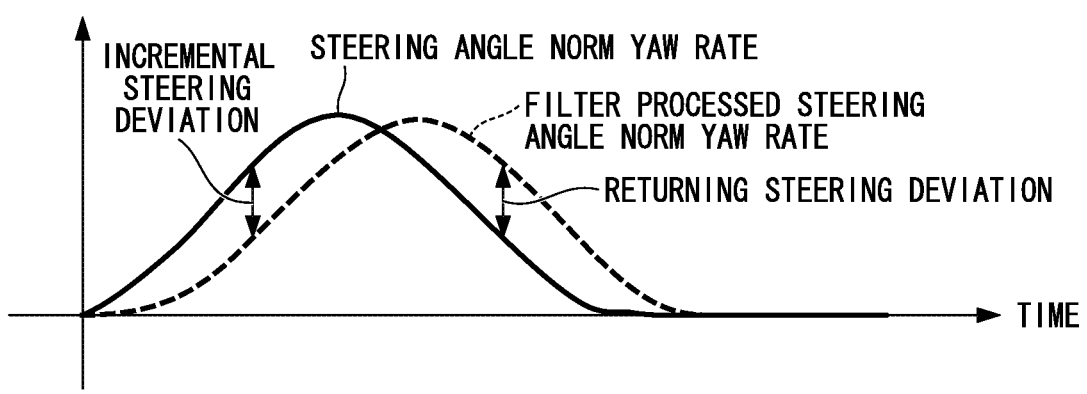
FIG. 32 is a diagram showing the correlation between steering angle norm yaw rate and filter-processing steering angle norm yaw rate.

The principle of this determination is described with reference to the diagram of FIG. 32. FIG. 32 shows temporal changes in the steering angle norm yaw rate ωstn and the filter processed steering angle norm yaw rate ωstf at the time when the steering wheel is returned to the neutral position after having been operated to perform a right turning. The filter processed steering angle norm yaw rate ωstf takes the temporal delay into consideration with the steering angle norm yaw rate ωstn. Therefore, the steering angle norm yaw rate ωstn is greater than the filter processed steering angle norm yaw rate ωstf until a predetermined amount of time has elapsed. However, when the predetermined amount of time has elapsed, this is reversed and the filter processed steering angle norm yaw rate ωstf becomes greater than the steering angle norm yaw rate ωstn.

Here, when the steering angle norm yaw rate ωstn is greater than the filter processed steering angle norm yaw rate ωstf, the steering wheel can be estimated as being rotated in the incremental steering direction, and when the filter processed steering angle norm yaw rate ωstf is greater than the steering angle norm yaw rate ωstn, the steering wheel can be estimated as being rotated in the returning-steering direction. Therefore, the steering wheel can be estimated as being rotated to the right turning side from the neutral position (the result of determination of the steering direction determination unit 26 is "+"), where if the yaw rate deviation calculated by the steering angle norm yaw rate deviation calculation unit 25 is a positive value, it can be estimated as being rotated in the incremental steering direction, and if the yaw rate deviation is a negative value, it can be estimated as being rotated in the returning-steering direction. In the state where the steering wheel is rotated to the left turning side, simply the positivity/negativity are reversed, and an estimation can be made on a similar principle. That is to say, if the positivity/negativity of the determination result of the steering direction determination unit 26 is the same as the positivity/negativity of the yaw rate deviation calculated by the steering angle norm yaw rate deviation calculation unit 25, the steering rotation can be determined as an incremental steering rotation, and if they are not the same, it can be determined as a returning-steering rotation.

The selector 28 selects, according to the determination result of the incremental steering/returning steering determination unit 27, one of the steering angle norm yaw rate ωstn calculated by the steering angle norm yaw rate calculation unit 11 and the filter processed steering angle norm yaw rate ωstf calculated by the filter processed steering angle norm yaw rate calculation unit 24, and outputs it as a stationary norm yaw rate ω_high to the correction unit 15. To describe in detail, in the case where the incremental steering/returning steering determination unit 27 determines it as an incremental steering, the filter processed steering angle norm yaw rate ωstf is selected, and the filter processed steering angle norm yaw rate ωstf is output as a stationary norm yaw rate ω_high to the correction unit 15. If the incremental steering/returning steering determination unit 27 determines it as a returning-steering, the steering angle norm yaw rate ωstn is selected, and the steering angle norm yaw rate ωstn is output as a stationary norm yaw rate ω_high to the correction unit 15.

The transverse G norm yaw rate calculation unit 14 is the same as that of reference example 1, and therefore the description thereof is omitted.

The correction unit 15 calculates a marginal norm yaw rate $\omega\_TAR$ based on the stationary norm yaw rate $\omega\_high$ input via the selector 28 and the transverse G norm yaw rate $\omega\_low$ input from the transverse G norm yaw rate calculation unit 14. When calculating the marginal norm yaw rate $\omega\_TAR$ in the correction unit 15, working example 1 differs from reference example 1 in that if an incremental steering is determined, a filter processed steering angle norm yaw rate w is used as the stationary norm yaw rate $\omega\_high$, and if a returning-steering is determined, a steering angle norm yaw rate $\omega stn$ is used as the stationary norm yaw rate $\omega\_high$. Other than this point, the method of calculating a marginal norm yaw rate $\omega\_TAR$ is the same as that in the case of reference example 1, and therefore, the detailed description thereof is omitted.

The marginal yaw rate deviation calculation unit 16 and the FB control amount calculation unit 119 are the same as those in reference example 1, and therefore, the descriptions thereof are omitted.

Figure 33:
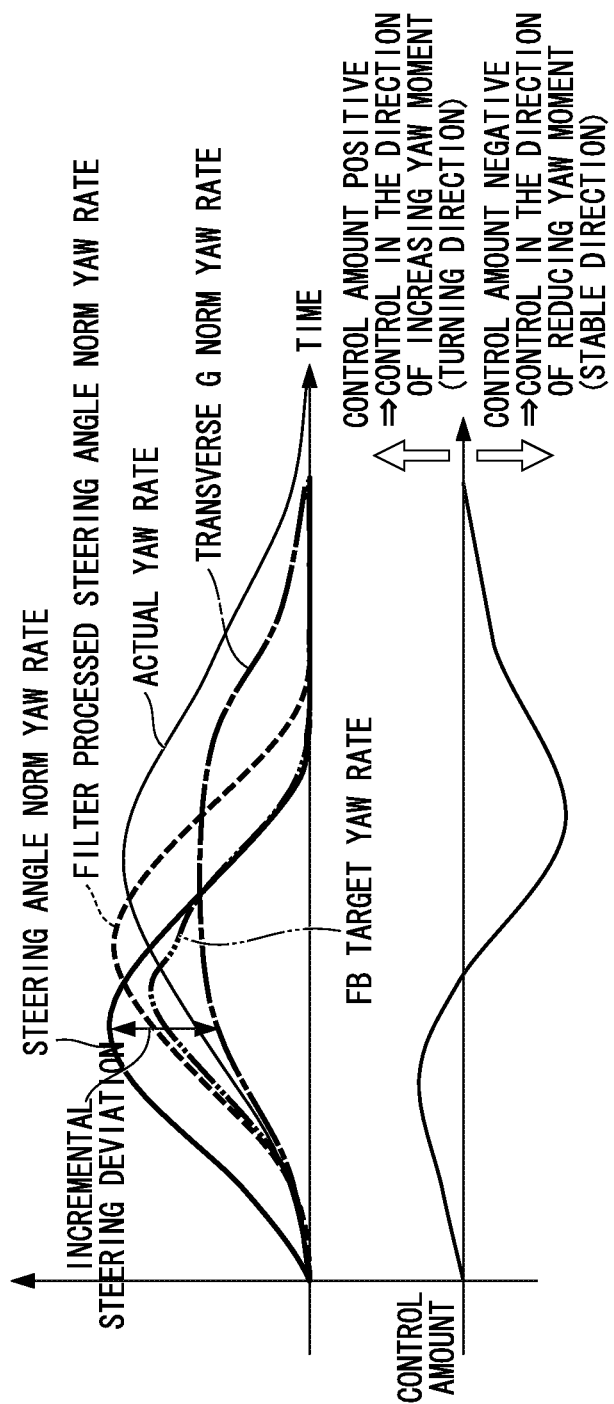
FIG. 33 is a diagram for explaining the relationship between transverse g-force norm yaw rate, steering angle norm yaw rate, filter-processing steering norm yaw rate, and feedback target yaw rate.

FIG. 33 shows an example of the control result in the turning control device 1 for a vehicle of working example 1, showing temporal transitions of each yaw rate value.

According to the turning control device for a vehicle of this working example 1, when the steering wheel is rotated in the incremental steering direction, the feedback target yaw rate (hereunder, abbreviated as FB target yaw rate) can be set to a value close to the filter processed steering angle norm yaw rate $\omega stf$, and when the steering wheel is rotated in the returning-steering direction, the FB target yaw rate can be set to a value close to the steering angle norm yaw rate $\omega stn$. Here, when an incremental steering is determined, the filter processed steering angle norm yaw rate $\omega stf$ is smaller than the steering angle norm yaw rate $\omega stn$. Therefore, in this working example 1, in the case where the steering direction is determined as being the incremental steering direction, the correction amount at the time of incrementally correcting the transverse G norm yaw rate to calculate the reference marginal norm yaw rate $\omega\_t1$ can be made smaller than that in the case where the steering direction is determined as being the returning-steering direction.

In general, a driver tends to excessively operate the steering wheel when operating incremental steering, and therefore, in this type of situation, excessive control intervention can be suppressed and steering response can be made more natural if the FB target yaw rate is set to a value close to the filter processed steering angle norm yaw rate $\omega stf$, the value of which is smaller than that of the steering angle norm yaw rate $\omega stn$. On the other hand, when performing a returning-steering, the level of responsiveness can be improved by setting the FB target yaw rate to a value close to the steering angle norm yaw rate $\omega stn$ with no temporal delay.

Moreover, according to the turning control device for a vehicle of working example 1, as with the turning control device for a vehicle of reference example 1, the correction unit 15 corrects the transverse G norm yaw rate $\omega\_low$ in the incremental direction while associating it with the stationary norm yaw rate $\omega\_high$ calculated based on the steering wheel turning angle (that is, the steering angle norm yaw rate $\omega stn$ or the filter processed steering angle norm yaw rate $\omega\_stf$), and calculates the marginal norm yaw rate $\omega\_TAR$. Therefore, control of stabilizing the yaw moment occurring in the vehicle body, and control of improving steering responsiveness can both be realized. As a result, the turning intention of the driver is responsively reflected, and the feel of steering can be improved.

Moreover, as with the turning control device for a vehicle of reference example 1, since the transverse G norm yaw rate $\omega\_low$ is corrected in the incremental direction to set the marginal norm yaw rate $\omega\_TAR$, it is possible to increase the target value in the FB control amount calculation unit 119, and the level of turnability is improved. As a result, it is possible to turn the vehicle along the traveling path, and the level of road surface tracking performance (traceability) is improved.

WORKING EXAMPLE 2

Next, a working example 2 of the turning control device for a vehicle according to the second embodiment of the present invention is described, with reference to the diagrams of FIG. 34 through FIG. 37.

Figure 34:
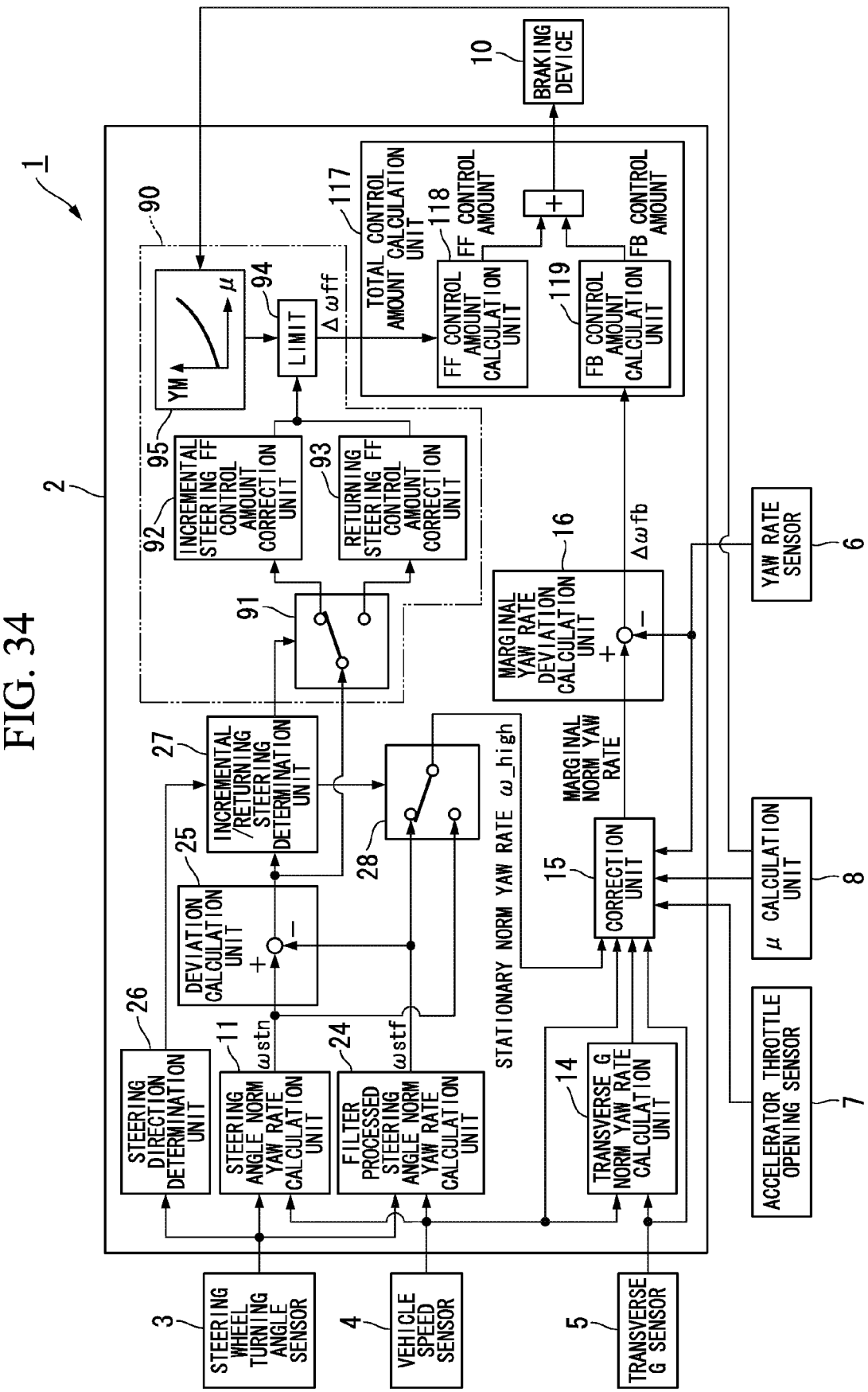
FIG. 34 is a block diagram showing a working example 2 of the turning control device for a vehicle according to the second embodiment of the present invention.

FIG. 34 is a control block diagram of the turning control device for a vehicle of working example 2. In the turning control device for a vehicle of working example 1 described above, a control amount (FB control amount) is found in the direction of nullifying the deviation between the marginal norm yaw rate $\omega\_TAR$ and the actual yaw rate (that is, the marginal yaw rate deviation $\Delta \omega fb$), and the braking pressure is controlled only with this FB control amount. However, in the turning control device of working example 2, an FF control amount is calculated based on a steering wheel turning angle and a vehicle speed, and a value obtained as a sum of the FB control amount and the FF control amount is taken as a total control amount, and the braking pressure of each wheel is controlled based on this total control amount.

Hereunder, the turning control device for a vehicle of working example 2 is described. However, in the control block diagram of FIG. 34, the feedback control system, that is, the steering angle norm yaw rate calculation unit 11, the filter processed steering angle norm yaw rate calculation unit 24, the steering angle norm yaw rate deviation calculation unit 25, the steering angle determination unit 26, the incremental/returning steering determination unit 27, the selector 28, the transverse G norm yaw rate calculation unit 14, the correction unit 15, the marginal yaw rate deviation calculation unit 16, and the FB control amount calculation unit 119 are the same as those of working example 1. Therefore, the same aspect portions are given the same reference symbols and descriptions thereof are omitted, and a feedforward control system, which is different from working example 1, is primarily described.

The turning control device 1 for a vehicle in working example 2 is provided with, in addition to the configuration of the turning control device 1 for a vehicle of working example 1, as a feedforward control system, a feedforward control amount correction unit 90 (hereunder, abbreviated as FF control amount correction unit) and an FF control amount calculation unit 118. The FF control amount calculation unit 118 and the FB control amount calculation unit 119 in working example 1 configure a control amount calculation unit 117.

The FF control amount correction unit 90 is provided with a selector 91, an incremental steering FF control amount correction unit 92, a returning-steering FF control amount correction unit 93, a limiting process unit 94, and a limit value table 95.

The selector 91 selects whether to output the steering angle norm yaw rate deviation calculated by the steering angle norm yaw rate deviation calculation unit 25 to the incremental steering FF control amount correction unit 92 or to the returning-steering FF control amount correction unit 93, according to the determination result of the incremental/returning steering determination unit 27. To describe in detail, in the case where it is determined as an incremental steering by the incremental/returning steering determination unit 27, the steering angle norm yaw rate deviation calculated by the steering angle norm yaw rate deviation calculation unit 25 is output to the incremental steering FF control amount correction unit 92, and if it is determined as a returning-steering by the incremental/returning steering determination unit 27, the steering angle norm yaw rate deviation calculated by the steering angle norm yaw rate deviation calculation unit 25 is output to the returning-steering FF control amount correction unit 93.

The incremental steering FF control amount correction unit 92 and the returning-steering FF control amount correction unit 93 multiply the steering angle norm yaw rate deviation input from the steering angle norm yaw rate deviation calculation unit 25 via the selector 91 ($\omega stn - \omega stf$) by a gain Kg according to the transverse G and a gain Kv according to the vehicle speed, to calculate an FF control deviation. Here, the gains Kg and Kv are respectively calculated with reference to a transverse G gain table and a vehicle speed gain table. However, the incremental steering FF control amount correction unit 92 and the returning-steering FF control amount correction unit 93 use different transverse G gain tables and vehicle speed gain tables.

Figure 35:
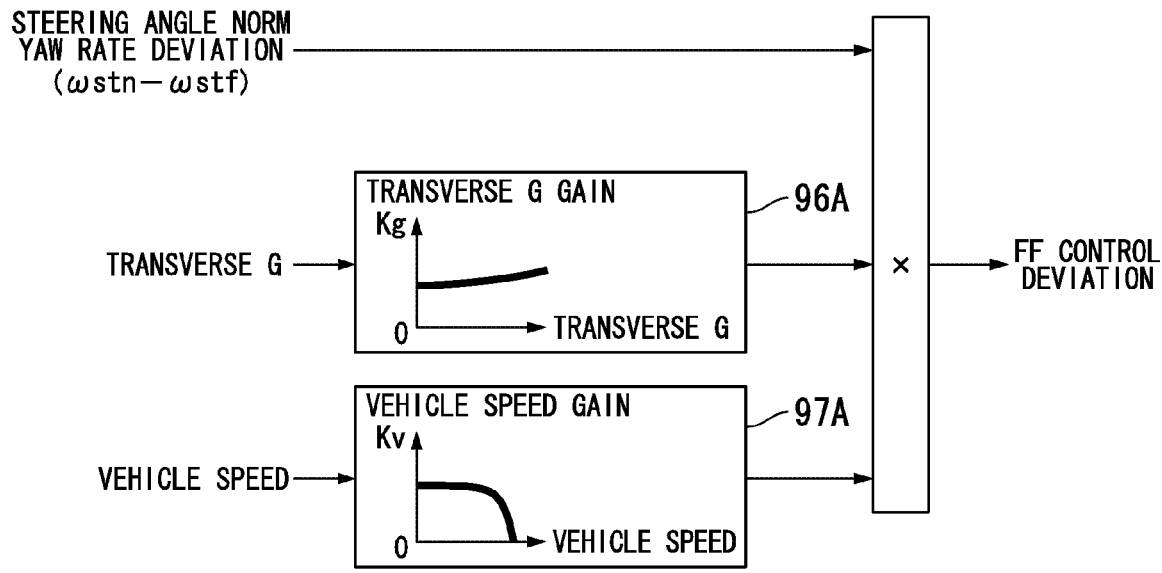
FIG. 35 is a block diagram of an incremental steering FF control deviation calculation in working example 2.
Figure 36:
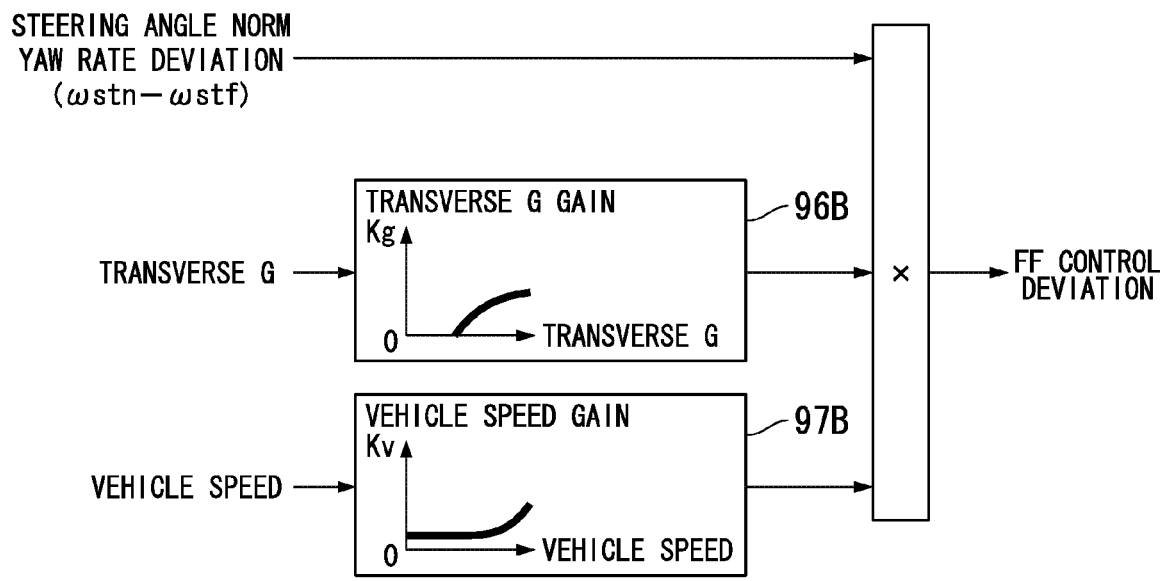
FIG. 36 is a block diagram of a returning-steering FF control deviation calculation in working example 2.

FIG. 35 is a control block diagram of the incremental steering FF control amount correction unit 92, and FIG. 36 is a control block diagram of the returning-steering FF control amount correction unit 93. In the transverse G gain tables 96A and 96B, the horizontal axis represents transverse G and the vertical axis represents gain Kg. In the vehicle speed gain tables 97A and 97B, the horizontal axis represents vehicle speed, and the vertical axis represents gain Kv.

First, calculation of an FF control deviation in the incremental steering FF control amount correction unit 92 is described, with reference to FIG. 35.

The transverse G gain table 96A in the incremental steering FF control amount correction unit 92 is such that the gain Kg takes a predetermined positive value when the transverse G is 0, and the gain Kg gradually and slightly becomes greater as the transverse G increases. The incremental steering FF control amount correction unit 92 makes reference to this transverse G gain table 96A, and calculates a gain Kg according to the transverse G detected by the transverse G sensor 5.

The vehicle speed gain table 97A in the incremental steering FF control amount correction unit 92 is such that the gain Kv is a substantially constant positive value until the vehicle speed has reached a predetermined vehicle speed, and it rapidly decreases to 0 once the predetermined vehicle speed is exceeded. The incremental steering FF control amount correction unit 92 makes reference to this vehicle speed gain table 97A, and calculates a gain Kv according to the vehicle speed detected by the vehicle speed sensor 4.

The incremental steering FF control amount correction unit 92 multiplies the steering angle norm yaw rate deviation ($\omega stn - \omega stf$) by the gain Kg and the gain Kv to calculate an FF control deviation.

That is to say, in this working example 2, the FF control deviation in the case where an incremental steering is determined is largely dependent on the vehicle speed, and in the stationary speed range until the vehicle speed exceeds the predetermined vehicle speed, the FF control deviation is set to an appropriate value. However, in the high speed range where the vehicle speed exceeds the predetermined vehicle speed, the FF control deviation is set to substantially 0.

Next, calculation of an FF control deviation in the returning-steering FF control amount correction unit 93 is described, with reference to FIG. 36.

The transverse G gain table 96B in the returning-steering FF control amount correction unit 93 is such that the gain Kg is 0 until the transverse G has reached a predetermined value, and the gain Kg gradually increases as the transverse G increases once the transverse G has exceeded the predetermined value. The returning-steering FF control amount correction unit 93 makes reference to this transverse G gain table 96B, and calculates a gain Kg according to the transverse G detected by the transverse G sensor 5.

The vehicle speed gain table 97B in the returning-steering FF control amount correction unit 93 is such that the gain Kv is a substantially constant positive value until the vehicle speed has reached a predetermined vehicle speed, and it gradually decreases once the predetermined vehicle speed is exceeded. The returning-steering FF control amount correction unit 93 makes reference to this vehicle speed gain table 97B, and calculates a gain Kv according to the vehicle speed detected by the vehicle speed sensor 4.

The returning-steering FF control amount correction unit 93 multiplies the steering angle norm yaw rate deviation ($\omega stn - \omega stf$) by the gain Kg and the gain Kv to calculate an FF control deviation.

That is to say, in this working example 2, the FF control deviation in the case where a returning-steering is determined is largely dependent on the transverse G. When the transverse G is not more than the predetermined value, the FF control deviation is 0 regardless of the vehicle speed, and once the transverse G has exceeded the predetermined value, an FF control deviation is set to be generated.

In this working example, the transverse G gain table 96A and the vehicle speed gain table 97A configure the incremental characteristic at the time of determining incremental steering, and the transverse G gain table 96B and the vehicle speed gain table 97B configure the incremental characteristic at the time of determining returning-steering.

As described above, the FF control amount correction unit 90 changes the incremental characteristic according to the determination result of the incremental/returning steering determination unit 27 (in other words, switches the incremental characteristic), to calculate an FF control deviation.

Since the incremental characteristics in the respective cases of incremental steering and returning steering are set as described above, the FF control deviation at the time of incremental steering in a high speed range is 0, and is smaller than the FF control deviation at the time of returning-steering. As a result, in the high speed range, an excessive steering intervention can be suppressed to ensure the stability, and the level of convergence can be improved, when an incremental steering is performed, while the level of responsiveness can be improved when a returning-steering is performed in a high speed range.

The incremental steering FF control amount correction unit 92 and the returning-steering FF control amount correction unit 93 output the calculated FF control deviation to the limiting process unit 94.

The limiting process unit 94 receives, in addition to the FF control deviation, an input of a limit value YM determined with reference to the limit value table 95. The limit value table 95 is such that the horizontal axis represents road surface friction coefficient μ, and the vertical axis represents limit value YM, and a limit value YM is determined according to the road surface friction coefficient μ calculated by the μ calculation unit 8.

The limiting process unit 94 performs a limiting process so that the FF control deviation input from the incremental steering FF control amount correction unit 92 or the returning-steering FF control amount correction unit 93 will not exceed the limit value (upper limit value) determined by the limit value table 95. That is to say, the limiting process unit 94 directly outputs the calculated FF control deviation in the case where the FF control deviation calculated by the incremental steering FF control amount correction unit 92 or the returning-steering FF control amount correction unit 93 does not exceed the limit value YM, and it outputs the limit value YM as an FF control deviation in the case where the FF control deviation calculated by the incremental steering FF control amount correction unit 92 or the returning-steering FF control amount correction unit 93 exceeds the limit value YM.

The FF control deviation output from the limiting process unit 94 is input as a stationary yaw rate deviation Δωff to the FF control amount calculation unit 118.

The FF control amount calculation unit 118 calculates an FF control amount based on the stationary yaw rate deviation Δωff input from the FF control amount correction unit 90 (that is, the FF control deviation output from the limiting process unit 94).

The FF control amount calculation process of the FF control amount calculation unit 118 in this working example 2 is exactly the same as the FF control amount calculation process of the FF control amount calculation unit 118 in reference example 2, except an FF control deviation is used as a stationary yaw rate deviation Δωff, and therefore, FIG. 29 is used and the description thereof is omitted.

The calculation of the FB control amount in the FB control amount calculation unit 119 is the same as that of working example 1, and therefore, the description thereof is omitted.

The control amount calculation unit 117 adds the FF control amount calculated by the FF control amount calculation unit 118 to the FB control amount calculated by the FB control amount calculation unit 119 to calculate a total control amount, and outputs it as a command value to the braking device 10. This total control amount calculation process is the same as that of reference example 2, and therefore, FIG. 29 is used and the description thereof is omitted.

Figure 37:
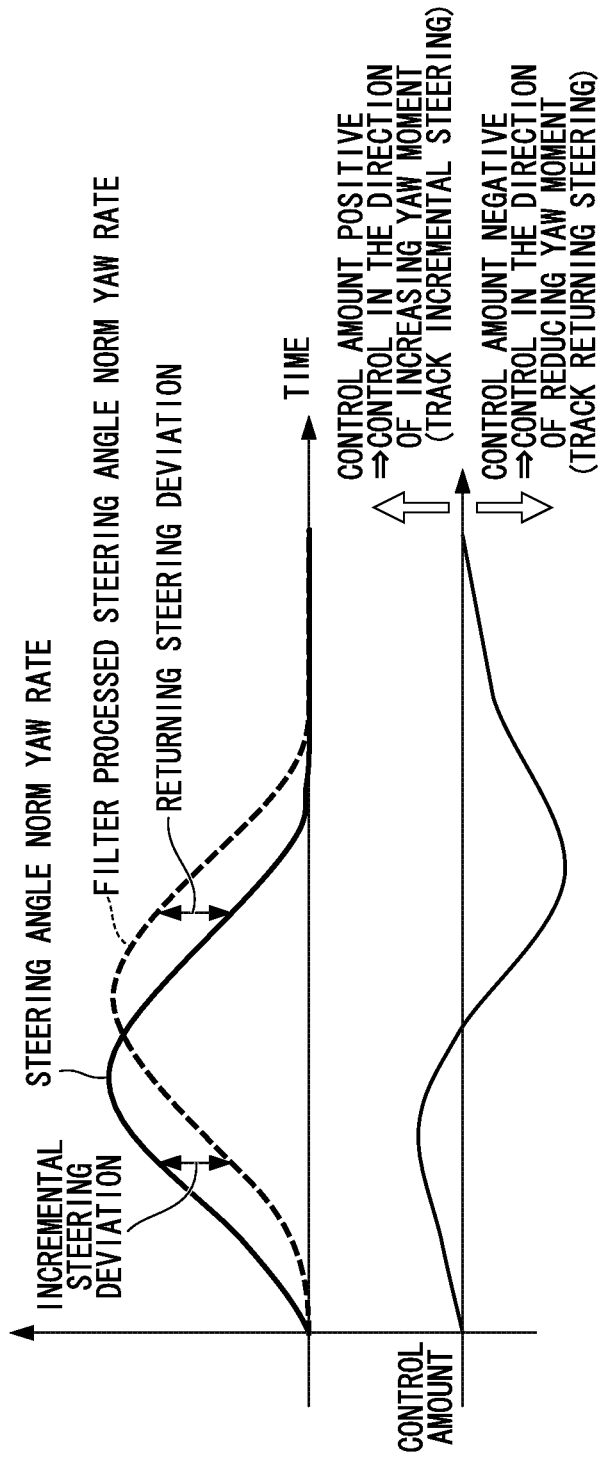
FIG. 37 is a diagram for explaining feedforward control in working example 2.

FIG. 37 is an FF control conceptual diagram of the turning control device for a vehicle of working example 2.

According to the turning control device for a vehicle of this working example 2, the total control amount can be controlled in the incremental direction (in other words, in the direction of increasing the yaw moment) when an incremental steering is performed, and the total control amount can be controlled in the decremental direction (in other words, in the direction of reducing the yaw moment) when a returning-steering is performed.

In addition, as described above, even at the time of incremental steering, the FF control deviation is set to an appropriate value in the stationary speed range until the vehicle speed exceeds a predetermined vehicle speed. However, since the FF control deviation is set to 0 in the high speed range where the vehicle speed exceeds the predetermined vehicle speed, it is possible to reduce temporal delay and improve the level of steering responsiveness by performing the FF control in the direction of increasing the yaw moment only in the stationary speed range, and it is possible to ensure the stability of steering by not performing the FF control in the direction of increasing the yaw moment in the high speed range.

Moreover, when performing a returning-steering, control can be performed in the direction of reducing the total control amount (in other words, in the direction of reducing the yaw moment), and therefore, the convergence of the yaw moment is improved. As described above, in the case where the transverse G is small at the time of performing a returning-steering, the FF control deviation is set to take 0, and therefore, the FF control in the direction of reducing the yaw moment is not performed at this time. This is because, the control intervention prevents the vehicle behavior from becoming unnatural, and the steering wheel is smoothly returned to the neutral position without any sense of discomfort, using the self-convergence characteristic of the vehicle.

Moreover, according to the turning control device for a vehicle of working example 2, as with the case of reference example 1, the correction unit 15 corrects the transverse G norm yaw rate ω_low in the incremental direction while associating it with the stationary norm yaw rate ω_high calculated based on the steering wheel turning angle (that is, the steering angle norm yaw rate ωstn or the filter processed steering angle norm yaw rate ωstf), and calculates the marginal norm yaw rate ω_TAR. Therefore, control of stabilizing the yaw moment occurring in the vehicle body, and control of improving steering responsiveness can both be realized. As a result, the turning intention of the driver is responsively reflected, and the feel of steering can be improved.

Moreover, since the transverse G norm yaw rate ω_low is corrected in the incremental direction to set the marginal norm yaw rate ω_TAR, it is possible to increase the target value in the FB control amount calculation unit 119, and the level of turnability is improved. As a result, it is possible to turn the vehicle along the traveling path, and the level of road surface tracking performance (traceability) is improved.

Furthermore, according to the turning control device for a vehicle of this working example 2, since the braking pressure is controlled based on the total control amount obtained by adding the FB control amount calculated based on the vehicle behavior, to the FF control amount calculated based on the steering input, it is possible to ensure the stability of vehicle behavior while improving the level of steering responsiveness. Moreover, steering tracking is also improved. For example, in a process in which steering is maintained after the steering input, such as when turning in a continuous circle, fluctuation of the control amounts is suppressed, so that steering tracking is improved.

The present invention is not limited to the working example described above.

For example, in working example 2 described above, the FF control amount and the FB control amount are added to calculate the total control amount. However, the FF control amount and the FB control amount may be multiplied by each other to calculate the total control amount.

Moreover, there may be used an estimated vehicle speed estimated based on detection values of a wheel speed sensor instead of detection values of the vehicle speed sensor.

Furthermore, in working example 2 described above, in the FF control amount calculation unit 118, by nullifying the FF incremental pressure amount ΔP1ff of the FR turning inner wheel and the FF incremental pressure amount ΔP2ff of the RR turning inner wheel when the vehicle speed is high, vehicle behavior instability caused by steering assist braking is prevented when the vehicle speed is high. However, even when the steering wheel turning speed is extremely high or when an ABS is operating, the FF incremental pressure amount of the turning inner wheel may be nullified.

(1) The present embodiment is a turning control device for a vehicle (for example, the turning control device 1 for a vehicle) capable of generating a yaw moment in a vehicle body by applying a braking force to left and right wheels of the vehicle based on running conditions of the vehicle, the turning control device comprising: a steering wheel turning amount detection device (for example, the steering wheel turning angle sensor 3 in the working example above) which detects a steering wheel turning amount of the vehicle; a vehicle speed detection device (for example, the vehicle speed sensor 4 in the working example above) which detects or estimates a speed of the vehicle; a transverse acceleration detection device (for example, the transverse G sensor 5 in the working example above) which detects an acceleration of the vehicle in the left-right direction; and a yaw rate detection device (for example, the yaw rate sensor 6 in the working example above) which detects a yaw rate of the vehicle, wherein there are provided: a first norm yaw rate calculation unit (for example, the transverse G norm yaw rate calculation unit 14 in the working example above) which calculates a first norm yaw rate (for example, the transverse G norm yaw rate $\omega\_low$ in the working example above) based on detections signals of the transverse acceleration detection device and the vehicle speed detection device; a steering direction determination device (for example, the incremental/returning steering determination unit 27 in the working example above) which determines, based on detection signals of the steering wheel turning amount detection device, whether the steering direction is the incremental steering direction or the returning-steering direction; a correction unit (for example, the correction unit 15 in the working example above) which corrects the first norm yaw rate in the incremental direction using different references according to the determination result of the steering direction determination device, to calculate a second norm yaw rate (for example, the marginal norm yaw rate $\omega\_TAR$ in the working example above); a third braking force control amount calculation unit (for example, the FB control amount calculation unit 119 in the working example above) which calculates a deviation between the second norm yaw rate and the actual yaw rate detected by the yaw rate detection device, and which determines a third braking force control amount in a direction of nullifying the yaw rate deviation; and a braking control device (for example, the braking device 10 in the working example above) which controls the braking force based on the third braking force control amount determined by the third braking force control amount calculation unit.

According to the embodiment of (1) above, a first norm yaw rate calculated based on a transverse acceleration and a vehicle speed is corrected in the incremental direction to calculate a second norm yaw rate, and a braking force is controlled in the direction that offsets the yaw rate deviation between this second norm yaw rate and the actual yaw rate to generate a yaw moment. As a result, the level of turnability is improved at the time of normal turning, and the level of steering responsiveness is improved. Moreover, depending on whether the steering direction is the incremental steering direction or the returning-steering direction, different references are used to incrementally correct the first norm yaw rate and calculate the second norm yaw rate. As a result, the level of steering responsiveness at the time of performing an incremental steering can be improved, and yaw moment convergence at the time of performing returning-steering can be improved.

(2) In the embodiment described in (1) above, it is preferable that in the case where the steering direction determination device determines the steering direction as being the incremental steering direction, the correction unit makes the correction amount for correcting the first norm yaw rate in the incremental direction smaller than that in the case where the steering direction determination device determines the steering direction as being the returning-steering direction.

In the case of (2) above, excessive control intervention can be suppressed when the steering wheel is rotated in the incremental steering direction, and steering responsiveness can be made more natural. On the other hand, when the steering wheel is rotated in the returning-steering direction, temporal delay can be reduced, and the level of responsiveness can be improved.

(3) In the embodiment described in (1) above, it is preferable that the correction unit has, as the different references, a steering angle yaw rate reference value (for example, the steering angle norm yaw rate $\omega stn$ in the working example above) estimated based on detection signals of the steering wheel turning amount detection device and the vehicle speed detection device, and a delay steering angle yaw rate value (for example, the filter processed steering angle norm yaw rate $\omega stf$ in the working example above) which is determined so as to correspond to the steering angle yaw rate reference value and has a temporal delay with respect to this steering angle yaw rate reference value.

In the case of (3) above, the steering angle yaw rate reference value having no temporal delay and the steering angle yaw rate value having a temporal delay may be selectively used to calculate a second norm yaw rate.

(4) In the embodiment described in (1) above, it is preferable that there is provided a requested torque detection device (for example, the accelerator throttle opening sensor 7 in the working example above) which detects the magnitude of a requested torque based on an accelerator throttle opening or an accelerator pedal operating amount, and the correction unit determines a correction amount so that the second norm yaw rate becomes greater as the vehicle speed decreases when the detection signal from the requested torque detection device is less than a predetermined value.

In the case of (4) above, the turnability at the time of tuck-in at low to medium speed, for example, is improved.

(5) In the embodiment described in (1) above, it is preferable that the correction unit determines a correction amount so that the second norm yaw rate becomes greater as a steering wheel rotation speed or steering wheel rotation amount calculated based on detection signals from the steering wheel turning amount detection device becomes greater.

In the case of (5) above, the responsiveness of the steering when avoiding a front obstacle or changing lanes is improved.

(6) In the embodiment described in (1) above, it is preferable that there is provided a fourth braking force control amount calculation unit (for example, the FF control amount calculation unit 118 in the working example above) which determines a fourth braking force control amount based on detection signals of the steering wheel turning amount detection device and the vehicle speed detection device, and the braking control device controls the braking force based on a total braking force control amount obtained as a result of adding or multiplying the third braking force control amount determined by the third braking force control amount calculation unit and the fourth braking force control amount determined by the fourth braking force control amount calculation unit to or by each other.

In the case of (6) above, the level of steering responsiveness is improved, and the level of steering tracking is improved. For example, in a process in which steering is maintained after the steering input, such as when turning in a continuous circle, fluctuation of the control amounts is suppressed, so that steering tracking is improved.

(7) In the embodiment described in (1) above, it is preferable that there is provided a nullification device (for example, the gain tables 63 and 67 in the working example above) which nullifies the fourth braking force control amount determined by the fourth braking force control amount calculation unit when the vehicle is in a predetermined operating state.

In the case of (7) above, under specific conditions where the stability of vehicle behavior may be reduced when coupled with a fourth braking force control amount, for example, where the vehicle is traveling at a high speed, the steering wheel turning speed is high, or an ABS is operating, it is possible to nullify the fourth braking force control amount, and maintain the stability of vehicle behavior.

INDUSTRIAL APPLICABILITY

According to the embodiments of the present invention, it is possible to provide a turning control device for a vehicle capable of improving the level of turnability at the time of performing normal turning.

DESCRIPTION OF THE REFERENCE SYMBOLS

1 Turning control device for a vehicle
3 Steering wheel turning angle sensor (steering wheel turning amount detection device)
4 Vehicle speed sensor (vehicle speed detection device)
5 Transverse G sensor (transverse acceleration detection device)
6 Yaw rate sensor (yaw rate detection device)
7 Accelerator throttle opening sensor (requested torque detection device)
10 Braking device (braking control device)
14 Transverse G norm yaw rate calculation unit (first norm yaw rate calculation unit)
15 Correction unit
18 FF braking force control amount calculation unit (braking force control amount calculation unit)
19 FB braking force control amount calculation unit (second braking force control amount calculation unit)
20 FF control amount calculation unit (feedforward control amount calculation unit)
27 Incremental/returning steering determination unit (steering direction determination device)
63, 67 Gain table (nullification device)
118 FF control amount calculation unit (fourth braking force control amount calculation unit)
119 FB control amount calculation unit (third braking force control amount calculation unit)

The invention claimed is:

1. A turning control device for a vehicle which generates a yaw moment in a body of the vehicle by applying a braking force to left and right wheels of the vehicle based on running conditions of the vehicle, the turning control device comprising:
 a steering wheel turning amount detection device which detects a steering wheel turning amount of the vehicle;
 a vehicle speed detection device which detects or estimates a speed of the vehicle;
 a feedforward control amount calculation unit which calculates a feedforward control amount based on at least one of a detection signal from at least the steering wheel turning amount detection device and a detection signal from the vehicle speed detection device;
 a braking force control amount calculation unit which determines a braking force control amount based on the feedforward control amount calculated by the feedforward control amount calculation unit and an incremental characteristic;
 a braking control device which controls the braking force based on the braking force control amount determined by the braking force control amount calculation unit; and
 a steering direction determination device which determines whether a steering direction is an incremental steering direction or a returning-steering direction based on the detection signal from the steering wheel turning amount detection device,
 wherein the feedforward control amount calculation unit is provided with a feedforward control amount correction unit which corrects the feedforward control amount according to the determination result of the steering direction determination device.

2. The turning control device for a vehicle according to claim 1, further comprising a transverse acceleration detection device which detects an acceleration of the vehicle in the left-right direction; a yaw rate detection device which detects an actual yaw rate of the vehicle; a first norm yaw rate calculation unit which calculates a first norm yaw rate based on a detection signal from the transverse acceleration detection device and a detection signal from the vehicle speed detection device; a norm yaw rate correction unit which corrects the first norm yaw rate in the incremental direction and calculates a second norm yaw rate based on a detection signal from the steering wheel turning amount detection device and a detection signal from the vehicle speed detection device; and a second braking force control amount calculation unit which determines a second braking force control amount of a feedback control system, in a direction that offsets a yaw rate deviation between the second norm yaw rate and the actual yaw rate detected by the yaw rate detection device, wherein the braking control device controls the braking force based on a total braking force control amount obtained as a result of adding or multiplying the braking force control amount determined by the braking force control amount calculation unit and the second braking force control amount determined by the second braking force control amount calculation unit, to or by each other,
 wherein in a case where the steering direction determination device determines a steering direction as being an incremental steering direction when the vehicle speed is within a high speed range and is at least a predetermined vehicle speed, the feedforward control amount correction unit makes the feedforward control amount smaller than that in a case where the steering direction determination device determines the steering direction as being a returning-steering direction.

3. The turning control device for a vehicle according to claim 2, further comprising a nullification device which nullifies the braking force control amount determined by the braking force control amount calculation unit, when the vehicle is in a predetermined operating state.

4. The turning control device for a vehicle according to claim 1, further comprising:
 a transverse acceleration detection device which detects an acceleration of the vehicle in the left-right direction;
 a yaw rate detection device which detects an actual yaw rate of the vehicle;
 a first norm yaw rate calculation unit which calculates a first norm yaw rate based on a detection signal from the transverse acceleration detection device and a detection signal from the vehicle speed detection device;
 a norm yaw rate correction unit which corrects the first norm yaw rate in the incremental direction and calculates a second norm yaw rate based on a detection signal from the steering wheel turning amount detection device and a detection signal from the vehicle speed detection device; and
 a second braking force control amount calculation unit which determines a second braking force control amount from a feedback control system, in a direction that offsets a yaw rate deviation between the second norm yaw rate and the actual yaw rate detected by the yaw rate detection device, wherein the braking control device controls the braking force based on a total braking force control amount obtained as a result of adding or multiplying the braking force control amount determined by the braking force control amount calculation unit and the second braking force control amount determined by the second braking force control amount calculation unit, to or by each other.

5. The turning control device for a vehicle according to claim 4, wherein the norm yaw rate correction unit corrects the first norm yaw rate in the incremental direction to calculate the second norm yaw rate based on either one of a steering angle yaw rate reference value estimated based on a detection signal from the steering wheel turning amount detection device and a detection signal from the vehicle speed detection device, and a delay steering angle yaw rate value which is determined so as to correspond to the steering angle yaw rate reference value and which has a temporal delay with respect to this steering angle yaw rate reference value.

6. The turning control device for a vehicle according to claim 4, further comprising a torque detection device which detects the magnitude of a torque based on an accelerator throttle opening or an accelerator pedal operating amount of the vehicle, wherein the norm yaw rate correction unit determines a correction amount so that, when a detection signal from the requested torque detection device is smaller than a predetermined value, the second norm yaw rate becomes greater as the vehicle speed is lower.

7. The turning control device for a vehicle according to claim 4, wherein the norm yaw rate correction unit determines a correction amount so that the second norm yaw rate becomes greater as a steering wheel rotation speed or a steering wheel rotation amount of the vehicle calculated based on a detection signal from the steering wheel turning amount detection device becomes greater.

8. The turning control device for a vehicle according to claim 1, further comprising a nullification device which nullifies the braking force control amount determined by the braking force control amount calculation unit, when the vehicle is in a predetermined operating state.

9. A turning control device for a vehicle which generates a yaw moment in a body of the vehicle by applying a braking force to left and right wheels of the vehicle based on running conditions of the vehicle, the turning control device comprising:

a steering wheel turning amount detection device which detects a steering wheel turning amount of the vehicle;

a vehicle speed detection device which detects or estimates a speed of the vehicle;

a feedforward control amount calculation unit which calculates a feedforward control amount based on a detection signal from the steering wheel turning amount detection device, said calculation unit including a feedforward control amount correction unit which corrects the feedforward control amount according to the determination result of the steering direction determination device;

a steering direction determination device which determines whether a steering direction is an incremental steering direction or a returning-steering direction based on the detection signal from the steering wheel turning amount detection device;

a transverse acceleration detection device which detects an acceleration of the vehicle in the left-right direction; a yaw rate detection device which detects an actual yaw rate of the vehicle; a first norm yaw rate calculation unit which calculates a first norm yaw rate based on a detection signal from the transverse acceleration detection device and a detection signal from the vehicle speed detection device; a norm yaw rate correction unit which corrects the first norm yaw rate in the incremental direction and calculates a second norm yaw rate based on a detection signal from the steering wheel turning amount detection device and a detection signal from the vehicle speed detection device, and a delay steering angle yaw rate value which is determined so as to correspond to the steering angle yaw rate reference value and which has a temporal delay with respect to this steering angle yaw rate reference value;

a torque detection device which detects the magnitude of a torque based on an accelerator throttle opening or an accelerator pedal operating amount of the vehicle;

a first braking force control amount calculation unit which determines a braking force control amount based on the feedforward control amount calculated by the feedforward control amount calculation unit;

and a second braking force control amount calculation unit which determines a second braking force control amount based on a a feedback control system, in a direction that offsets a yaw rate deviation between the second norm yaw rate and the actual yaw rate detected by the yaw rate detection device;

a braking control device which controls the braking force based on the braking force control amount determined by the first and second braking force control amount calculation units; and a nullification device which nullifies the braking force control amount determined by the braking force control amount calculation unit, when the vehicle is in a predetermined operating state.

* * * * *